(12) United States Patent
Sadano et al.

(10) Patent No.: US 7,212,901 B2
(45) Date of Patent: May 1, 2007

(54) LANE DEPARTURE PREVENTION APPARATUS

(75) Inventors: On Sadano, Atsugi (JP); Yoshitaka Uemura, Kawasaki (JP); Masahiro Ozaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 407 days.

(21) Appl. No.: 10/960,706

(22) Filed: Oct. 8, 2004

(65) Prior Publication Data

US 2005/0096827 A1 May 5, 2005

(30) Foreign Application Priority Data

| Oct. 20, 2003 | (JP) | ............................ 2003-369447 |
| Nov. 18, 2003 | (JP) | ............................ 2003-388209 |
| Dec. 10, 2003 | (JP) | ............................ 2003-412061 |

(51) Int. Cl.
*G06F 19/00* (2006.01)

(52) U.S. Cl. .......................... 701/70; 701/301; 348/148

(58) Field of Classification Search ................. 701/36, 701/41, 70, 300, 301; 348/148; 340/435, 340/436, 903
See application file for complete search history.

(56) References Cited

U.S. PATENT DOCUMENTS

| 6,879,890 | B2* | 4/2005 | Tange et al. ................. 701/23 |
| 6,970,777 | B2* | 11/2005 | Tange et al. ................. 701/41 |
| 7,107,137 | B2* | 9/2006 | Tange et al. ................. 701/70 |
| 7,117,076 | B2* | 10/2006 | Shimakage et al. .......... 701/41 |
| 2002/0087255 | A1 | 7/2002 | Jindo et al. |
| 2003/0195667 | A1 | 10/2003 | Tange et al. |
| 2005/0096826 | A1* | 5/2005 | Iwasaka et al. .............. 701/70 |
| 2005/0096828 | A1* | 5/2005 | Uemura et al. .............. 701/70 |
| 2005/0096829 | A1* | 5/2005 | Sugano et al. .............. 701/70 |
| 2005/0107939 | A1* | 5/2005 | Sadano et al. .............. 701/70 |
| 2006/0149448 | A1* | 7/2006 | Tange et al. ................. 701/41 |

FOREIGN PATENT DOCUMENTS

| JP | 2000-033860 A | 2/2000 |
| JP | 2003-112540 A | 4/2003 |

* cited by examiner

*Primary Examiner*—Gary Chin
(74) *Attorney, Agent, or Firm*—Global IP Counselors

(57) ABSTRACT

A lane departure prevention apparatus is configured to conduct a course correction in a lane departure avoidance direction when the controller 8 determines that there is a potential for a vehicle to depart from a driving lane. The controller 8 combines yaw control and deceleration control to conduct departure prevention control to avoid lane departure. The yaw control is not actuated if the opposite direction from the steering direction coincides with the lane departure direction (steps S10 and S11). Preferably, the controller 8 sets the timing of yaw moment and the deceleration of the vehicle on the basis of the acceleration or deceleration of the vehicle, and performs braking control so that these settings are achieved (steps S7 to S9). Preferably, the controller 8 calculates the target yaw moment in the lane departure-avoidance direction on the basis of the running state of the vehicle, and calculates the deceleration amount by taking into account the driver braking operation amount.

13 Claims, 22 Drawing Sheets

LANE DEPARTURE PREVENTION APPARATUS

BACKGROUND OF THE INVENTION

1. Field of the Invention

The present invention relates to a lane departure prevention apparatus. More specifically, the present invention relates to a lane departure prevention apparatus for preventing a host vehicle from departing from a driving lane when such departure seems imminent.

2. Background Information

Conventional lane departure prevention apparatuses include apparatuses for imparting yaw moment to the host vehicle by controlling the braking force to the wheel and preventing the host vehicle from deviating from the driving lane. These conventional lane departure prevention apparatuses also inform the driver that the host vehicle may possibly depart from the driving lane by providing this yaw moment in cases in which there is a possibility that the host vehicle may depart from a driving lane. For example, one such lane departure prevention apparatus is disclosed in Japanese Laid-Open Patent Publication No. 2000-33860, which controls the brakes to provide a yaw moment to the host vehicle and prevents lane departure, and which also warns the driver through this yaw moment (see, page 3 and FIG. 6). This conventional lane departure prevention apparatus determines a lane departure by whether or not any of the distance from a driving lane center of a host vehicle driving position (lateral shift amount) and the angle that an estimated driving course forms with respect to the driving lane (yaw angle shift amount) has exceeded respective predetermined values.

Another lane departure prevention apparatus is disclosed in Japanese Laid-Open Patent Publication No. 2003-112540 (p. 7 and FIG. 2), which evaluates the lane departure of the host vehicle from its driving lane, and avoids lane departure by combining yaw control and deceleration control. In particular, the yaw control applies the brakes to provide a yaw moment to the host vehicle in which a braking force difference is applied to the left and right wheels to avoid lane departure, while the deceleration control applies the brakes to decelerate the host vehicle. The total braking force of the yaw control and the deceleration control is applied according to the amount by which the vehicle is estimated to depart from its lane in the future, which is calculated on the basis of the driving state of the host vehicle.

In view of the above, it will be apparent to those skilled in the art from this disclosure that there exists a need for an improved lane departure prevention apparatus. This invention addresses this need in the art as well as other needs, which will become apparent to those skilled in the art from this disclosure.

SUMMARY OF THE INVENTION

It has been discovered that in a conventional lane departure prevention apparatus, the possibility of a lane departure is estimated on the basis of information from a lateral deviation detection device such as a camera, and a yaw moment is imparted to the host vehicle on the basis of this departure estimate. More specifically, any lateral deviation in the driving position of a vehicle from the reference position of the driving lane is detected by the lateral deviation detection device, and a braking force is applied to the wheels on the basis of the detected state of lateral deviation to impart a yaw moment to the host vehicle. In other words, this type of conventional lane departure prevention apparatus involves nothing more than avoiding the lane departure of the host vehicle by taking into account just the positional relationship between the driving lane and the host vehicle. Thus, it can hardly be concluded that control for lane departure avoidance is being carried out optimally.

Moreover, with this type of conventional lane departure prevention apparatus, there are situations in which the yaw moment based on the lane departure estimate ends up being imparted to the vehicle even when the driver uses the steering wheel to input steering angle. When this happens, the vehicle's behavior does not match the operation of the steering wheel, making the driver feel uncomfortable.

It is also possible to prevent lane departure, or to effectively control lane departure with the above-mentioned yaw moment, by using deceleration control. In this case, such deceleration control can be carried out on the basis of information from a sensor such as a camera. However, when information from a camera or other sensor is used to carry out deceleration control, this operation may go against the will of the driver, again making the driver feel uncomfortable. In other words, with this type of conventional lane departure prevention apparatus, since the yaw moment and deceleration amount applied to the vehicle are determined according to the amount by which the vehicle is estimated to depart from its lane in the future, there is an unresolved problem in that deceleration may be greater than necessary, and the driver may experience some discomfort, when the driver operates the brakes during braking control that includes deceleration control.

Thus, the present invention was conceived in light of these unsolved problems in the above-described conventional examples. One object of the present invention is to provide a lane departure prevention apparatus in which the control of lane departure can be accomplished without making the driver feel uncomfortable. Another object of the present invention is provide a lane departure prevention apparatus that can conduct departure avoidance control in which control for lane departure avoidance can be carried out optimally. Another object of the present invention is provide a lane departure prevention apparatus that can conduct departure avoidance control in which departure-avoidance control can be performed without causing the driver any discomfort, even when the driver is operating the brakes during lane departure.

In order to solve some of the above-described problems, the lane departure prevention apparatus of the present invention is provided with a driving operation detection section, a yaw control amount calculating section, and a deceleration control amount calculating section. The driving operation detection section is configured to detect a driving operation performed by a driver. The yaw control amount calculating section is configured to calculate a first braking force control amount such that a braking yaw moment is generated in a direction avoiding departure of the host vehicle from a driving lane. The deceleration control amount calculating section is configured to calculate a second braking force control amount such that a braking deceleration force is produced to decelerate the host vehicle. At least one of the first and second braking force control amounts is calculated based on the driving operation detected by the driving operation detection section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
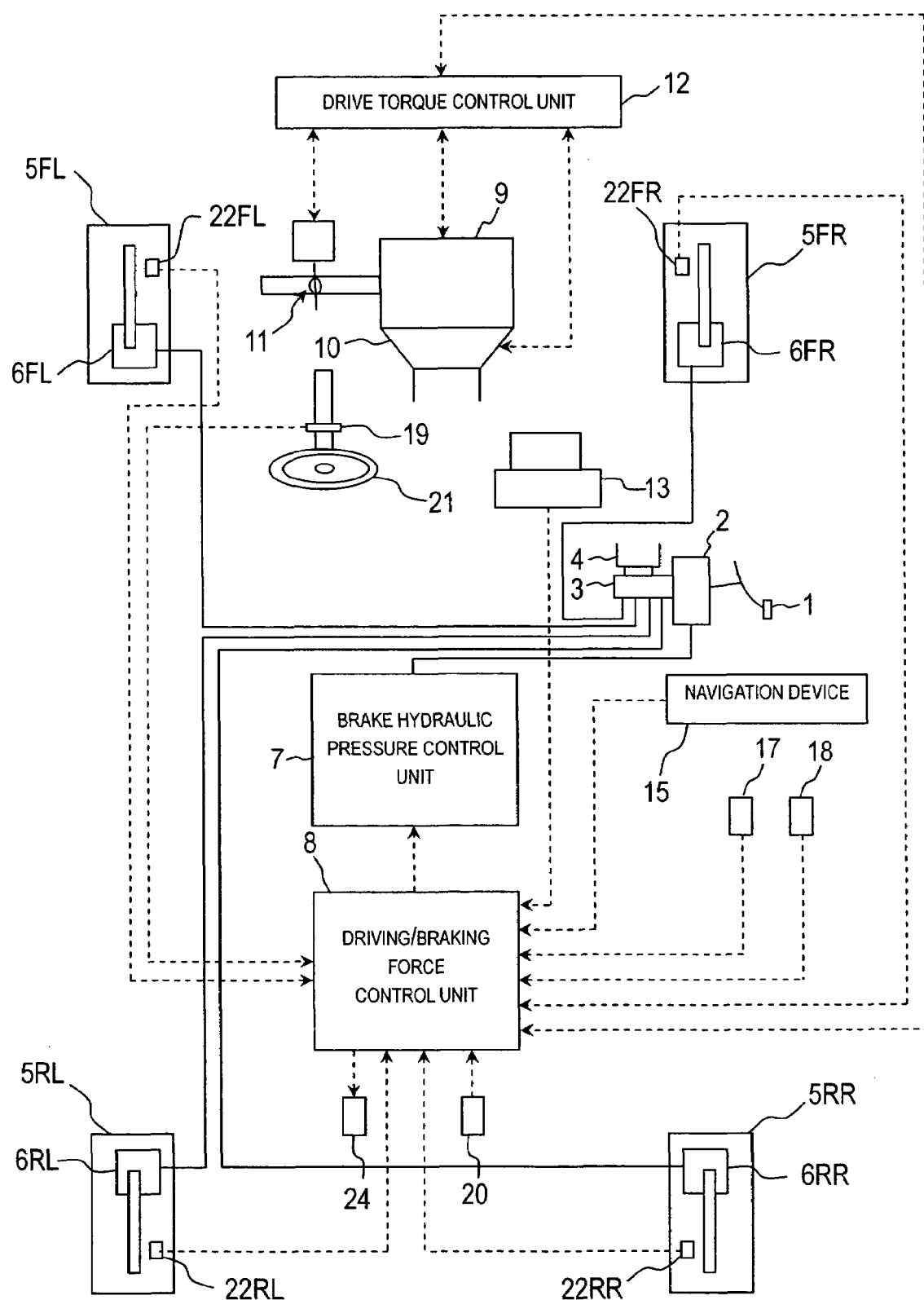
FIG. 1 is a schematic structural diagram of a vehicle equipped with a lane departure prevention apparatus in accordance with a first embodiment of the present invention.

Referring initially to FIG. 1, a schematic structural diagram of a host vehicle is illustrated that is equipped with a lane departure prevention apparatus in accordance with a first embodiment of the present invention. The embodiment is a rear wheel drive vehicle equipped with the lane departure prevention apparatus of the present invention. This rear-wheel-drive vehicle is equipped with an automatic transmission and a conventional differential gear, and with a braking system that allows independent control of braking force at the front and rear wheels and the left and right wheels.

In the diagram of FIG. 1, the host vehicle is basically equipped with a brake pedal 1, a booster 2, a master cylinder 3, a reservoir 4, a pair of front wheels 5FL and 5FR, a pair of rear wheels 5RL and 5RR, a pair of front wheel cylinders 6FL and 6FR, a pair of rear wheel cylinders 6RL and 6RR, a brake hydraulic pressure control unit 7, a controller or driving/braking force control unit 8, an internal combustion engine 9, an automatic transmission 10, a throttle valve 11, a drive torque control unit 12, an imaging unit 13, a navigation device 15, a master cylinder pressure sensor 17, an accelerator depression or throttle aperture opening sensor 17, a torque sensor 18, a steering angle sensor 19, a turn signal switch 20, a steering wheel 21, a pair of front wheel velocity sensors 22FL to 22FR and a pair of rear wheel velocity sensors 22RL to 22RR. This vehicle is also equipped with an alarm device 24 that is preferably an alarm sound output unit. This alarm device 24 is driven by drive signals from the driving/braking control unit 8. The drive timing and so forth of this alarm device 24 will be discussed in detail below.

The driving/braking force control unit 8 preferably includes a microcomputer with a lane departure prevention control program that controls the wheel cylinders 6FL, 6FR, 6RL and 6RR to apply a yaw moment and/or deceleration to the host vehicle as discussed below. In this first embodiment of the present invention, the control for lane departure avoidance by the driving/braking force control unit 8 includes a driving operation detection section that takes into account the intent of the driver by suppressing the yaw moment and/or the deceleration based on the detection of a driving operation. Preferably, in this first embodiment of the present invention, the detection signal from the steering angle sensor 19 which indicates a steering state of the vehicle by the driver constitutes the driving operation detection section of the driving/braking force control unit 8. Of course, other driving detection signals can also constitutes the driving operation detection section of the driving/braking force control unit 8 as will become apparent from the other embodiments disclosed below. For example, in other embodiments of the present invention, the control for lane departure avoidance performs yaw control and deceleration control, such that the amount of deceleration in the deceleration control takes into account the amount of braking operation produced when the driver operates the brakes. The amount of deceleration is then kept to the required minimum in order to reduce the discomfort to the vehicle occupants that is attributable to the yaw moment imparted to the vehicle, which means that departure prevention control can be performed with even less discomfort to the driver, and the durability of the brake pads and other components can be increased. Thus, the detection signal from the master cylinder pressure sensor 17 which indicates a braking state of the vehicle by the driver constitutes the driving operation detection section of the driving/braking force control unit 8. In another embodiment of the present invention, the control for lane departure avoidance can be carried out more suitably according to the driving state of the host vehicle by determining the content of the control for lane departure avoidance according to the acceleration or deceleration of the host vehicle. Thus, a detection signal indicates an acceleration or deceleration state of the vehicle by the driver constitutes the driving operation detection section of the driving/braking force control unit 8.

The driving/braking force control unit 8 can also include other conventional components such as an input interface circuit, an output interface circuit, and storage devices such as a ROM (Read Only Memory) device and a RAM (Random Access Memory) device. The memory circuit stores processing results and control programs such as ones for controlling the braking control operations that are run by the processor circuit. The driving/braking force control unit 8 is operatively coupled to the above mentioned sensors in a conventional manner. The internal RAM of the driving/braking force control unit 8 stores statuses of operational flags and various control data. The internal ROM of the driving/braking force control unit 8 stores the programs and predetermined variables for various operations. The driving/braking force control unit 8 is capable of selectively controlling any number of the components of the host vehicle as needed and/or desired. It will be apparent to those skilled in the art from this disclosure that the precise structure and algorithms for the driving/braking force control unit 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The brake hydraulic pressure control unit 7 preferably includes a microcomputer that is preferably configured and arranged, for example, to carry out anti-skid control and traction control. The brake hydraulic pressure control unit 7 is also configured and arranged to independently control the braking hydraulic pressure of the wheel cylinders 6FL to 6RR. Thus, the brake hydraulic pressure control unit 7 is also configured so as to control the brake hydraulic pressure in accordance with a brake hydraulic pressure command value when the brake hydraulic pressure command value is input from the driving/braking force control unit 8 (described below).

The drive torque control unit 12 preferably includes a microcomputer that is configured and arranged to control the drive torque to the rear wheels 5RL and 5RR, which are the drive wheels, by controlling the operating conditions of the engine 9, the selected gear ratio of the automatic transmission 10, and/or the throttle opening of a throttle valve 11. The drive torque control unit 12 controls the fuel injection amount and the ignition timing, and controls the operating condition of the engine 9 by simultaneously controlling the size of the throttle aperture. With this drive torque control unit 12, the value of the drive torque Tw that is used for control is output to the driving/braking force control unit 8.

The drive torque control unit 12 is also configured to independently control the drive torque of the rear wheels 5RL and 5RR. Thus, the drive torque control unit 12 is also configured to control the drive wheel torque in accordance with a drive torque command value when the drive torque command value is input from the driving/braking force control unit 8.

The imaging unit 13 has a picture processing function and preferably includes a CCD (Charge Coupled Device) camera, for example, and a camera controller as object recognition sensors for detecting the position of the host vehicle within a driving lane in order to evaluate the prevention of driving lane departure by the host vehicle. Thus, the imaging unit 13 is designed to detect the position of the host vehicle in the driving lane in order to detect the lane departure tendency of the host vehicle. The imaging unit 13 is configured to pick up an image with a monocular (single-lens) camera composed of a CCD (Charge Coupled Device) camera, for example. The imaging unit 13 is preferably disposed on the front of the host vehicle.

The camera controller of the imaging unit 13 is preferably configured and arranged to detect white lines or other lane markers, for example, from the imaging picture of the area in front of the host vehicle. Thus, the driving lane is detected based on the detected lane markers. Furthermore, the imaging unit 13 calculates the angle (yaw angle) $\phi$ formed by the driving lane of the host vehicle and the longitudinal axis of the host vehicle, the lateral displacement X from the center of the driving lane, the driving lane curvature $\beta$, the lane width L, and so forth. The imaging unit 13 outputs the calculated yaw angle $\phi$, the calculated lateral displacement X, the calculated driving lane curvature $\beta$, the lane width L, and the like to the driving/braking force control unit 8.

The navigation device 15 is preferably configured and arranged to detect the yaw rate $\phi'$ and the lateral acceleration Xg and/or the longitudinal acceleration Yg generated in the host vehicle. The navigation device 15 outputs the detected lateral acceleration Xg, the detected longitudinal acceleration Yg, and the detected yaw rate $\phi'$ to the driving/braking force control unit 8. The navigation device 15 also outputs road information to the driving/braking force control unit 8.

Preferably, the road information (i.e., host vehicle driving environment) includes information about the type of the road, such as the number of lanes and whether the road is an ordinary road or an expressway.

The master cylinder pressure sensor 17 is preferably configured and arranged to detect the output pressure of the master cylinder 3, that is, the master cylinder hydraulic pressures Pmf and Pmr. Thus, the master cylinder pressure sensor 17 as a braking operation amount detection section for detecting the output pressure of the master cylinder 3 (also referred to as the master cylinder pressure Pm). The accelerator depression or throttle aperture opening sensor 18 is preferably configured and arranged to detect the downward force on the accelerator pedal 1 or the throttle aperture opening size to output a signal indicative of the throttle aperture opening size Acc. The steering angle sensor 19 is preferably configured and arranged to detect the steering angle δ of the steering wheel 21. The turn signal switch 20 is preferably configured and arranged to detect turn signal operation of a turn signal indicator. The wheel velocity sensors 22FL to 22RR are preferably configured and arranged to detect the rotational velocity of the wheels 5FL to 5RR, that is, the so-called wheel velocity Vwi (i=fl, fr, rl, rr).

The alarm device 24 is installed in front of the driver's seat, for providing an alarm to the driver according to an alarm signal AL from the control unit 8 when driving lane departure has been detected. This alarm device 24 houses a speaker for generating a voice or buzzer sound. These detection signals are outputted to the control unit 8.

When there is left or right directionality in the detected driving condition or state data of the host vehicle, the two directions are set such that the left direction is the positive direction. In other words, the yaw rate φ', the longitudinal acceleration Yg, and the yaw angle φ are positive values when turning left, and the lateral displacement X is a positive value when shifting from the center of the driving lane to the left. Also, the longitudinal acceleration Yg is a positive value during acceleration, and is a negative value during deceleration.

Next, a computational processing procedure performed by the driving/braking force control unit 8 for avoiding lane departure will now be described below with reference to FIG. 2. This computational processing is executed by using a timer interrupt at each specific predetermined sampling time interval ΔT, such as every 10 msec for example. Communication processing is not included in the processing shown in FIG. 2, but the information obtained by computational processing is updated and stored in random access memory, and required information is read out from the random access memory when required.

First, in step S1, various kinds of data are read from the above-described sensors, by the driving/braking force control unit 8. More specifically, the following types of data are read: the lateral acceleration Xg, the longitudinal acceleration Yg, the yaw rate φ', and the road information obtained by the navigation device 15; the wheel velocity Vwi; the steering angle δ; the accelerator depression amount or throttle opening aperture size Acc; the master cylinder hydraulic pressures Pmf and Pmr; the turn switch signal WS from the turn signal switch 20; the signal for a hazard switch; the drive torque Tw from the drive torque control unit 12; and the yaw angle φ, the lateral displacement X, and the driving lane curvature β from the imaging unit 13.

The host vehicle velocity V is calculated in step S2. More specifically, the host vehicle velocity V is calculated using Equation (1) as shown below, based on the wheel velocity Vwi read in the above-described step S1.

Next, the processing moves to step S2 where, the host vehicle velocity V is calculated based on the average value of the wheel velocities of the non-driven wheels. In the illustrated embodiment, the host vehicle is driven by the rear wheels, so the host vehicle velocity V is calculated based on the velocities $Vw_{FL}$ and $Vw_{FR}$ of the front left and right wheels 5FL and 5FR. In any case, the host vehicle velocity V is calculated using one of the Equations (1) as shown below, based on the wheel velocity Vwi of the non-driven wheels that was read in the above-described step S1.

$V=(Vwrl+Vwrr)/2$ for front wheel drive, and $V=(Vwfl+Vwfr)/2$ for rear wheel drive  (1)

In Equation (1), the terms Vwfl and Vwfr are the respective wheel velocities of the left and right front wheels, and the terms Vwrl and Vwrr are the respective wheel velocities of the left and right rear wheels. In other words, in Equation (1), the host vehicle velocity V is calculated as the average value of the wheel speed of the driven wheels. In the present embodiment, the host vehicle is driven by the rear wheels, so the host vehicle velocity is calculated from the latter equation, i.e., based on the wheel velocity of the front wheels 5FL and 5FR.

Also, the host vehicle velocity V calculated in this manner is preferably used during normal driving. In other words, when the ABS (Anti-lock Brake System) control or the like is operating, for example, the estimated car body velocity that is estimated in the ABS control is used as the above-described vehicle velocity V. The value being used for the navigation information in the navigation device 15 can also be used as the above-described vehicle velocity V.

Figure 3:
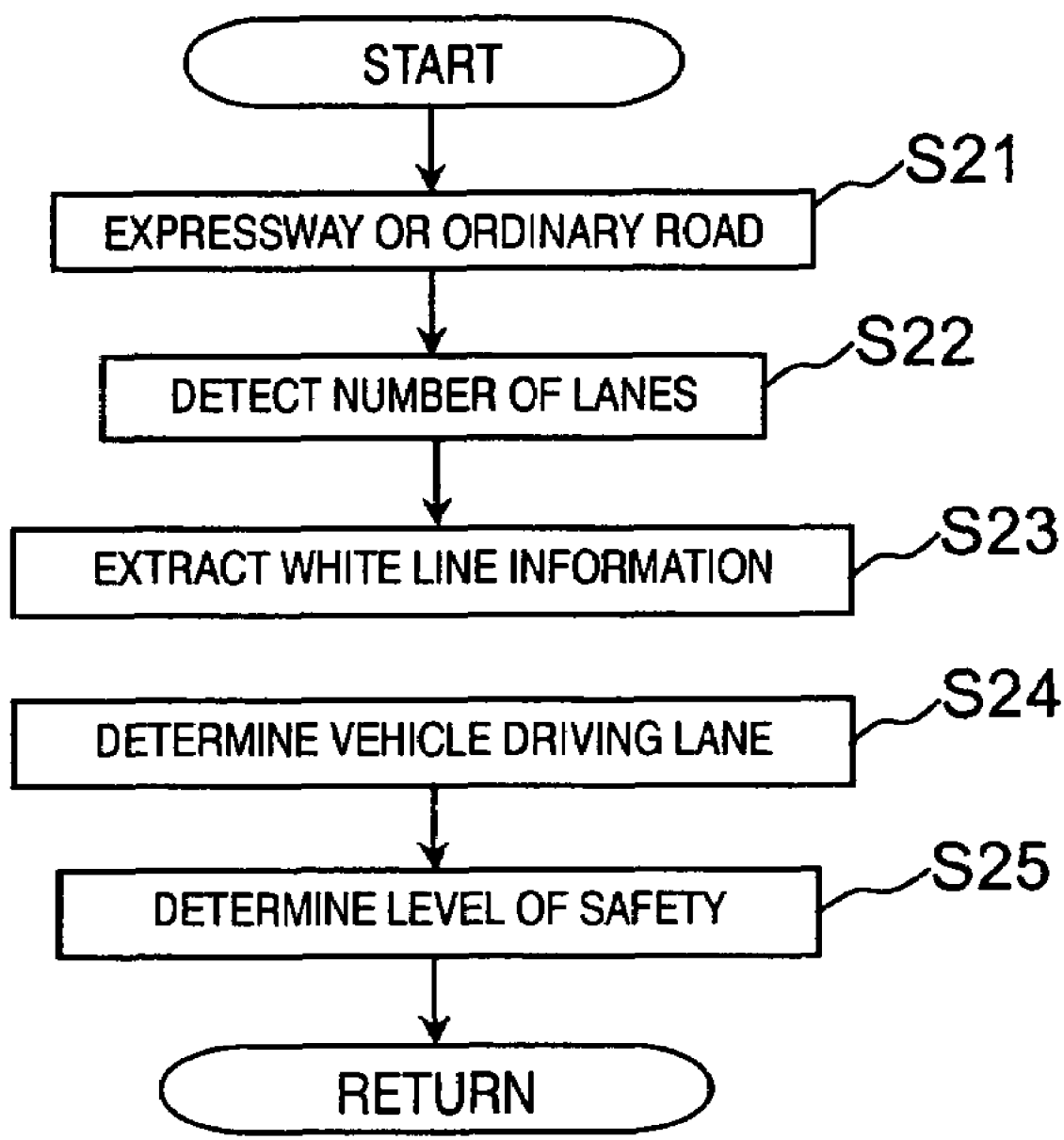
FIG. 3 is a flowchart showing the processing content for determining the driving environment by the driving/braking force control unit.

The host vehicle driving environment is then determined in step S3. More specifically, the type of road on which the host vehicle is traveling and the driving lane of the host vehicle are detected as the driving environment. The direction based on the level of safety is then determined from the detected results. The determination is made based on the video information from the imaging unit 13 and on the road information from the navigation device 15. In other words, the determination of the driving environment is made based on the number of lanes and the road-type information that indicates whether the road is an ordinary road or an expressway. FIG. 3 shows the specific processing procedure for determining the driving environment.

First, in step S21, the type of road (ordinary road or expressway) currently being traveled is acquired from the road information provided by the navigation device 15. Furthermore, in step S22, the number of lanes of the road currently being traveled is acquired from the road information provided by the navigation device 15.

Figure 4:
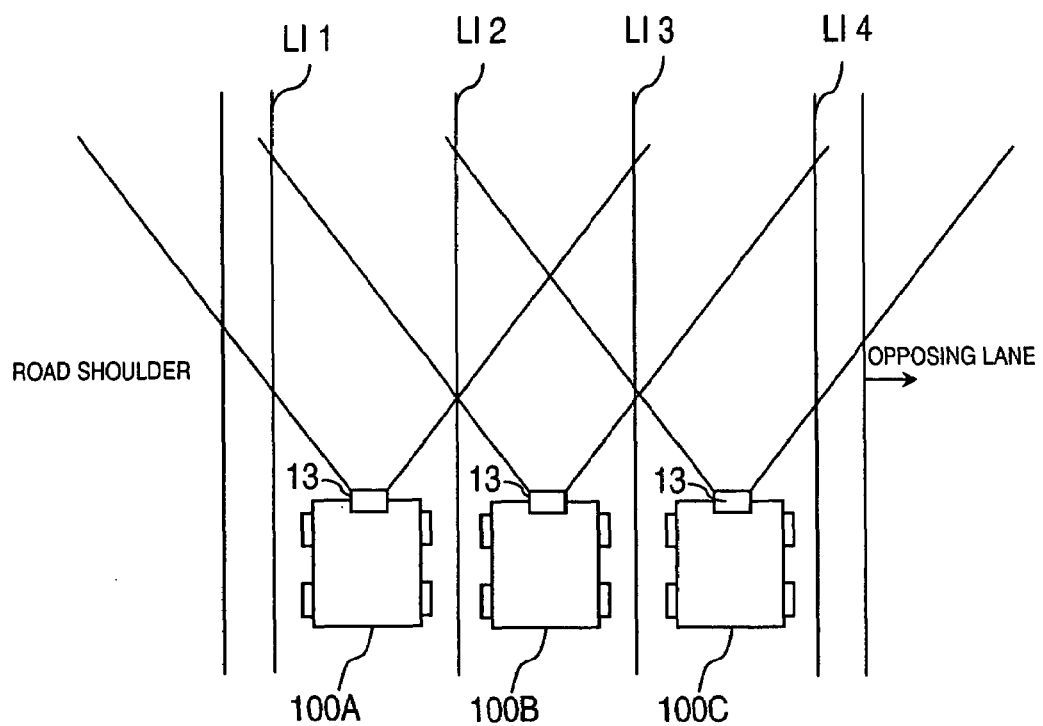
FIG. 4 is a diagram showing vehicles traveling on three-lane, one-way road.

In the subsequent step S23 the white line portion (lane-dividing line portion) is extracted from the imaging picture taken by the imaging unit 13. Here, an example is described for the case in which the host vehicle is traveling along a three-lane, one-way road, as shown in FIG. 4. The road, by being partitioned from the left-hand side by first to fourth white lines LI1, LI2, LI3, and LI4, is configured as a three-lane, one-way road, as shown in FIG. 4. When the host vehicle is traveling along such a road, the imaging picture obtained for each lane is different. Furthermore, a picture composed of white lines extracted from the picture also differs in accordance with the driving lane.

Figure 5:
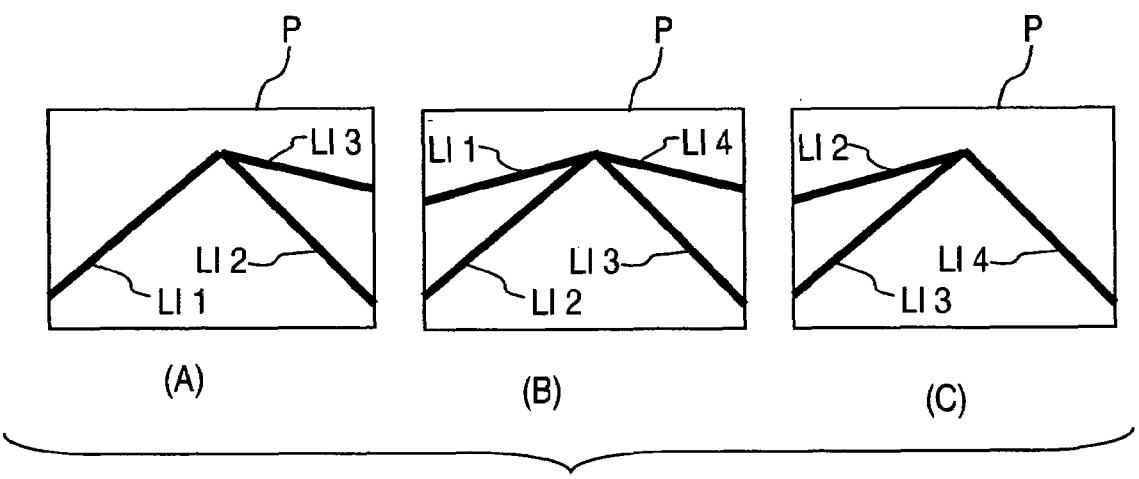
FIG. 5 is a diagram showing the imaging picture taken by the host vehicle in each lane position when the host vehicle is traveling on the three-lane, one-way road.

In other words, when the host vehicle 100A is traveling in the left-hand lane in the traveling direction, the imaging picture P taken by the imaging unit 13 of the host vehicle 100A is a unique picture mainly comprising first, second, and third white lines LI1, LI2, and LI3, as shown in picture (A) of FIG. 5. Also, when the host vehicle 100B is traveling in the center lane, the imaging picture P taken by the imaging unit 13 of the host vehicle 100B is a unique picture mainly comprising first, second, third, and fourth white lines LI1, LI2, LI3, and LI4, as shown in picture (B) of FIG. 5. When the host vehicle 100C is traveling in the right-hand lane in the traveling direction, the imaging picture P taken by the imaging unit 13 of the host vehicle 100C is a unique picture mainly comprising second, third, and fourth white lines LI2, LI3, and LI4, as shown in picture (C) of FIG. 5. Thus, the configuration of the white lines in the picture differs in accordance with the driving lane.

The host vehicle driving lane is determined in the subsequent step S24. More specifically, the host vehicle driving lane is determined based on the information obtained in steps S22 and S23. In other words, the host vehicle driving lane is determined based on the number of lanes in the road currently being traveled by the host vehicle and the imaging picture (picture with the white lines extracted) taken by the imaging unit 13. For example, the picture obtained in accordance with the number of lanes and the driving lane is stored in advance as picture data, the picture data prepared in advance is compared with the number of lanes in the road currently being traveled by the host vehicle and the current imaging picture (picture with the white lines extracted) taken by the imaging unit 13, and the host vehicle driving lane is determined.

The level of safety in the transverse direction viewed from the lane in which the host vehicle is driving is determined in the subsequent step S25. More specifically, the direction in which the level of safety is low is stored as information when the host vehicle has departed from the lane. Therefore, when the level of safety is low in the left-hand direction, as viewed from lane in which the host vehicle is traveling, this direction is stored as the direction (hereinafter referred to as "the obstacle-containing direction") $S_{out}$ in which the level of safety is low ($S_{out}$=left). When the level of safety is low in the right-hand direction, as viewed from lane in which the host vehicle is traveling, this direction is stored as the obstacle-containing direction $S_{out}$ ($S_{out}$=right). This is determined as follows, for example.

In FIG. 4, for example, when the host vehicle 100A is traveling in the left-hand lane, the level of safety is lower when the host vehicle departs in the left-hand direction from the left-hand lane than when the host vehicle departs in the right-hand direction from the left-hand lane. This is because the road shoulder is in the left-hand direction from the left-hand lane, and there is a high possibility that the road shoulder is a wall, guardrail, obstacle, or cliff something similar will be present on the road shoulder. This means that when the lane departure is to the left from the left lane, that is, toward the shoulder, there is a higher probability that the host vehicle 100A and these objects will come into contact, etc. Hence, when the host vehicle 100A is traveling in the left-hand lane, it is determined that the left-hand direction is the obstacle-containing direction $S_{out}$ ($S_{out}$=left).

When the host vehicle 100B is traveling in the center lane, the level of safety is the same in both the left and right directions with respect to the current driving lane because the host vehicle 100B would still be on the road were departure to occur in either direction.

When the host vehicle 100C is traveling in the right-hand lane, the level of safety is lower when the host vehicle departs in the right-hand direction, to the opposing lane than when the host vehicle departs in the left-hand direction to the neighboring lane. Hence, in this case, when the host vehicle 100C is traveling in the right-hand lane, it is determined that the right-hand direction is the obstacle-containing direction $S_{out}$ ($S_{out}$=right).

In comparison with expressways, ordinary roads have a narrower road shoulder width, there are many obstacles on the road shoulder, and pedestrians are also present. For this reason, the level of safety is lower for departure toward the road shoulder on an ordinary road than when the host vehicle departs toward the road shoulder on an expressway.

Comparing the number of lanes, the level of safety is lower when the left-hand direction is the road shoulder, and one side of the road is a single lane in which the right-hand direction is the opposing lane. In this case, it is determined that both the left and right directions are an obstacle-containing direction $S_{out}$ ($S_{out}$=both).

Most two-lane, two-way roads, for example, do not have a median strip, a guardrail or another divider, so the imaging picture when the host vehicle is traveling on the two-lane, two-way road is one such as that shown in the picture (A) of FIG. 5 for countries that drive on the left side of the road and such as that shown in the picture (C) of FIG. 5 for countries that drive on the right side of the road. In other words, the imaging picture when the host vehicle is traveling on a two-lane, two-way road is the same imaging picture taken by the imaging unit 13 of the host vehicle 100A traveling in the left-hand lane of a three-lane (one-way) road for countries that drive on the left side of the road. Hence, assuming that both ordinary roads and expressways are traveled, the obstacle-containing direction $S_{out}$ cannot be determined solely by using an imaging picture. Based on this fact, the number of lanes in the road on which the host vehicle is currently traveling is obtained from the navigation device 15, and by making a determination as to whether the road currently being traveled is two-lane, two-way road or a three-lane, one-way road, it can be determined that the level of safety is low in the right-hand direction as well when a two-lane, two-way road is being traveled.

Figure 2:
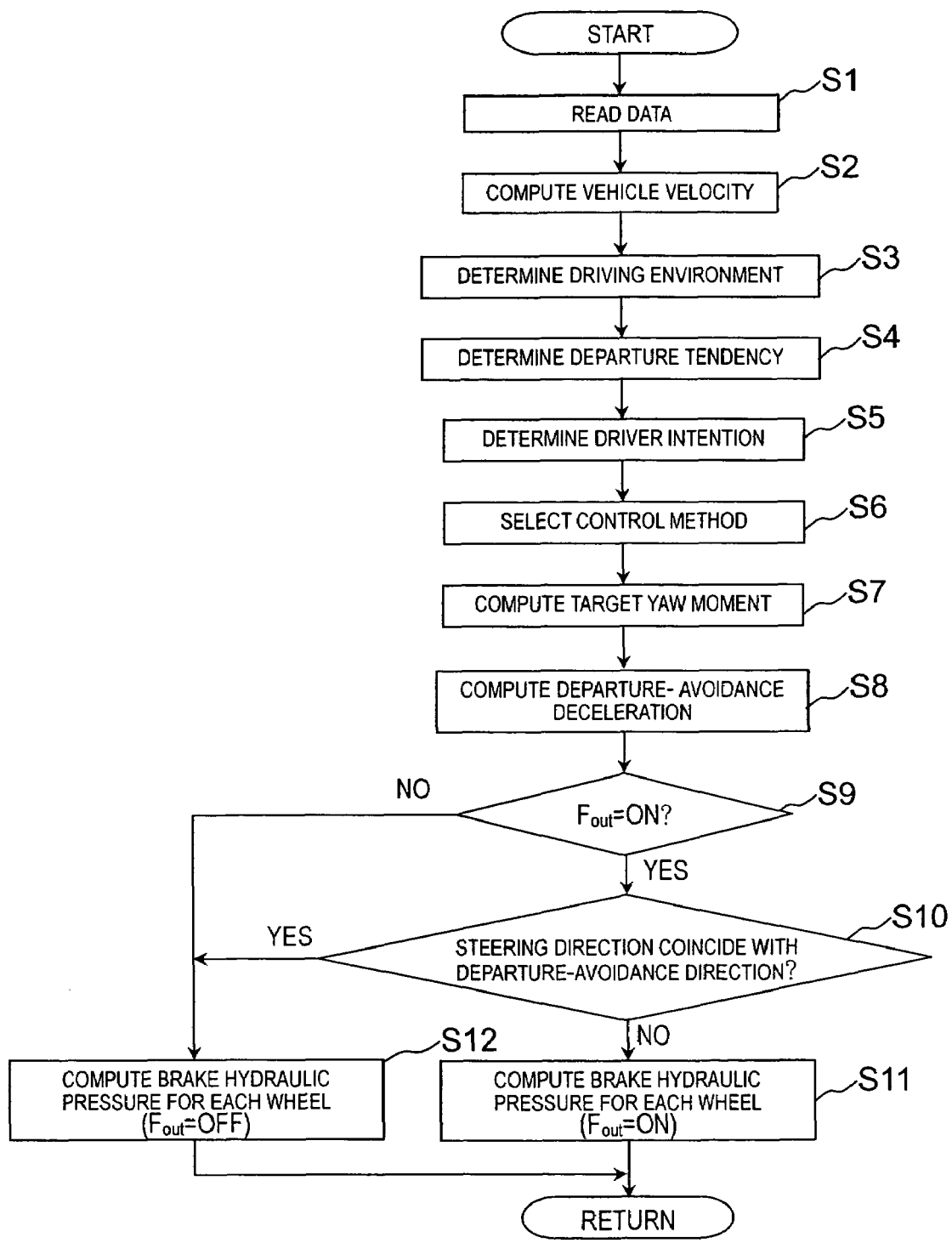
FIG. 2 is a flowchart showing the processing content of the driving/braking force control unit comprising the lane departure prevention apparatus.

The evaluation of the driving environment in step S3 shown in FIG. 2 is performed with the processing procedure shown in FIG. 3 described above.

Figure 6:
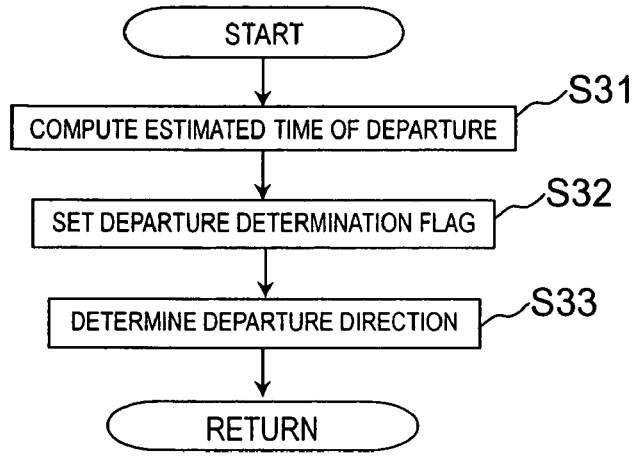
FIG. 6 is a flowchart showing the processing content for determining the lane departure tendency by the driving/braking force control unit.

The lane departure tendency is then determined in step S4. The processing procedure for this determination is specifically shown in FIG. 6.

First, the estimated time of departure $T_{out}$ is calculated in step S31. More specifically, the estimated time of departure $T_{out}$ is calculated with Equation (2) shown below by designating dx as the amount of variation (amount of variation per unit time) of the lateral displacement X, designating L as the lane width, and using the lateral displacement X (see, FIG. 7 for the values of X, dx, and L).

$$T_{out}=(L/2-X)/dx \qquad (2)$$

The estimated time of departure $T_{out}$ until the host vehicle 100 laterally displaced by an amount equal to the lateral displacement X from the center of the lane (X=0) arrives at an externally positioned area (road shoulder, for example) separated by an amount equal to the distance L/2 from the center of the lane can be computed with Equation (2). The lane width L is obtained from the imaging picture processed by the imaging unit 13. The position of the host vehicle can also be obtained from the navigation device 15, and the lane width L can be obtained from the map data stored in the navigation device 15.

The lane departure determination flag is set in the subsequent step S32. More specifically, the estimated time of departure $T_{out}$ is compared with a predetermined first departure-determining threshold Ts. Here, when the host vehicle moves away from the center of the lane and when the estimated time of departure $T_{out}$ is less than the first departure-determining threshold Ts ($T_{out}$<Ts), the lane departure determination flag $F_{out}$ is switched ON ($F_{out}$=ON) by the processing of step S32. In other words, it is determined that lane departure will occur (lane departure tendency exists), and the lane departure determination flag $F_{out}$ is set to ON ($F_{out}$=ON). When the host vehicle is in a state in which $F_{out}$=ON and returns to the center side of the lane, then the estimated time of departure $T_{out}$ is equal to or greater than the first departure-determining threshold Ts ($T_{out}$≧Ts), and the lane departure determination flag $F_{out}$ is switched OFF ($F_{out}$=OFF). In other words, it is determined that departure will not occur (departure tendency does not exist) when the estimated time of departure $T_{out}$ is equal to or greater than the first departure-determining threshold Ts ($T_{out}$≧Ts). When a lane departure tendency exists and, for example, if braking control (described hereinafter) is performed for avoiding lane departure, or if the driver himself takes evasive actions, then the lane departure determination flag $F_{out}$ is switched from ON to OFF.

The first departure-determining threshold Ts is variable. In other words, the first departure-determining threshold Ts can also be set, for example, based on the level of safety obtained in step S3.

The lane departure direction $D_{out}$ is subsequently determined based on the lateral displacement X in the step S33. More specifically, when the host vehicle is laterally displaced from the center of the lane in the left-hand direction, then that direction is set as the lane departure direction $D_{out}$ ($D_{out}$=left). When the host vehicle is laterally displaced from the center of the lane in the right-hand direction, then that direction is set as the lane departure direction $D_{out}$ ($D_{out}$=right).

The lane departure tendency is determined in step S4 as discussed above.

The intention of the driver to change lanes is determined in the subsequent step S5. More specifically, the intention of the driver to change lanes is determined as follows based on the steering angle δ and/or the turn switch signal obtained in step S1.

When the direction indicated by the turn switch signal (lighted blinker side) and the direction indicated by departure direction $D_{out}$ obtained in step S4 are the same, it is determined that the driver is intentionally changing lanes, and the lane departure determination flag $F_{out}$ is changed to OFF ($F_{out}$=OFF). That is, the determination result is changed to indicate that no departure is imminent.

When the direction (lighted blinker side) indicated by the turn switch signal and the direction indicated by the lane departure direction $D_{out}$ obtained in step S4 are the same, it is determined that the driver is intentionally changing lanes, and the lane departure determination flag $F_{out}$ is changed to OFF ($F_{out}$=OFF). In other words, the determination result is changed, indicating that departure will not occur or no departure is imminent.

When the direction (lighted blinker side) indicated by the turn switch signal and the direction indicated by departure direction $D_{out}$ obtained in step S4 are different, the lane departure determination flag $F_{out}$ is maintained, and the lane departure determination flag $F_{out}$ is left ON ($F_{out}$=ON). In other words, the determination result is maintained, indicating that departure will occur or is imminent.

When the turn signal switch 20 has not been operated, the driver intention to change lanes is determined based on the steering angle δ. In other words, in the case that the driver steers in the lane departure direction, it is determined that the driver is intentionally changing lanes when the steering angle δ and the amount of variation Δδ (amount of variation per unit time) in the steering angle are equal to or greater than a set value, and the lane departure determination flag $F_{out}$ is changed to OFF ($F_{out}$=OFF).

The control method for departure avoidance is selected in the subsequent step S6. More specifically, a determination is made as to whether or not to issue a lane departure alarm and/or to perform departure-avoiding braking control. The braking control method is selected when the lane departure-avoiding braking control is performed.

Here, the content of the control for lane departure avoidance is determined on the basis of the longitudinal acceleration Yg obtained in step S1 above, the first obstacle-containing direction $S_{out}$ obtained in step S3, the lane departure direction $D_{out}$ obtained in step S4, and the lane departure determination flag $F_{out}$ obtained in step S5.

For instance, a lane departure alarm or warning is actuated if the lane departure determination flag $F_{out}$ is ON ($T_{out}$<Ts) when it can be determined that lane departure can be prevented by the driver performing a steering operation or the like. In other words, a warning is sounded from the alarm device 24, for example, in accordance with the ON and OFF state of the lane departure determination flag $F_{out}$ obtained in step S5. The alarm or warning is performed by sound, a display, or the like. If the lane departure determination flag $F_{out}$ is ON ($T_{out}$<Ts), the control method to be used for departure avoidance is decided on the basis of the longitudinal acceleration Yg, the first obstacle-containing direction $S_{out}$, and the lane departure direction $D_{out}$. This is discussed in detail below.

As described herein, situations exist in which the lane departure determination flag $F_{out}$ is ON ($T_{out}$<Ts) but it can nevertheless be determined that lane departure can be prevented by the driver performing a steering operation or the like. For example, those situations include ones in which the driver himself realizes the lane departure tendency of the host vehicle, and then takes evasive actions, but the lane departure determination flag $F_{out}$ itself is still ON ($T_{out}$<Ts).

In the case that the lane departure determination flag $F_{out}$ is ON ($T_{out}$<Ts), the braking control method is also selected based on the obstacle-containing direction $S_{out}$ obtained in step S3 and the lane departure direction $D_{out}$ obtained in step S4. The procedure is described in detail hereinafter.

The target yaw moment generated in the host vehicle is calculated in the subsequent step S7. This target yaw moment is a yaw moment imparted to the host vehicle for departure avoidance. More specifically, the target yaw moment Ms is calculated with Equation (3) below based on the amount of variation dx and the lateral displacement X obtained in step S1.

$$Ms = K1 \cdot X + K2 \cdot dx \qquad (3)$$

Figure 8:
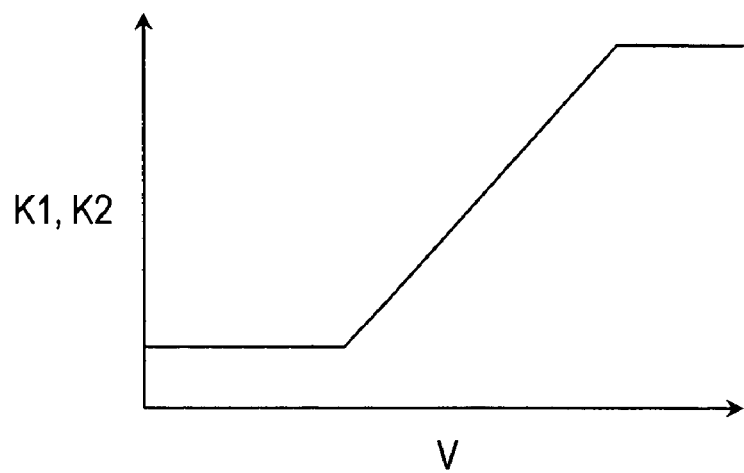
FIG. 8 is a characteristics diagram or map showing the characteristics of gains K1 and K2 that are used for calculating the yaw moment Ms.

In Equation (3), the terms K1 and K2 are the gains that vary or fluctuate in accordance with the host vehicle velocity V. For example, in FIG. 8, the gains K1 and K2 have lower values at low speeds, increase in a corresponding relationship with the host vehicle velocity V when the host vehicle velocity V reaches a certain value, and remain constant thereafter when a certain vehicle velocity V is reached.

The lane departure-avoiding deceleration is calculated in the subsequent step S8. In other words, the braking force applied to both the left and right wheels is calculated with the aim of decelerating the host vehicle. Here, such a braking force is calculated as target brake hydraulic pressures Pgf and Pgr applied to both the left and right wheels. The target brake hydraulic pressure Pgf for the front wheels is calculated with Equation (4) below.

$$Pgf = Kgv \cdot V + Kgx \cdot dx \tag{4}$$

Figure 9:
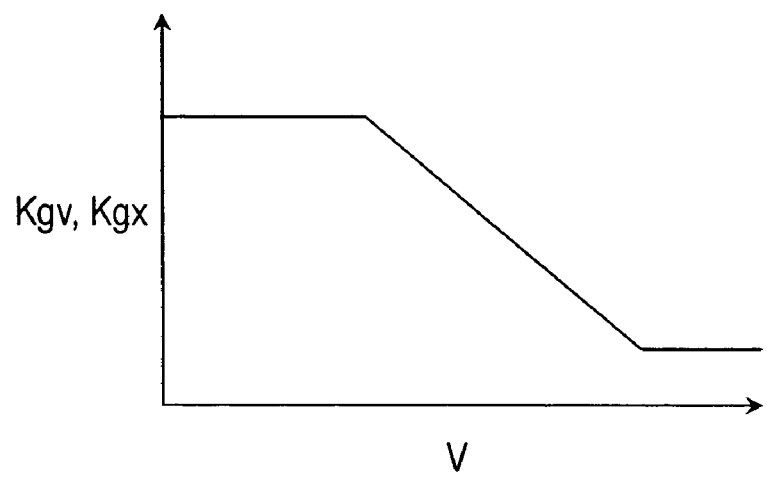
FIG. 9 is a characteristics diagram or map showing the characteristics of conversion factors Kgv and Kgx that are used for calculating the target brake hydraulic pressure Pgf.

In Equation (4), the terms Kgv and Kgx are conversion factors for converting the braking force into brake hydraulic pressure. The conversion factors Kgv and Kgx are respectively set based on the host vehicle velocity V and the amount of variation dx. For example, in FIG. 9 the conversion factors Kgv and Kgx have higher values at low speeds, decrease in a corresponding relationship with the host vehicle velocity V when the host vehicle velocity V reaches a certain value, and remain constant thereafter when a certain vehicle velocity V is reached.

The target brake hydraulic pressure Pgr is calculated for the rear wheels based on the target brake hydraulic pressure Pgf for the front wheels while taking the front and rear braking distribution into consideration.

The deceleration (more specifically, the target brake hydraulic pressure Pgf and Pgr) for departure avoidance is obtained in this manner in step S8.

It is then determined in step S9 whether or not the lane departure determination flag $F_{out}$ is ON. When the lane departure determination flag $F_{out}$ is ON, the processing moves on to step S10, but if the lane departure determination flag $F_{out}$ is OFF, the processing continues to step S12.

The steering direction is determined in step S10. Specifically, it is determined whether or not the steering direction coincides with the lane departure avoidance direction. The lane departure avoidance direction here is the direction for avoiding lane departure in the lane departure direction obtained in step S4, that is, the anti-departure direction. The steering direction is obtained on the basis of the steering angle δ obtained in step S1.

Here, if the steering direction coincides with the lane departure avoidance direction, the processing continues on to step S12, but if the steering direction does not coincide with the lane departure avoidance direction, the processing continues to step S11.

The target brake hydraulic pressure for each wheel is calculated in the steps S11 and S12. In other words, the final brake hydraulic pressure is calculated based on the presence of departure-avoiding braking control. More specifically, the calculation is performed in the following manner.

First, in step S12, if the lane departure determination flag $F_{out}$ is OFF ($F_{out}$=OFF), i.e., when it is determined that departure will not occur, then the target brake hydraulic pressure Psi (i=fl, fr, rl, rr) for each wheel is set as the master cylinder hydraulic pressure Pmf or Pmr, as shown in Equations (5) and (6) below.

$$Psfl = Psfr = Pmf \tag{5}$$

$$Psrl = Psrr = Pmr \tag{6}$$

In Equations (5) and (6), the term Pmf is the master cylinder hydraulic pressure for the front wheels, while the term Pmr is the master cylinder hydraulic pressure for the rear wheels. The rear wheel master cylinder hydraulic pressure Pmr is a value calculated based on the master cylinder hydraulic pressure Pmf for the front wheels while taking the front and rear braking distribution into consideration.

When the lane departure determination flag $F_{out}$ is ON ($F_{out}$=ON), i.e., when it is determined that departure will occur, the front wheel target brake hydraulic pressure difference ΔPsf and the rear wheel target brake hydraulic pressure difference ΔPsr are first calculated based on the target yaw moment Ms. More specifically, the target brake hydraulic pressure differences ΔPsf and ΔPsr are calculated with Equations (7) to (10) below.

When Ms<Ms1, then $$\Delta Psf = 0 \tag{7}$$

$$\Delta Psr = 2 \cdot Kbr \cdot Ms / T \tag{8}$$

When Ms≧Ms1, then $$\Delta Psf = 2 \cdot Kbf \cdot (Ms - Ms1) / T \tag{9}$$

$$\Delta Psr = 2 \cdot Kbr \cdot Ms1 / T \tag{10}$$

In Equations (7) to (10), the term Ms1 is the threshold used for setting purposes, while the term T is the tread. The tread T is the same value for simplicity. The terms Kbf, and Kbr are conversion factors for the front and rear wheels when the braking force is converted to brake hydraulic pressure, and are set according to brake parameters or specifications.

The braking force applied to the wheels is thus distributed in accordance with the magnitude of the target yaw moment Ms. That is to say, when the target yaw moment Ms is less than the threshold Ms1 used for setting purposes, the front wheel target brake hydraulic pressure difference ΔPsf is set to 0, a predetermined value is assigned to the rear wheel target brake hydraulic pressure difference ΔPsr, and the braking force difference is generated in the left and right rear wheels. When the target yaw moment Ms is equal to or greater than the threshold Ms1 used for setting purposes, a predetermined value is assigned to the target brake hydraulic force differences ΔPsf and ΔPsr, and the braking force difference is generated in the front and rear left and right wheels.

When the lane departure determination flag $F_{out}$ is ON ($F_{out}$=ON), the final target brake hydraulic pressure Psi (i=,fl, fr, rl, rr) for each wheel is calculated using the target brake hydraulic pressure differences ΔPsf and ΔPsr and the target brake hydraulic pressures Pgf and Pgr calculated as described above. More specifically, the final target brake hydraulic pressure Psi (i=fl, fr, rl, rr) for each wheel is calculated based on the braking control method selected in step S6.

The braking control method selected in step S6 will now be described.

In step S6, when the lane departure determination flag $F_{out}$ is ON, the braking control method is selected based on the obstacle-containing direction $S_{out}$ and the lane departure direction $D_{out}$. First, the braking control method selected based on the obstacle-containing direction $S_{out}$ and the lane departure direction $D_{out}$ when the lane departure determination flag $F_{out}$ is ON will be described below for various relationships between the obstacle-containing direction $S_{out}$ and the lane departure direction $D_{out}$ (first to third cases or scenarios).

First Scenario

In the first scenario or case, when the obstacle-containing direction $S_{out}$ and the lane departure direction $D_{out}$ do not match, the braking control (hereinafter referred to as "departure-avoiding yaw control") is carried out so that a yaw moment is imparted to the host vehicle for avoiding departure until the lane departure determination flag $F_{out}$ is OFF.

Here, the magnitude of the yaw moment imparted to the host vehicle in order to avoid departure is the target yaw moment Ms. The yaw moment is imparted to the host vehicle by creating a difference in the braking force applied to the left and right wheels. More specifically, when the target yaw moment Ms is less than the threshold Ms1 used for setting purposes, a braking force difference is generated in the left and right rear wheels to impart the target yaw moment Ms to the host vehicle. When the target yaw moment Ms is equal to or greater than the threshold Ms1 used for setting purposes, a braking force difference is generated in the front and rear left and right wheels to impart the target yaw moment Ms to the host vehicle, as described above.

The lane departure determination flag $F_{out}$ is switched from ON to OFF in cases in which departure-avoiding braking control has been carried out or the driver himself has taken evasive actions when there is a lane departure tendency.

Second Scenario

In the second scenario or case, when there is a match between the obstacle-containing direction $S_{out}$ and the lane departure direction $D_{out}$, and the road type R obtained in step S3 is an ordinary road, the lane departure-avoiding yaw control is carried out until the lane departure determination flag $F_{out}$ is OFF.

Furthermore, the second departure-determining threshold Tr, which is less than the first departure-determining threshold Ts (Ts>Tr>0), is defined. When the estimated time of departure $T_{out}$ becomes less than the second departure-determining threshold Tr ($T_{out}$<Tr), the lane departure-avoiding yaw control is applied, and the braking control for decelerating the host vehicle (hereinafter referred to as "departure-avoiding deceleration control") is carried out. The lane departure-avoiding deceleration control is carried out so as to provide substantially equal braking force to both the left and right wheels.

Here, the estimated time of departure $T_{out}$ is an indicator of the magnitude of the lane departure tendency, so an estimated time of departure that is less than the second departure-determining threshold Tr corresponds to the lane departure tendency being greater than the second threshold.

Third Scenario

In the third scenario or case, when there is a match between the obstacle-containing direction $S_{out}$ and the lane departure direction $D_{out}$, and the road type R obtained in step S3 is an expressway, the lane departure-avoiding yaw control is carried out until the lane departure determination flag $F_{out}$ is OFF.

Furthermore, in this third case, when the estimated time of departure $T_{out}$ has reached 0, the lane departure-avoiding yaw control is applied, and the lane departure-avoiding deceleration control is carried out.

In the third case, the lane departure-avoiding deceleration control can also be carried out when the estimated time of departure $T_{out}$ has become less than the second departure-determining threshold Tr, in the same manner as in the second case. In this case, when the estimated time of departure $T_{out}$ becomes 0, for example, the deceleration of the host vehicle is increased by departure-avoiding deceleration control. Therefore, the lane departure-avoiding deceleration control is configured so as to be actuated when the estimated time of departure $T_{out}$ has become less than the second departure-determining threshold Tr, and when the estimated time of departure $T_{out}$ becomes 0. When the estimated time of departure $T_{out}$ becomes 0 in this case, the deceleration of the host vehicle is further increased.

The braking control methods are selected in step S6 in accordance with the obstacle-containing direction $S_{out}$ and the lane departure direction $D_{out}$ in this manner. In other words, the braking control method for departure avoidance is selected by departure-avoiding yaw control alone or by a combination of the lane departure-avoiding yaw control and the lane departure-avoiding deceleration control in accordance with the obstacle-containing direction $S_{out}$ and the lane departure direction $D_{out}$, and/or in accordance with the host vehicle velocity V and the estimated time of departure $T_{out}$.

The target brake hydraulic pressure Psi (i=fl, fr, rl, rr) for each wheel is calculated in step S11 in accordance with each type of braking control method.

In the lane departure-avoiding yaw control for the first to third cases, for example, the target brake hydraulic pressure Psi (i=fl, fr, rl, rr) for each wheel is calculated with Equations (11) below.

$Psfl=Pmf$ $Psfr=Pmf+\Delta Psf$ $Psrl=Pmr$ $Psrr=Pmr+\Delta Psr$ (11)

The lane departure-avoiding yaw control and the lane departure-avoiding deceleration control are carried out in the second and third cases, but in this case the target brake hydraulic pressure Psi (i=fl, fr, rl, rr) for each wheel is calculated with Equations (12) below.

$Psfl=Pmf+Pgf/2$ $Psfr=Pmf+\Delta Psf+Pgf/2$ $Psrl=Pmr+Pgr/2$ $Psrr=Pmr+\Delta Psr+Pgr/2$ (12)

Also, the target brake hydraulic pressure Psi (i=fl, fr, rl, rr) for each wheel is calculated with reference to the deceleration action taken by the driver. In other words, the master cylinder hydraulic pressures Pmf and Pmr are applied, as shown in Equations (11) and (12).

The above describes the processing for step S11. Thus, the target brake hydraulic pressure Psi (i=fl, fr, rl, rr) for each wheel is calculated based on the state of the lane departure determination flag $F_{out}$ in this step S11 or the above-mentioned step S12. When the lane departure determination flag $F_{out}$ is ON, the target brake hydraulic pressure Psi (i=fl, fr, rl, rr) for each wheel is calculated in accordance with the braking control method selected in step S6 in response to the relationship between the first obstacle-containing direction $S_{out}$ and the value of the lane departure direction $D_{out}$.

The above is the computational processing performed by the driving/braking force control unit 8. The driving/braking force control unit 8 outputs the target brake hydraulic pressure Psi (i=fl, fr, rl, rr) calculated for each wheel in step S9 to the brake hydraulic pressure control unit 7 as a brake hydraulic pressure command value.

Described above is the computational processing performed by the driving/braking force control unit 8. With the driving/braking force control unit 8, the target brake hydraulic pressure Psi (i=fl, fr, rl, rr) calculated for each wheel in step S11 or step S12 is output to the brake hydraulic pressure control unit 7 as a brake hydraulic pressure command value.

The lane departure prevention apparatus described above operates according to the following overview.

First, various kinds of data are read from the sensors, the controllers, and the control units (step S1). Next, the vehicle speed V is then calculated (step S2).

The driving environment is then evaluated and the direction in which the safety level is relatively lowest (first obstacle-containing direction $S_{out}$) is determined (step S3, FIG. 3). For example, if the host vehicle 100A is traveling in the left lane in FIG. 4, the obstacle-containing direction $S_{out}$ used as the left-hand direction.

Figure 7:
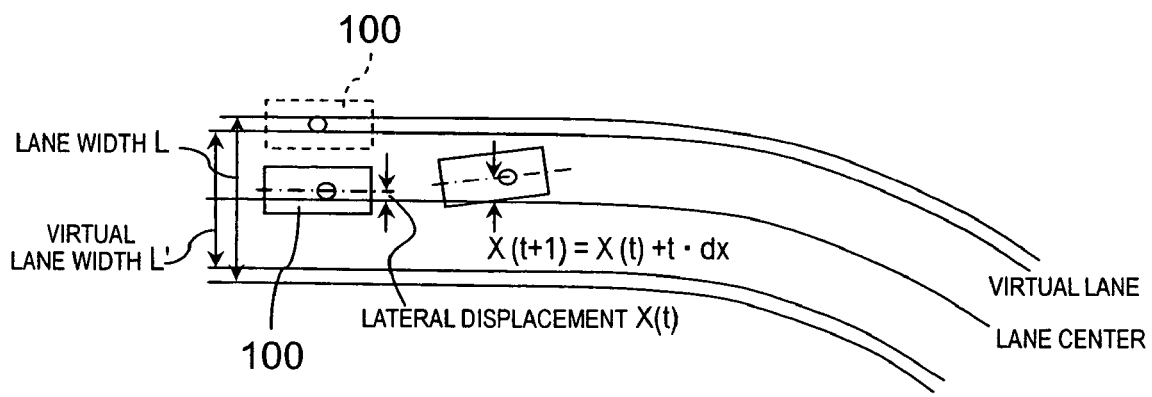
FIG. 7 is a diagram used for describing the anticipated or estimated time of departure $T_{out}$.

In step S4, the lane departure determination flag $F_{out}$ is set based on the estimated time of departure $T_{out}$, and the lane departure direction $D_{out}$ is determined based on the lateral displacement X (see FIG. 7).

Furthermore, the driver's intention to change lanes is determined based on the lane departure direction $D_{out}$ obtained in this manner and on the direction (lighted blinker side) indicated by the turn signal switch 20 (step S5).

For example, when the direction (lighted blinker side) indicated by the turn switch signal and the direction indicated by the lane departure direction $D_{out}$ are the same, it is determined that the driver is intentionally changing lanes. In this case, the lane departure determination flag $F_{out}$ is changed to OFF.

When the direction (lighted blinker side) indicated by the turn switch signal and the direction indicated by the lane departure direction $D_{out}$ are different, the lane departure determination flag $F_{out}$ is kept unchanged in the case that it is ON. The reason is that when the direction (lighted blinker side) indicated by the turn switch signal and the direction indicated by the lane departure direction $D_{out}$ are different, the lane departure behavior of the host vehicle may be due to factors other than the driver's intention to change lanes or the like, so the condition of the lane departure determination flag $F_{out}$ is kept unchanged when the flag is ON.

The start of an alarm for departure avoidance, the presence or absence of the lane departure-avoiding braking control, and the method for carrying out departure-avoiding braking control are selected based on the lane departure determination flag $F_{out}$, the obstacle-containing direction $S_{out}$, and the lane departure direction $D_{out}$ (step S6).

Furthermore, the target yaw moment Ms is calculated based on the lateral displacement X and the variation amount dx (step S7), and lane departure-avoiding deceleration is also calculated (step S8).

The target brake hydraulic pressure Psi (i=fl, fr, rl, rr) applied to each wheel is calculated for carrying out the braking control method selected based on the lane departure determination flag $F_{out}$, the obstacle-containing direction $S_{out}$, and the lane departure direction $D_{out}$ (steps S9 to S 12).

Specifically, the target brake hydraulic pressure Psi (i=fl, fr, rl, rr) at each wheel is set to the master cylinder hydraulic pressure Pmf or Pmr when the lane departure determination flag $F_{out}$ is OFF, or when the lane departure determination flag $F_{out}$ is ON but the steering direction coincides with the lane departure-avoidance direction (steps S9, S10, and S12). The target brake hydraulic pressure Psi (i=fl, fr, rl, rr) at each wheel for carrying out the braking control method determined on the basis of the first obstacle-containing direction $S_{out}$ and the lane departure direction $D_{out}$ is calculated when the lane departure determination flag $F_{out}$ is ON and the steering direction does not coincide with the lane departure-avoidance direction (steps S9 to S11).

The target brake hydraulic pressure Psi (i=fl, fr, rl, rr) is output to the brake hydraulic pressure control unit 7 as a brake hydraulic pressure command value (steps S11 or S12). In the brake hydraulic pressure control unit 7, the brake hydraulic pressure is individually controlled for the wheel cylinders 6FL to 6RR based on the brake hydraulic pressure command value. Therefore, the configuration is such that when there is a lane departure tendency, a predetermined vehicle behavior is exhibited in accordance with the driving environment.

Figure 10:
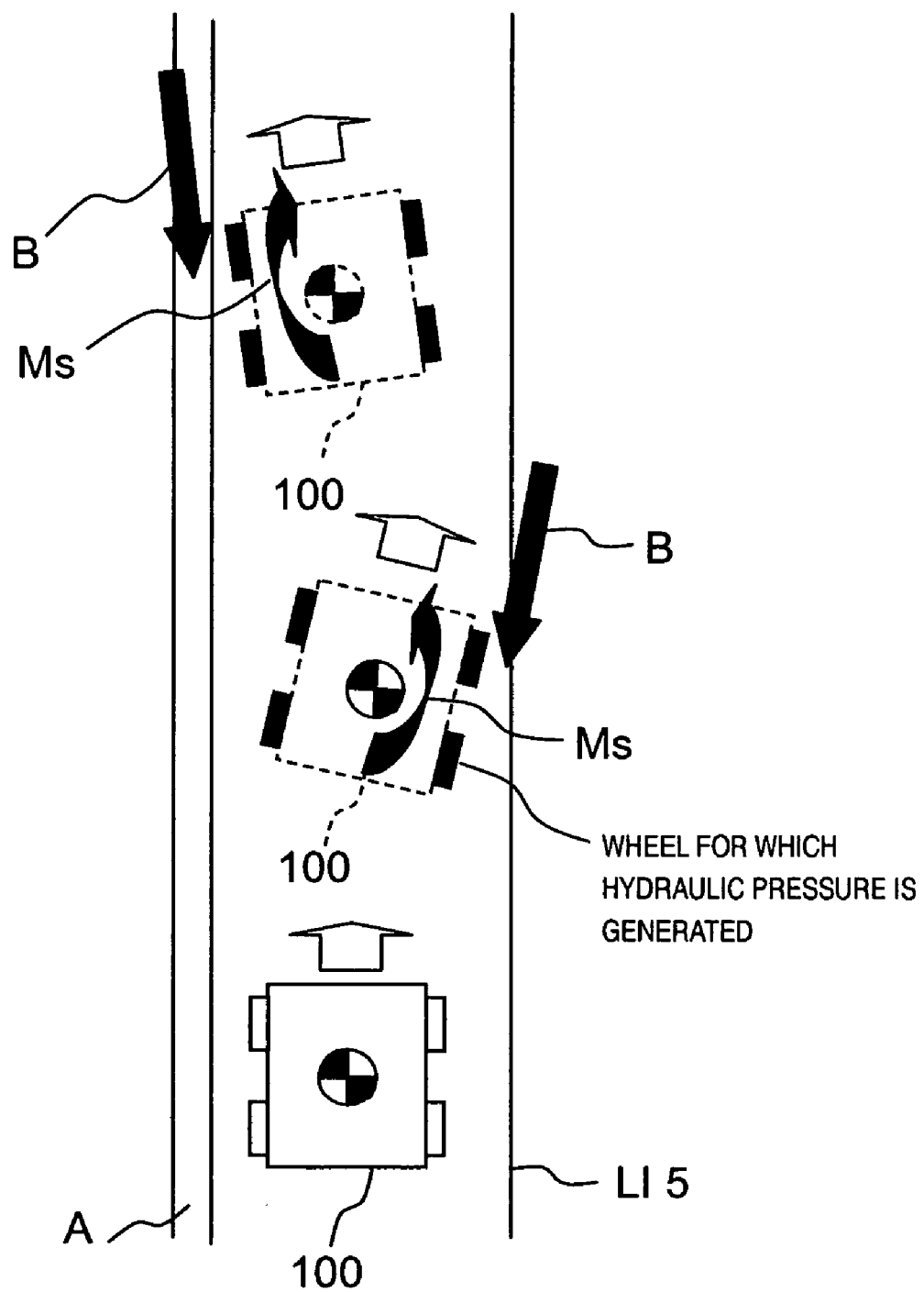
FIG. 10 is a diagram used for describing the braking control method in the second case or scenario.

Here, the manner in which the host vehicle behaves when braking control is carried out is described for the first to third scenarios or cases with reference to FIGS. 10 (second case) and 11 (first and third cases).

Figure 11:
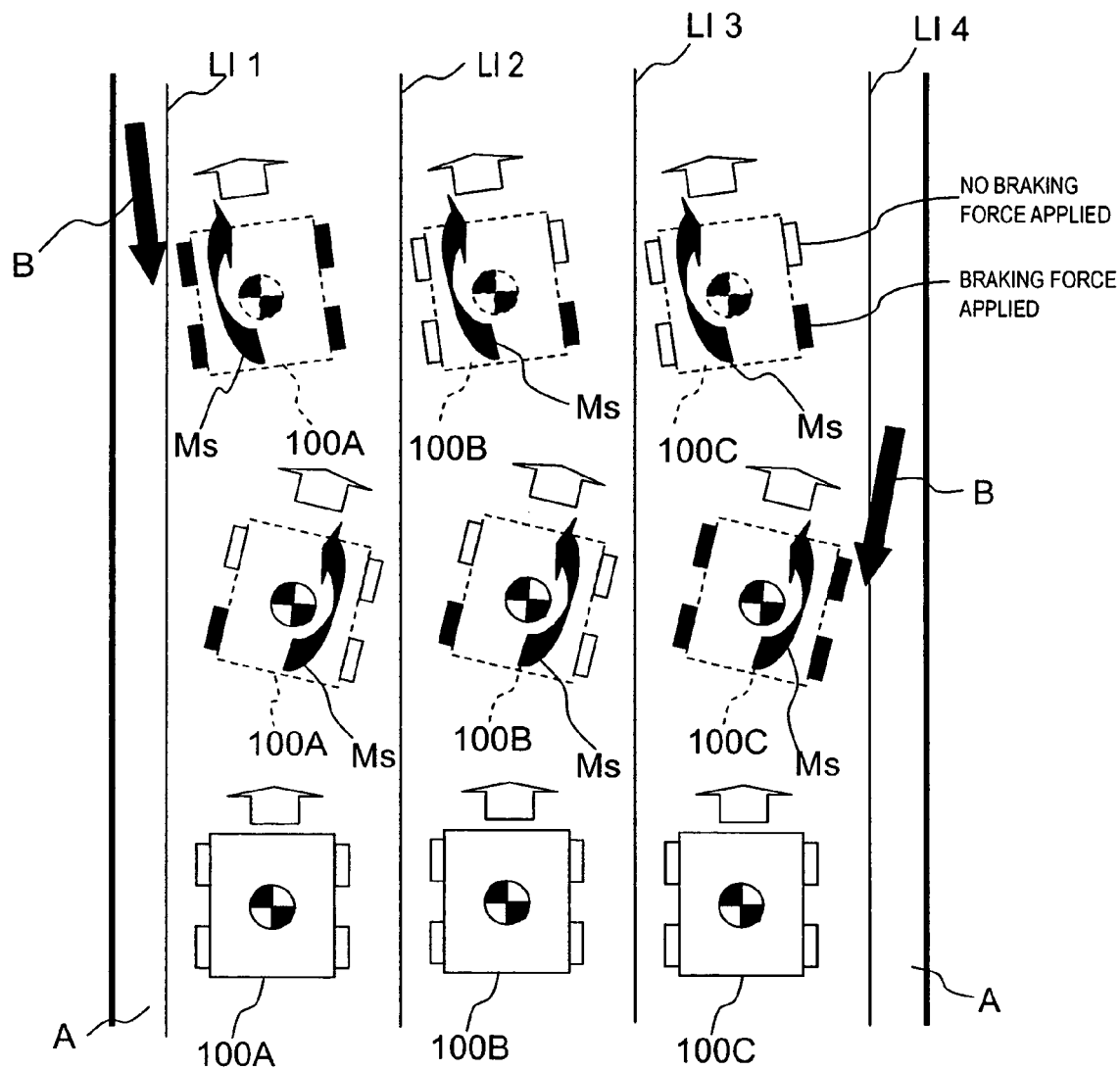
FIG. 11 is a diagram used for describing the braking control method in the third case or scenario.

The wheels colored in black in FIGS. 10 and 11 are those in which hydraulic pressure is generated and braking force is provided. In other words, when either one of the left and right wheels is a wheel colored in black, there is a difference in hydraulic pressure or braking force in the left and right wheels. This case shows a yaw moment imparted to the host vehicle. Also, when the left and right wheels are colored in black, there can still be a difference in the hydraulic pressure values thereof, in which case the host vehicle undergoes controlled deceleration while a yaw moment is simultaneously imparted to the host vehicle.

The second case, as described above, is one in which there is a match between the obstacle-containing direction $S_{out}$ and the lane departure direction $D_{out}$, and where the road type R is an ordinary road. In other words, when the host vehicle 100 is traveling on a two-lane, two-way road wherein the road shoulder A is to the left and the opposing lane (center lane Ll5 side) is to the right, there are cases in which the host vehicle 100 (the host vehicle 100 in the uppermost position of FIG. 10) may tend to depart in the left-hand direction, and cases in which the host vehicle (the host vehicle 100 in the center position of FIG. 10) may tend to depart in the right-hand direction, as shown in FIG. 10.

In this case, the lane departure-avoiding yaw control is carried out. Furthermore, when the estimated time of departure $T_{out}$ becomes less than the second departure-determining threshold Tr, the lane departure-avoiding yaw control is applied, and the lane departure-avoiding deceleration control is carried out. The host vehicle thereby avoids departure. The driver can feel the lane departure avoidance action as acceleration in the lateral direction or as deceleration in the direction of travel, and know that the host vehicle has a tendency to depart.

The third case, as described above, is one in which there is a match between the first obstacle-containing direction $S_{out}$ and the lane departure direction $D_{out}$, and where the road type R is an expressway. In other words, this is a case in which the host vehicle 100A (host vehicle 100A in the uppermost position of FIG. 11) traveling in the left-hand lane on a three-lane, one-way road has a tendency to depart in the left-hand direction, as shown in FIG. 11. An alternative case is one in which the host vehicle 100C (host vehicle 100C in the center position of FIG. 11) traveling in the right-hand lane on a three-lane, one-way road has a tendency to depart in the right-hand direction, as shown in FIG. 11.

In this case, lane departure-avoiding yaw control is carried out. The host vehicle can thereby avoid departure. Furthermore, when the estimated time of departure $T_{out}$ reaches 0, in other words, when it is determined that the host vehicle has departed from the driving lane, the lane departure-avoiding yaw control is applied, and the lane departure-avoiding deceleration control is carried out.

The first case, as described above, is one in which there is no match between the obstacle-containing direction $S_{out}$ and the lane departure direction $D_{out}$. In other words, there are cases in which the host vehicle 100A (host vehicle 100A in the center position of FIG. 11) traveling in the left-hand lane on a three-lane, one-way road has a tendency to depart in the right-hand direction, as shown in FIG. 11. There are also cases in which the host vehicle 100C (host vehicle 100C in the lowermost position of FIG. 11) traveling in the right-hand lane on a three-lane, one-way road has a tendency to depart in the left-hand direction, as shown in FIG. 11.

There are furthermore cases in which the host vehicle 100B traveling in the center lane has a tendency to depart in the left-hand or right-hand direction. The lane departure-avoiding yaw control is carried out in this case. The host vehicle can thereby avoid departure.

Braking control for this type of departure avoidance is performed and an alarm is issued with a sound or display. The alarm device 24 is initiated with a predetermined timing in advance of braking control, or simultaneously with braking control, for example.

A condition for the above controls for departure avoidance in the first to third scenarios is that the lane departure determination flag $F_{out}$ be ON and that the steering direction not coincide with the lane departure-avoidance direction. These controls for departure avoidance are not carried out if the lane departure determination flag $F_{out}$ is OFF, or if the lane departure determination flag $F_{out}$ is ON but the steering direction coincides with the lane departure-avoidance direction.

The effects of this embodiment will now be described.

As discussed above, lane departure-avoidance control is suppressed, or more specifically, not performed, when the lane departure-avoidance direction (the opposite of the lane departure direction $D_{out}$) coincides with the steering direction provided by steering operation on the part of the driver. In this case, yaw moment is imparted to the vehicle so as to achieve the steering direction provided by steering operation on the part of the driver. This prevents yaw moment for departure avoidance from being added to the yaw moment imparted to the vehicle by the steering operation from the driver, which would result in more yaw moment acting on the vehicle than necessary. This prevents the lane departure-avoidance control from causing the driver any discomfort.

Second Embodiment

Figure 12:
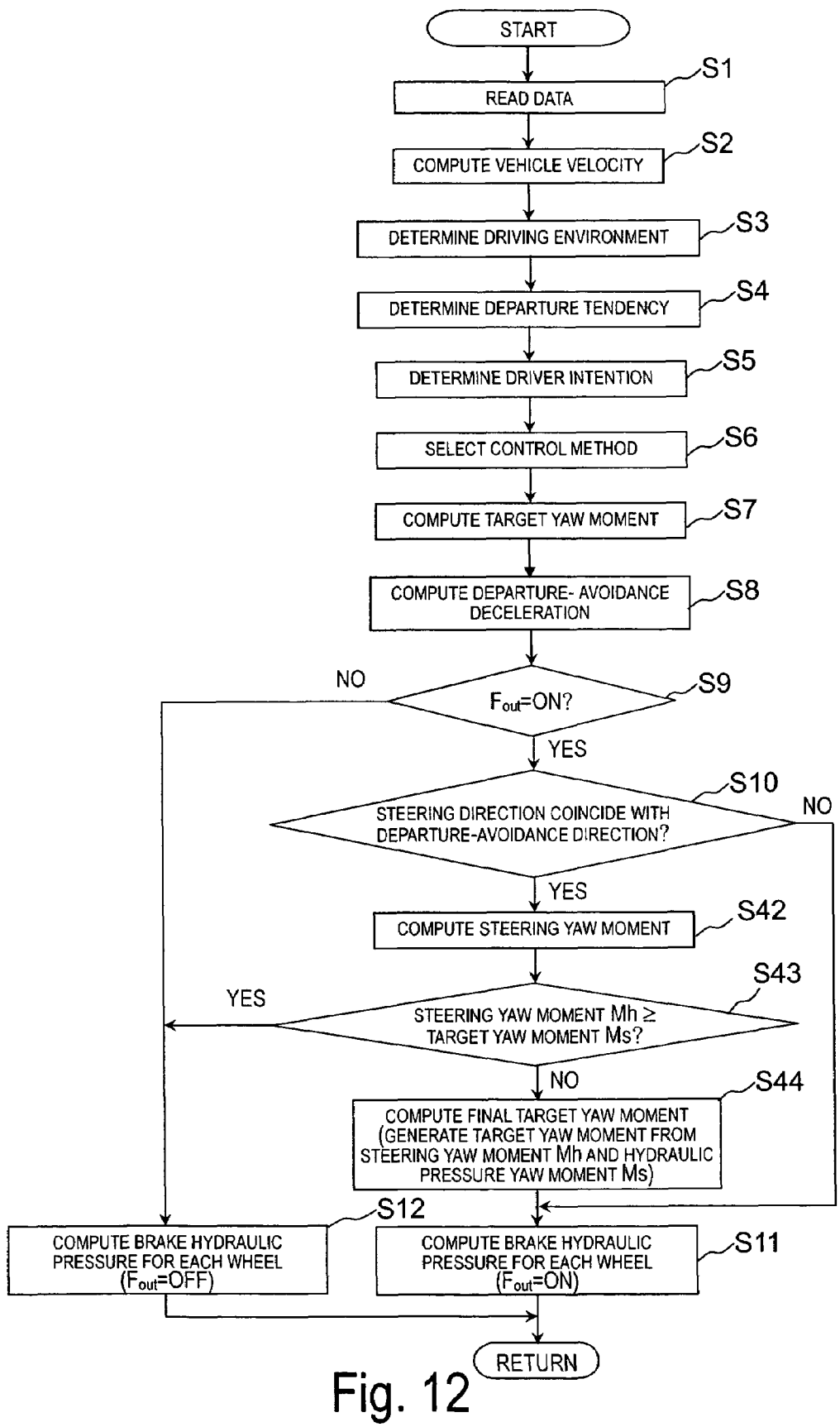
FIG. 12 is a flowchart illustrating the processing content for the driving/braking force control unit when a trailing vehicle is present in accordance with a second embodiment of the present invention.
Figure 13:
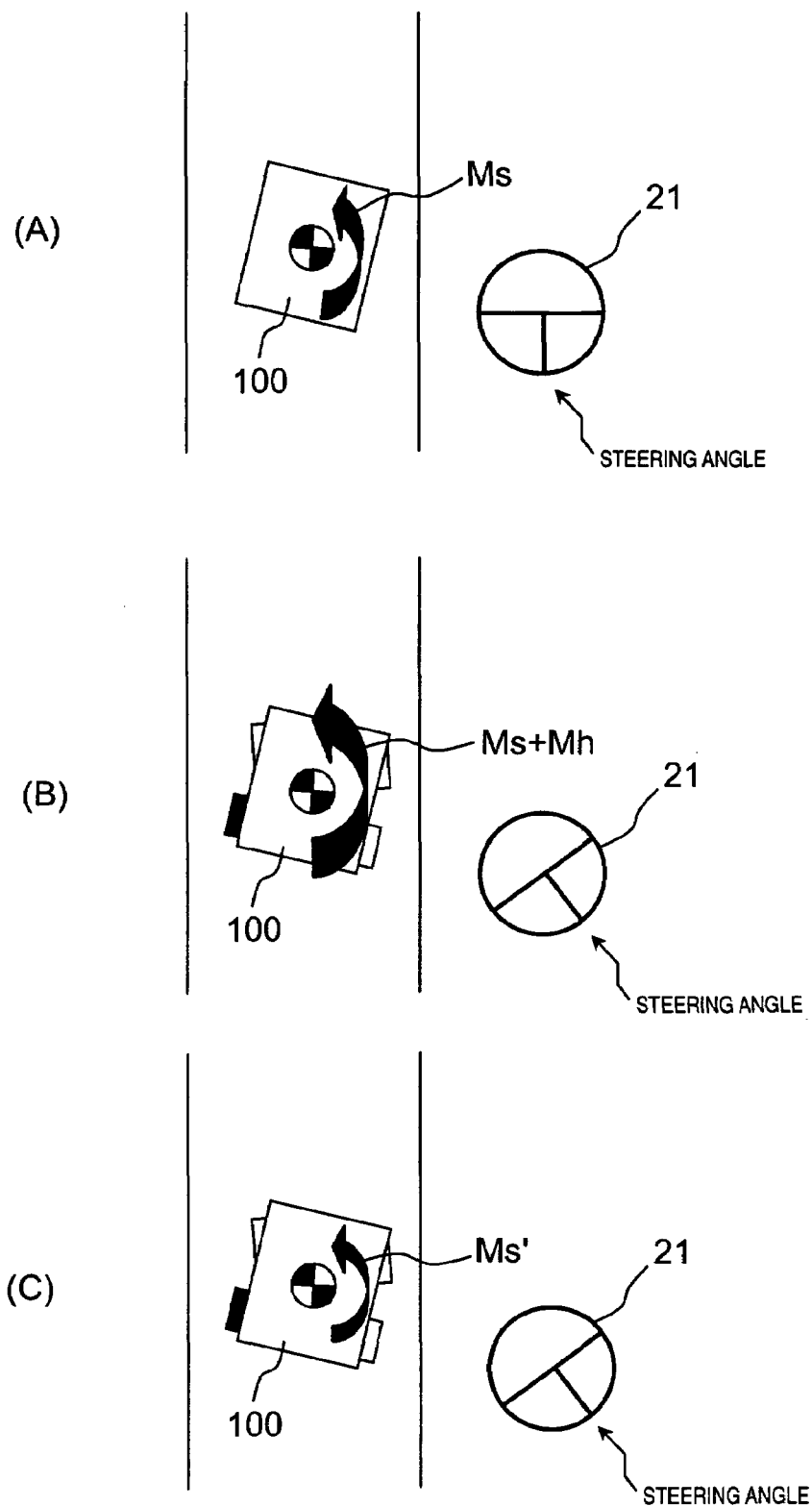
FIG. 13 is a diagram used for describing the effects of the braking control method in accordance with the second embodiment of the present invention.

Referring now to FIGS. 12 and 13, a vehicle equipped with a lane departure prevention apparatus in accordance with a second embodiment will now be explained. The configuration of the vehicle in this second embodiment is the same as the configuration of the vehicle in the first embodiment (see FIG. 1). In view of the similarity between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment may be omitted for the sake of brevity. In other words, unless otherwise specified, the rest of the configuration of the vehicle in the second embodiment is the same as the configuration of the first embodiment.

The first embodiment was configured such that no departure-avoidance control would intervene if the steering direction coincided with the lane departure-avoidance direction. In contrast, the second embodiment is configured such that departure-avoidance control does intervene even if the steering direction coincides with the lane departure-avoidance direction. Specifically, the magnitude of the yaw moment generated by steering is taken into account before departure-avoidance control intervenes. To achieve this, the processing performed by the driving/braking force control unit 8 is different in the second embodiment from that in the first embodiment.

FIG. 12 shows the computational processing procedure performed by the driving/braking force control unit 8. The computational processing procedure is substantially the same as the computational processing procedure in the first embodiment, and only those parts that are particularly different will be described.

Specifically, in steps S1 to S9, various kinds of data are read, the vehicle speed is calculated, the driving environment is evaluated, the lane departure tendency is evaluated, the driver's intention is determined, the control method is selected, the target yaw moment is calculated, and the lane departure-avoidance deceleration is calculated in the same manner as in the first embodiment. In step S9, it is determined whether the lane departure determination flag $F_{out}$ is ON or OFF. If the lane departure determination flag $F_{out}$ is ON, the processing continues on to step S41, but if the lane departure determination flag $F_{out}$ is OFF, the processing continues to step S12.

In step S41 the steering direction is determined in the same manner as in step S10. That is, it is determined whether or not the steering direction coincides with the lane departure-avoidance direction. If the steering direction does coincide with the lane departure-avoidance direction, the processing continues on to step S11, but if the steering direction does not coincide with the lane departure-avoidance direction, the processing continues to step S42. In this second embodiment, if the steering direction coincides with the lane departure-avoidance direction in step S41, the processing continues to step S42 rather than to the above-mentioned step S12.

In step S42, the yaw moment Mh (hereinafter referred to as the steering yaw moment) generated in the vehicle is calculated as an estimated value according to the steering angle δ.

In step S43, the steering yaw moment Mh calculated in step S42 is then compared with the target yaw moment Ms calculated in step S7. If the steering yaw moment Mh here is greater than or equal to the target yaw moment Ms, the processing continues on to step S12, but if the steering yaw moment Mh is less than the target yaw moment Ms, the processing continues to step S44.

The final target yaw moment Ms' is calculated in step S44. Specifically, the difference (Ms−Mh) between the target yaw moment Ms and the steering yaw moment Mh is calculated as the final target yaw moment Ms'.

In step S11, the target brake hydraulic pressure Psi (i=fl, fr, rl, rr) for each wheel is then calculated so that the yaw moment imparted to the vehicle by departure-avoidance yaw control will be the above-mentioned final target yaw moment Ms' (see Equations (11) and (12) above).

If the steering direction does not coincide with the lane departure-avoidance direction in step S41, the target brake hydraulic pressure Psi (i=fl, fr, rl, rr) for each wheel is calculated so that the yaw moment imparted to the vehicle by departure-avoidance yaw control will be the above-mentioned target yaw moment Ms (see Equations 11 and 12 above).

In step S12, the target brake hydraulic pressure Psi (i=fl, fr, rl, rr) for each wheel is set as the master cylinder hydraulic pressure Pmf or Pmr (see Equations 5 and 6 above).

The target brake hydraulic pressure Psi (i=fl, fr, rl, rr) is in this way calculated according to the various conditions, and the target brake hydraulic pressure Psi (i=fl, fr, rl, rr) thus calculated is outputted as a brake hydraulic pressure command value to the brake hydraulic pressure control unit 7. The brake hydraulic pressure control unit 7 individually controls the brake hydraulic pressure of the wheel cylinders 6FL to 6RR on the basis of the brake hydraulic pressure command value. As a result, a specific vehicle behavior corresponding to the driving environment is exhibited when there is a lane departure tendency.

The result of the above processing is that when the lane departure determination flag $F_{out}$ is ON, if the steering direction coincides with the lane departure-avoidance direction (the opposite of the lane departure direction $D_{out}$), and if the steering yaw moment Mh is less than the target yaw moment Ms, then the final target yaw moment Ms' is calculated from the difference (Ms−Mh) between the target yaw moment Ms and the steering yaw moment Mh (steps S41 to S44), and departure-avoidance yaw control is performed so as to achieve this final target yaw moment Ms' (step S11). As a result, yaw moment based on the steering operation by the driver and the final target yaw moment Ms' for departure avoidance are simultaneously imparted to the vehicle.

Also, when the lane departure determination flag $F_{out}$ is ON, if the steering direction does not coincide with the lane departure-avoidance direction, then departure-avoidance yaw control is performed so as to achieve the target yaw moment Ms (steps S41 and S11), just as in the first embodiment.

Even if the lane departure determination flag $F_{out}$ is ON, lane departure-avoidance yaw control will not be performed if the steering yaw moment Mh is greater than or equal to the target yaw moment Ms. In this case, only the yaw moment based on the steering operation by the driver is imparted to the vehicle (steps S43 and S12).

The effects of the second embodiment will now be described.

As discussed above, when the lane departure determination flag $F_{out}$ is ON, if the steering direction coincides with the lane departure-avoidance direction (the opposite of the lane departure direction $D_{out}$), and if the steering yaw moment Mh is less than the target yaw moment Ms, then the final target yaw moment Ms' is calculated from the difference (Ms−Mh) between the target yaw moment Ms and the steering yaw moment Mh (steps S41 to S44), and departure-avoidance yaw control is performed so as to achieve this final target yaw moment Ms' (step S11). As a result, yaw moment based on the steering operation by the driver and the final target yaw moment Ms' for departure avoidance are simultaneously imparted to the vehicle.

The effect of this is that it prevents more yaw moment than necessary from acting on the vehicle when the driver operates the steering, just as in the first embodiment.

Also, the target yaw moment Ms is the sum of the yaw moment based on steering operation by the driver and the final target yaw moment Ms' for departure avoidance. That is, the yaw moment at which departure can be avoided under optimal conditions is achieved. As a result, the vehicle operates optimally, and departure can be avoided. In other words, lane departure-avoidance yaw control intervenes so as to compensate for steering operation by the driver, affording optimal operation and allowing departure to be avoided. The result is that although departure-avoidance yaw control intervenes, this intervention creates no sense of discomfort in the driver.

The effect of this will now be described through reference to FIG. 13. In the diagrams (A), (B) and (C) of FIG. 13, the left side shows the driving state of the host vehicle 100, while the right side shows the steering state of the steering wheel 21 produced by the driver of the host vehicle 100.

As also described through reference to FIGS. 10 and 11, as a general rule, lane departure-avoidance yaw control is performed so as to avoid departure whenever there is a lane departure tendency, as shown in diagram (A) of FIG. 13.

When there is a lane departure tendency, the standard approach is for the driver to take departure avoidance action by operating the steering wheel. Thus, if departure-avoidance yaw control is performed without any limitations whenever there is a lane departure tendency, then as shown in diagram (B) of FIG. 13, the vehicle 100 will be subjected both to the yaw moment Ms produced by the lane departure-avoidance control and to the yaw moment Mh produced by operation of the steering wheel 21 by the driver. Consequently, excessive yaw moment (more than what is needed for departure avoidance) ends up being imparted to the vehicle 100.

In view of this, with the present invention, if the steering direction coincides with the lane departure-avoidance direction, and if the yaw moment Mh produced by steering operation does not reach the target yaw moment Ms, then the final target yaw moment Ms' obtained by subtracting the target yaw moment Ms is used as the target value, and departure-avoidance yaw control is carried out so as to achieve this target value (see diagram (C) of FIG. 13). This allows the vehicle to operate optimally and departure to be avoided.

Third Embodiment

Figure 14:
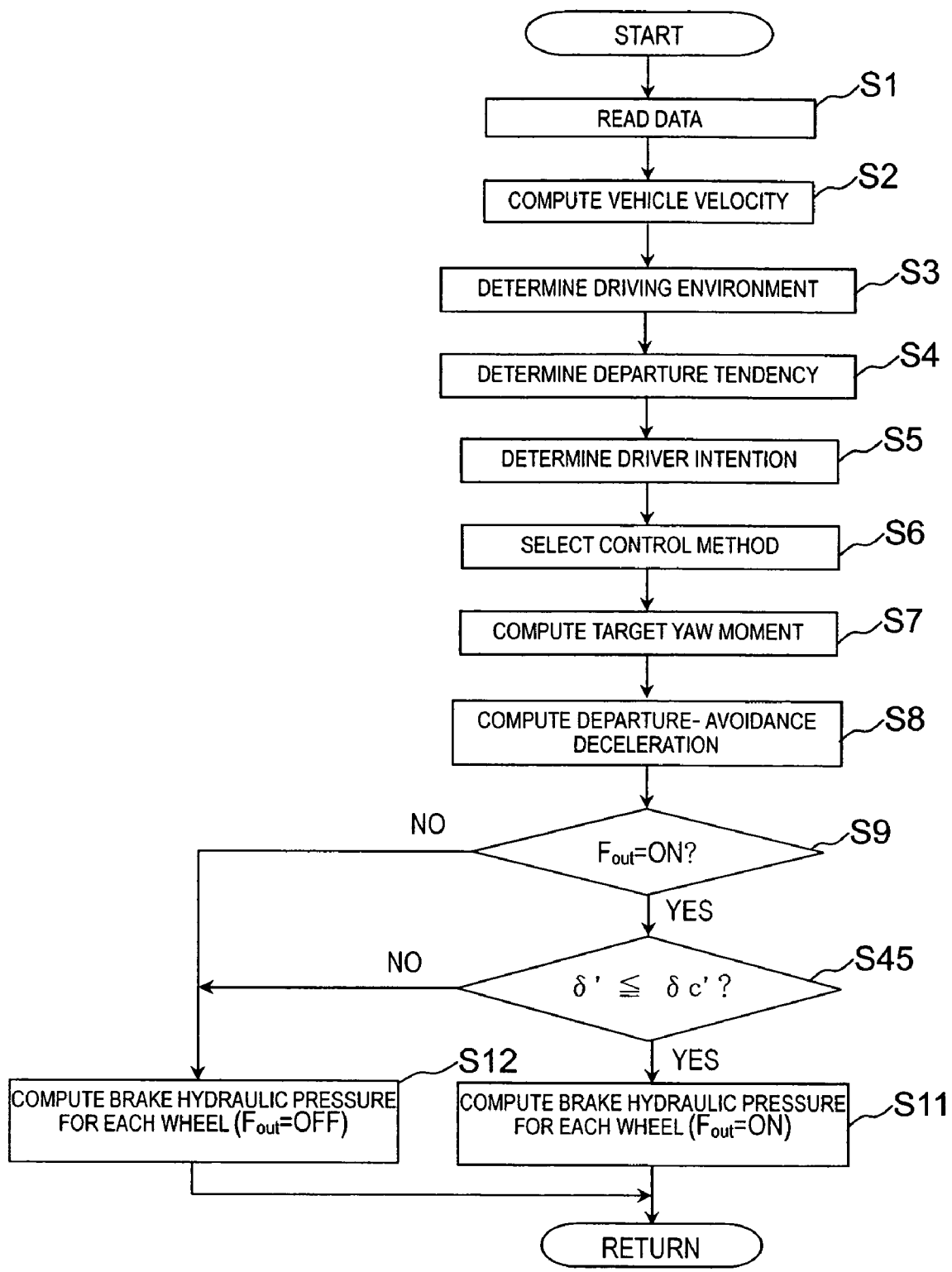
FIG. 14 is a flowchart illustrating the processing content for the driving/braking force control unit when a trailing vehicle is present in accordance with a third embodiment of the present invention.

Referring now to FIG. 14, a vehicle equipped with a lane departure prevention apparatus in accordance with a third embodiment will now be explained. The configuration of the vehicle in this third embodiment is the same as the configuration of the vehicle in the first embodiment (see FIG. 1). In view of the similarity between the first and third embodiments, the parts or steps of the third embodiment that are identical to the parts or steps of the first embodiment will be given the same reference numerals as the parts or steps of the first embodiment. Moreover, the descriptions of the parts or steps of the third embodiment that are identical to the parts or steps of the first embodiment may be omitted for the sake of brevity. In other words, unless otherwise specified, the rest of the configuration of the vehicle in the third embodiment is the same as the configuration of the first embodiment.

In the third embodiment, it is determined whether or not control for departure avoidance will intervene on the basis of the steering angle when there is steering operation through the steering wheel. To achieve this, the processing performed by the driving/braking force control unit 8 is different in the third embodiment from that in the first and second embodiments. Unless otherwise specified, the rest of the configuration of the vehicle in the third embodiment is the same as the configuration of the first embodiment.

FIG. 14 shows the computational processing procedure performed by the driving/braking force control unit 8 of this third embodiment. The computational processing procedure is substantially the same as the computational processing procedure in the first embodiment, and only those parts that are particularly different will be described.

Specifically, in steps S1 to S9, various kinds of data are read, the vehicle speed is calculated, the driving environment is evaluated, the lane departure tendency is evaluated, the driver's intention is determined, the control method is selected, the target yaw moment is calculated, and the lane departure-avoidance deceleration is calculated in the same manner as in the first embodiment. In step S9, it is determined whether the lane departure determination flag $F_{out}$ is ON or OFF. If the lane departure determination flag $F_{out}$ is ON, the processing continues on to step S45, but if the lane departure determination flag $F_{out}$ is OFF, the processing continues to step S12.

The steering angle velocity $\delta'$ is compared with a specific steering angle velocity threshold $\delta c'$ in step S45. The steering angle velocity $\delta'$ here is obtained as a time differential value of the steering angle $\delta$. When this steering angle velocity $\delta$ is greater than the specific threshold $\delta c'$, the processing continues on to step S12, but if the steering angle velocity $\delta'$ is less than or equal to the specific threshold $\delta c'$, the processing continues to step S11.

In step S11, the target brake hydraulic pressure Psi (i=fl, fr, rl, rr) applied to each wheel for carrying out the braking control method selected on the basis of the first obstacle-containing direction $S_{out}$ and the lane departure direction $D_{out}$ in step S6 is calculated. In step S12, meanwhile, the target brake hydraulic pressure Psi (i=fl, fr, rl, rr) at each wheel is set to the master cylinder hydraulic pressure Pmf or Pmr. The target brake hydraulic pressure Psi (i=fl, fr, rl, rr) calculated according to the various conditions is outputted as a brake hydraulic pressure command value to the brake hydraulic pressure control unit 7. The brake hydraulic pressure control unit 7 individually controls the brake hydraulic pressure of the wheel cylinders 6FL to 6RR on the basis of the brake hydraulic pressure command value.

The result of the above processing is that if the steering angle velocity $\delta'$ is greater than the specific threshold $\delta c'$ when the lane departure determination flag $F_{out}$ is ON, then there is no intervention of departure-avoidance control (steps S45 and S12). On the other hand, lane departure-avoidance control is actuated if the steering angle velocity $\delta'$ is less than or equal to the specific threshold $\delta c'$ when the lane departure determination flag $F_{out}$ is ON (steps S45 and S11).

The effects of the third embodiment will now be described.

As discussed above, there is no intervention of departure-avoidance control if the steering angle velocity $\delta'$ is greater than the specific threshold $\delta c'$ (steps S45 and S12). The lane departure-avoidance control here is departure-avoidance yaw control or departure-avoidance deceleration control.

The effect of this is that it prevents more departure-avoidance yaw control or departure-avoidance deceleration control than necessary from being actuated when the driver has performed a specific steering operation, just as in the first embodiment. As a result, lane departure-avoidance control creates no sense of discomfort in the driver.

For instance, if there is an obstacle on the road, the driver will quickly turn the steering wheel so that the vehicle will avoid making contact with the obstacle. The steering angle velocity $\delta'$ can be quite large in a situation such as this. Meanwhile, in such situations a lane departure prevention device usually ends up detecting that there is a lane departure tendency. When this happens, the lane departure-avoidance control (departure-avoidance yaw control or departure-avoidance deceleration control) ends up being actuated.

Because of this, operation of the vehicle in which the driver attempts to avoid an obstacle on the road can be carried out more smoothly if there is no intervention by departure-avoidance control when the steering angle velocity $\delta'$ is greater than or equal to the specific threshold $\delta c'$. In this case, vehicle operation by the driver will be particularly smoother if there is no intervention by departure-avoidance deceleration control. In other words, since the vehicle behavior produced by the driver does not interfere with the vehicle behavior produced by control, the driver senses nothing unusual in his operation of the vehicle. A similar effect can also be achieved by having no intervention by departure-avoidance yaw control.

Embodiments of the present invention have been described above, but the present invention is not limited to being realized as the above embodiments. That is, methods of combining braking control (departure-avoidance yaw control) so that yaw moment for avoiding departure is imparted to the vehicle, and deceleration control (departure-avoidance deceleration control) for decelerating to avoiding departure, the operating procedures of these methods, and the control amounts thereof (magnitude of the yaw moment and magnitude of the deceleration) were described in detail in the above embodiments, but it should go without saying that the present invention is not limited by these descriptions.

For instance, in the above embodiments not actuating departure-avoidance yaw control or departure-avoidance deceleration control was given as a specific example of setting the yaw moment performed on the basis of the steering state to a small value, or of setting the degree of deceleration to a small value, but the present invention is not limited to this. That is, the amount of departure-avoidance yaw control or departure-avoidance deceleration control (the magnitude of yaw moment or the magnitude of deceleration) can be changed to a small value on the basis of the steering state, for example. Doing this allows departure-avoidance yaw control or departure-avoidance deceleration control to be suppressed.

Also, in the above embodiments the estimated time of departure $T_{out}$ was calculated on the basis of the lateral displacement X and the amount of change dx therein (see Equation (2) above), but the estimated time of departure $T_{out}$ can be obtained by some other method. For instance, the estimated time of departure $T_{out}$ can be obtained on the basis of the yaw angle $\phi$, the driving lane curvature $\beta$, the yaw rate $\phi'$, or the steering angle $\delta$.

Also, in the above embodiments the intention of the driver to make a lane change was ascertained on the basis of the steering angle $\delta$ and the amount of change $\Delta\delta$ therein (see step S5), but the intention of the driver to make a lane change can be ascertained by some other method. For instance, the intention of the driver to make a lane change can be ascertained on the basis of the steering torque.

Also, the target yaw moment Ms was calculated in the above embodiments on the basis of the lateral displacement X and the amount of change dx (see Equation (3) above), but the target yaw moment Ms can also be obtained by another method. For instance, the target yaw moment Ms can be obtained on the basis of the yaw angle $\phi$, the lateral displacement X, or the driving lane curvature $\beta$, as shown in Equation (13) below.

$$Ms = K3 \cdot \phi + K4 \cdot X + K5 \cdot \beta \tag{13}$$

Here, the terms K3, K4, and K5 are gains that fluctuate with the vehicle speed V.

Also, the target brake hydraulic pressure Pgf for the front wheels was described in the above embodiments by using a specific equation (see Equation 4), but the present invention is not limited to this. For instance, the target brake hydraulic pressure Pgf for the front wheels can also be calculated from Equation (14) below.

$$Pgf = Kgv \cdot V + Kg\phi \cdot \phi + Kg\beta \cdot \beta \tag{14}$$

Here, the terms $Kg\phi$ and $Kg\beta$ are conversion factors that are used for converting braking force into brake hydraulic pressure, and are set on the basis of the yaw angle $\phi$ and the driving lane curvature $\beta$, respectively.

Also, the target hydraulic pressure differentials ΔPsf and ΔPsr for the front and rear wheels were calculated in order to achieve departure-avoidance yaw control in the above embodiments (see Equations (7) and (8) above), but the present invention is not limited to this. For instance, lane departure-avoidance yaw control can be achieved with the front wheel target hydraulic pressure differential ΔPsf alone. In this case, the front wheel target hydraulic pressure differential ΔPsf is calculated from Equation 15 below.

$$\Delta Psf = 2 \cdot Kbf \cdot Ms/T \tag{15}$$

In the description of the above embodiments, the processing (step S1) in the steering angle sensor 19 and the driving/braking force control unit 8 constitutes either a steering state detection section for detecting the steering state or a driving operation detection section for detecting a driving operation (steering) performed by the driver. The processing in step S4 of the driving/braking force control unit 8 constitutes a departure tendency detection section for detecting a tendency of the host vehicle to depart from the driving lane. The processing in step S6 of the driving/braking force control unit 8 constitutes an allotment setting section for setting the yaw moment allotment and the deceleration allotment on the basis of the lane departure tendency detected by the lane departure tendency detection section. The processing in step S7 of the driving/braking force control unit 8 constitutes a target yaw control moment calculating section for calculating the target yaw moment in order to avoid departure of the host vehicle from the driving lane on the basis of the yaw moment allotment that has been set by the setting section. The processing in step S8 of the driving/braking force control unit 8 constitutes deceleration control amount calculating section for calculating the deceleration control amount on the basis of the deceleration allotment that has been set by the setting section. The processing in step S9 of the driving/braking force control unit 8 constitutes a braking force control section for controlling the braking force of each wheel on the basis of the target yaw moment calculated by the target yaw control moment calculating section and the deceleration control amount calculated by the deceleration control amount calculating section when the lane departure tendency detection device detects a lane departure tendency. Also, the processing of the driving/braking force control unit 8 in step S10 (shown in FIG. 2) and in steps S41 to S44 (shown in FIG. 12) constitutes a control changing section for changing the type of control of the braking force control section on the basis of the steering state detected by the steering state detection section. Also, the processing of the driving/braking force control unit 8 in step S42 (shown in FIG. 12) constitutes a steering yaw moment calculating section for calculating the yaw moment generated in the host vehicle by steering.

Fourth Embodiment

Figure 15:
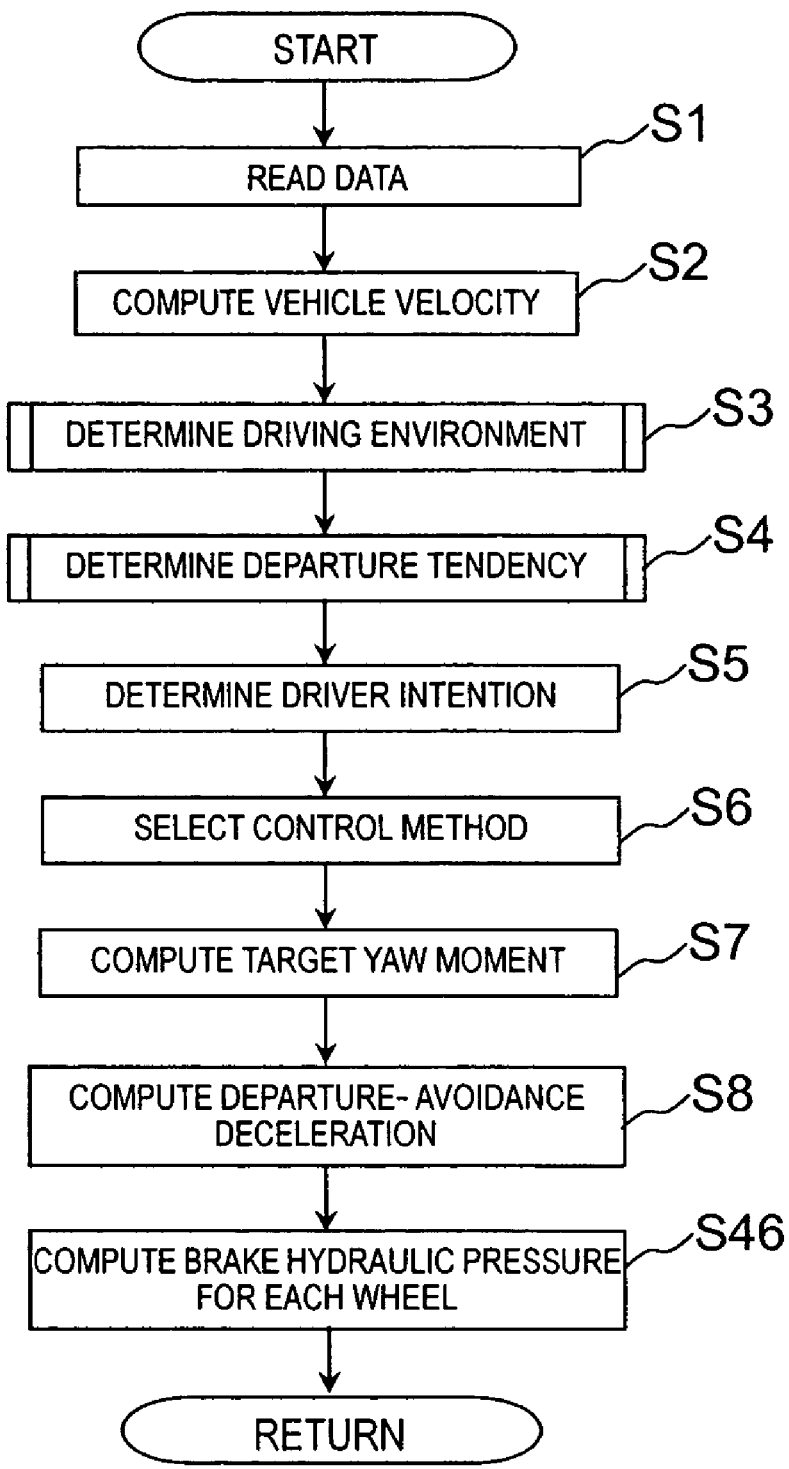
FIG. 15 is a flowchart illustrating the processing content of a driving/braking force control unit comprising the lane departure prevention device in accordance with a fourth embodiment of the present invention.
Figure 16:
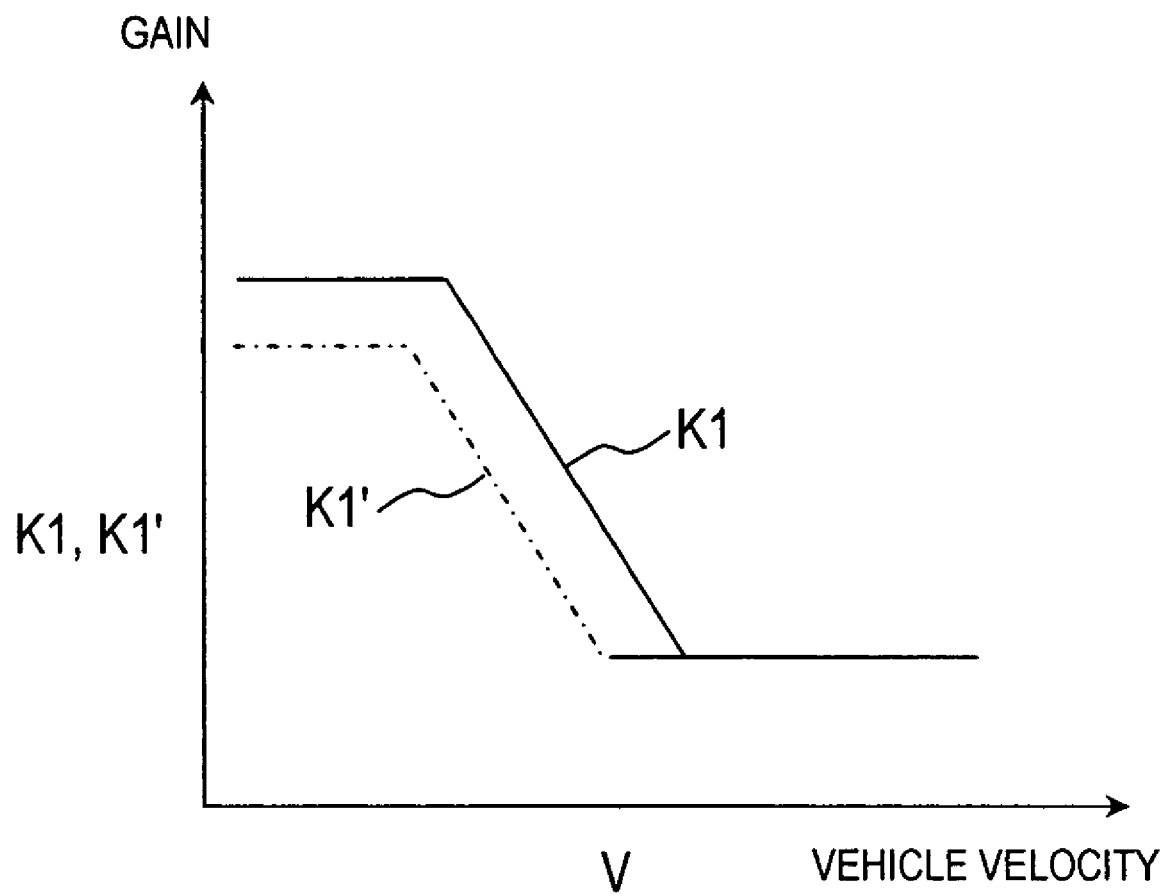
FIG. 16 is a characteristics diagram or map showing the characteristics of the gains K1 and K1'0 that are used to calculate the target brake hydraulic pressure Pgf.

Referring now to FIGS. 15 and 16, a vehicle equipped with a lane departure prevention apparatus in accordance with a fourth embodiment will now be explained. The configuration of the vehicle in this fourth embodiment is the same as the configuration of the vehicle in the first embodiment (see FIG. 1). In view of the similarity between the first and fourth embodiments, the parts or steps of the fourth embodiment that are identical to the parts or steps of the first embodiment will be given the same reference numerals as the parts of the first embodiment. Moreover, the descriptions of the parts or steps of the fourth embodiment that are identical to the parts or steps of the first embodiment may be omitted for the sake of brevity. In other words, unless otherwise specified, the rest of the configuration of the vehicle in the fourth embodiment is the same as the configuration of the first embodiment.

In the fourth embodiment, it is determined whether or not control for departure avoidance will intervene on the basis of the steering angle when there is steering operation through the steering wheel. To achieve this, the processing performed by the driving/braking force control unit 8 is different in the fourth embodiment from that in the first through third embodiments.

FIG. 15 shows the computational processing procedure performed by the driving/braking force control unit 8. The computational processing procedure is substantially the same as the computational processing procedure in the first embodiment, and only those parts that are particularly different will be described. In other words, steps S1–S8 are the same as the first embodiment, except step S6 has been slightly modified as explained below.

In step S46 of this embodiment, the target brake hydraulic pressure for each wheel is calculated. Specifically, the final brake hydraulic pressure is calculated on the basis of whether or not there is any braking control for departure avoidance. More specifically, the calculation is performed using Equations (5) to (10) as discussed above.

In step S6 of this fourth embodiment, the braking control method is decided on the basis of the longitudinal acceleration Yg, the first obstacle-containing direction $S_{out}$, and the lane departure direction $D_{out}$. The braking control method will be described for various situations using the longitudinal acceleration Yg, the first obstacle-containing direction $S_{out}$, and the lane departure direction $D_{out}$.

Fourth Scenario

If the longitudinal acceleration Yg is greater than zero (Xg>0), that is, when the host vehicle is accelerating, braking control for decelerating the vehicle (hereinafter referred to as departure-avoidance deceleration control) is performed until the lane departure determination flag $F_{out}$ is set to OFF. This departure-avoidance deceleration control is performed by applying equal amounts of braking force to the left and right wheels.

Here, when the lane departure determination flag $F_{out}$ switches from ON to OFF, if there is a lane departure tendency, then departure-avoidance braking control is performed, or the driver himself takes avoidance action.

On the other hand, when the longitudinal acceleration Yg is less than zero (Xg<0), that is, when the host vehicle is decelerating, braking control is performed such that yaw moment for avoiding departure is imparted to the vehicle (hereinafter referred to as departure-avoidance yaw control) until the lane departure determination flag $F_{out}$ is set to OFF.

Here, the magnitude of the yaw moment imparted to the host vehicle in order to avoid departure is the target yaw moment Ms. The yaw moment is imparted to the host vehicle by creating a difference in the braking force applied to the left and right wheels. More specifically, when the target yaw moment Ms is less than the threshold Ms1 used for setting purposes, a braking force difference is generated in the left and right rear wheels to impart the target yaw moment Ms to the host vehicle. When the target yaw moment Ms is equal to or greater than the threshold Ms1 used for setting purposes, a braking force difference is generated in the front and rear left and right wheels to impart the target yaw moment Ms to the host vehicle, as described above.

Fifth Scenario

When the first obstacle-containing direction $S_{out}$ coincides with the lane departure direction $D_{out}$, and the longitudinal acceleration Yg is less than zero, lane departure-avoidance yaw control is performed until the lane departure determination flag $F_{out}$ is set to OFF.

Here, because the longitudinal acceleration Yg is less than zero, the lane departure-avoidance yaw control is performed using a target yaw moment Ms that has been changed to a smaller value. For example, the target yaw moment Ms is changed to a smaller value as follows.

The target yaw moment Ms is calculated from Equation (3) above in step S7, but the target yaw moment Ms is changed to a smaller value by changing the gain K1 in Equation (3) to a gain K1' that is less than the gain K1.

For instance, FIG. 10 shows an example of the gains K1 and K1' used here. As shown in FIG. 16, the gains K1 and K1' are larger values when the speed is slower, but decrease according to the increase in the vehicle speed V once the vehicle speed V reaches a certain value, after which the value becomes constant once a certain vehicle speed V is attained. In the above-mentioned regions of low speed and increasing vehicle speed, the gain K1' is set to a value less than the gain K1. The target yaw moment Ms is thus set to a smaller value by changing the gain K1 in Equation 3 to the gain K1'.

Sixth Scenario

When the first obstacle-containing direction $S_{out}$ coincides the lane departure direction $D_{out}$, and the longitudinal acceleration Yg is greater than zero, lane departure-avoidance yaw control is performed until the lane departure determination flag $F_{out}$ is set to OFF.

Here, because the longitudinal acceleration Yg is greater than zero, the target yaw moment Ms is left alone, rather than being changed to a smaller value, just as in the fourth scenario.

Further, when a second departure determination threshold Tr is defined as being less than the above-mentioned first departure determination threshold Ts (Ts>Tr>0), and the estimated departure time $T_{out}$ is less than this second departure determination threshold Tr ($T_{out}$ <Tr), lane departure-avoidance deceleration control is performed in addition to departure-avoidance yaw control.

Seventh Scenario

When the first obstacle-containing direction $S_{out}$ coincides or matches with the lane departure direction $D_{out}$, and the road type R obtained in step S3 is an ordinary road, and the longitudinal acceleration Yg is less than zero, the departure-avoidance yaw control is performed until the lane departure determination flag $F_{out}$ is set to OFF.

Further, when the estimated departure time $T_{out}$ is less than the second departure determination threshold Tr ($T_{out}$<Tr), lane departure-avoidance deceleration control is performed in addition to lane departure-avoidance yaw control.

Here, because the longitudinal acceleration Yg is less than zero, just as in the fifth scenario, the lane departure-avoidance yaw control is performed using a target yaw moment Ms that has been changed to a smaller value.

Eighth Scenario

When the first obstacle-containing direction $S_{out}$ coincides with the lane departure direction $D_{out}$, and the road type R obtained in step S3 is an ordinary road, and the longitudinal acceleration Yg is less than zero, lane departure-avoidance yaw control is performed until the lane departure determination flag $F_{out}$ is set to OFF.

Further, the lane departure tendency is evaluated using a departure determination threshold (Ts+dTs1) obtained by adding a certain setting amount (hereinafter referred to as the first setting amount) dTs1 to the first departure determination threshold Ts. For example, the first setting amount dTs1 is less than the first departure determination threshold Ts (Ts>dTs1).

If the result is that the estimated departure time $T_{out}$ is less than the lane departure determination threshold (Ts+dTs1) ($T_{out}$<(Ts+dTs1)), lane departure-avoidance deceleration control is performed. As a result, when there is a lane departure tendency, the commencement of the lane departure-avoidance deceleration control is advanced by an amount equal to the first setting amount dTs1.

In step S6, the braking control method is thus variously decided upon according to the values of the longitudinal acceleration Yg, the first obstacle-containing direction $S_{out}$, and the lane departure direction $D_{out}$. That is, the braking control method for departure avoidance is decided as just departure-avoidance yaw control, or as a combination of departure-avoidance yaw control and departure-avoidance deceleration control, according to the values of the longitudinal acceleration Yg, the first obstacle-containing direction $S_{out}$, and the lane departure direction $D_{out}$.

The target brake hydraulic pressure Psi (i=fl, fr, rl, rr) for each wheel is calculated in step S46 in accordance with each type of braking control method.

In the lane departure-avoiding yaw control of this embodiment for the two to five cases, for example, the target brake hydraulic pressure Psi (i=fl, fr, rl, rr) for each wheel is calculated with Equation (11) as presented above in the first embodiment. However, the lane departure-avoiding yaw control and the lane departure-avoiding deceleration control are carried out in the third to fifth cases, but in this case the target brake hydraulic pressure Psi (i=fl, fr, rl, rr) for each wheel is calculated with Equation (12) as presented above in the first embodiment. Also, the target brake hydraulic pressure Psi (i=fl, fr, rl, rr) for each wheel is calculated with reference to the deceleration action taken by the driver. In other words, the master cylinder hydraulic pressures Pmf and Pmr are applied, as shown in Equations (11) and (12).

The above describes the processing for step S46. Thus, the target brake hydraulic pressure Psi (i=fl, fr, rl, rr) for each wheel is calculated based on the state of the lane departure determination flag $F_{out}$ in this step S46. When the lane departure determination flag $F_{out}$ is ON, the target brake hydraulic pressure Psi (i=fl, fr, rl, rr) for each wheel is calculated in accordance with the braking control method selected in step S46 in response to the relationship between the first obstacle-containing direction $S_{out}$, the longitudinal acceleration Yg, and the value of the lane departure direction $D_{out}$.

Described above is the computational processing performed by the driving/braking force control unit 8. With the driving/braking force control unit 8, the target brake hydraulic pressure Psi (i=fl, fr, rl, rr) calculated for each wheel in step S11 or step S12 is output to the brake hydraulic pressure control unit 7 as a brake hydraulic pressure command value.

The lane departure prevention apparatus described above operates according to the following overview.

First, various kinds of data are read from the sensors, the controllers, and the control units (step S1). Next, the vehicle speed V is then calculated (step S2).

The driving environment is then evaluated and the direction in which the safety level is relatively lowest (first obstacle-containing direction $S_{out}$) is determined (step S3, FIG. 3). For example, if the host vehicle 100A is traveling in the left lane in FIG. 4, the obstacle-containing direction $S_{out}$ is used as the left-hand direction.

In step S4, the lane departure determination flag $F_{out}$ is set based on the estimated time of departure $T_{out}$, and the lane departure direction $D_{out}$ is determined based on the lateral displacement X (see FIG. 7).

Furthermore, the driver's intention to change lanes is determined based on the lane departure direction $D_{out}$ obtained in this manner and on the direction (lighted blinker side) indicated by the turn signal switch 20 (step S5).

For example, when the direction (lighted blinker side) indicated by the turn switch signal and the direction indicated by the lane departure direction $D_{out}$ are the same, it is determined that the driver is intentionally changing lanes. In this case, the lane departure determination flag $F_{out}$ is changed to OFF.

When the direction (lighted blinker side) indicated by the turn switch signal and the direction indicated by the lane departure direction $D_{out}$ are different, the lane departure determination flag $F_{out}$ is kept unchanged in the case that it is ON. The reason is that when the direction (lighted blinker side) indicated by the turn switch signal and the direction indicated by the lane departure direction $D_{out}$ are different, the lane departure behavior of the host vehicle may be due to factors other than the driver's intention to change lanes or the like, so the condition of the lane departure determination flag $F_{out}$ is kept unchanged when the flag is ON.

The start of an alarm for departure avoidance, the presence or absence of the lane departure-avoiding braking control, and the method for carrying out departure-avoiding braking control are selected based on the lane departure determination flag $F_{out}$, the obstacle-containing direction $S_{out}$, the longitudinal acceleration Yg, and the lane departure direction $D_{out}$ (step S6).

Furthermore, the target yaw moment Ms is calculated based on the lateral displacement X and the variation amount dx (step S7), and departure-avoiding deceleration is also calculated (step S8).

The target brake hydraulic pressure Psi (i=fl, fr, rl, rr) at each wheel is calculated on the basis of the lane departure determination flag $F_{out}$, the steering direction, the longitudinal acceleration Yg and the lane departure-avoidance direction $D_{out}$ (step S46).

The target brake hydraulic pressure Psi (i=fl, fr, rl, rr) is output to the brake hydraulic pressure control unit 7 as a brake hydraulic pressure command value (step S46). In the brake hydraulic pressure control unit 7, the brake hydraulic pressure is individually controlled for the wheel cylinders 6FL to 6RR based on the brake hydraulic pressure command value. Therefore, the configuration is such that when there is a lane departure tendency, a predetermined vehicle behavior is exhibited in accordance with the driving environment.

When the host vehicle is accelerating, lane departure-avoidance deceleration control is performed until the lane departure determination flag $F_{out}$ is set to OFF (fourth scenario). On the other hand, when the host vehicle is decelerating, lane departure-avoidance yaw control is performed until the lane departure determination flag $F_{out}$ is set to OFF (fourth scenario). The host vehicle avoids departure by this departure-avoidance control. Meanwhile, the driver can tell that the host vehicle is in a lane departure tendency when he feels the deceleration in the direction of travel or acceleration in the lateral direction caused by the lane departure-avoidance action of the vehicle.

When the first obstacle-containing direction $S_{out}$ does not coincide with the lane departure direction $D_{out}$, and the host vehicle is decelerating, lane departure-avoidance yaw control is performed using a target yaw moment Ms that is smaller than the usual value, until the lane departure determination flag $F_{out}$ is set to OFF (fifth scenario). The host vehicle thereby avoids departure. Meanwhile, the driver can tell that the host vehicle is in a lane departure tendency when he feels the acceleration in the lateral direction caused by the lane departure-avoidance action of the vehicle.

When the first obstacle-containing direction $S_{out}$ does not coincide with the lane departure direction $D_{out}$, and the host vehicle is accelerating, lane departure-avoidance yaw control is performed using a target yaw moment Ms of the usual value until the lane departure determination flag $F_{out}$ is set to OFF. Furthermore, when the estimated departure time $T_{out}$ is less than the second departure determination threshold Tr ($T_{out}$<Tr), lane departure-avoidance deceleration control is performed in addition to departure-avoidance yaw control (sixth scenario). The host vehicle avoids departure by this departure-avoidance control. Meanwhile, the driver can tell that the host vehicle is in a lane departure tendency when he feels the deceleration in the direction of travel or acceleration in the lateral direction caused by the lane departure-avoidance action of the vehicle.

When the first obstacle-containing direction $S_{out}$ coincides with the lane departure direction $D_{out}$, and the road type R is an ordinary road, and the host vehicle is decelerating, lane departure-avoidance yaw control is performed using a target yaw moment Ms that is smaller than the usual value, until the lane departure determination flag $F_{out}$ is set to OFF. Furthermore, when the estimated departure time $T_{out}$ is less than the second departure determination threshold Tr ($T_{out}$<Tr), lane departure-avoidance deceleration control is performed in addition to departure-avoidance yaw control (seventh scenario). The host vehicle avoids departure by this departure-avoidance control. Meanwhile, the driver can tell that the host vehicle is in a lane departure tendency when he feels the deceleration in the direction of travel or acceleration in the lateral direction caused by the lane departure-avoidance action of the vehicle.

When the first obstacle-containing direction $S_{out}$ coincides with the lane departure direction $D_{out}$, and the road type R is an ordinary road, and the host vehicle is accelerating, lane departure-avoidance deceleration control is performed if the estimated departure time $T_{out}$ is less than the lane departure determination threshold (Ts+dTs1) ($T_{out}$<(Ts+dTs1)), and departure-avoidance yaw control is performed using a target yaw moment Ms of the usual value if the estimated departure time $T_{out}$ is less than the first departure determination threshold Ts ($T_{out}$<Ts). The host vehicle avoids departure by this departure-avoidance control. Meanwhile, the driver can tell that the host vehicle is in a lane departure tendency when he feels the deceleration in the direction of travel or acceleration in the lateral direction caused by the lane departure-avoidance action of the vehicle.

A case in which the first obstacle-containing direction $S_{out}$ coincides with the lane departure direction $D_{out}$, and the road type R is an ordinary road, is one in which, as shown in FIG. 10, the host vehicle 100 is traveling on a two-lane, two-way road such that the road shoulder A is to the left and the opposing lane (center lane LI5 side) is to the right, and the host vehicle 100 (the host vehicle 100 in the uppermost position in FIG. 10) has a tendency to depart to the left, or the host vehicle (the host vehicle 100 in the center position in FIG. 10) has a tendency to depart to the right.

The effects of this fourth embodiment will now be described.

As discussed above, when the host vehicle has a lane departure tendency in the midst of decelerating, the target yaw moment used in departure-avoidance yaw control is set to a small value (fourth scenario, for example).

For instance, deceleration of the vehicle can make the driver feel that there is a low probability of departure, but if the amount of yaw moment usually used is imparted to the vehicle in this case, it will cause the driver discomfort or annoyance. Because of this, when the host vehicle has a lane departure tendency in the midst of deceleration, the vehicle behavior can be prevented from causing the driver any discomfort or annoyance by reducing the target yaw moment when departure-avoidance yaw control is performed.

Also, as discussed above, when the host vehicle has a lane departure tendency in the midst of accelerating, first departure-avoidance deceleration control is performed (such as in the eighth scenario of this fourth embodiment). That is, even when departure-avoidance yaw control is performed, lane departure-avoidance deceleration control is performed prior Because of this, when the host vehicle has a lane departure tendency in the midst of accelerating, causing the driver discomfort or annoyance can be prevented by first performing departure-avoidance deceleration control and then following this with departure-avoidance yaw control.

Meanwhile, when the host vehicle has a lane departure tendency in the midst of accelerating, lane departure-avoidance yaw control is performed, and this is followed by lane departure-avoidance deceleration control (such as in the sixth scenario).

Even if the vehicle should approach an obstacle or the like, performing departure-avoidance deceleration control lowers the extent thereof and prevents contact. Thus, causing the driver discomfort or annoyance can be prevented by deciding the content of the lane departure-avoidance deceleration control or departure-avoidance yaw control on the basis of the acceleration or deceleration of the host vehicle.

Also, as discussed above, when the host vehicle has a lane departure tendency while traveling along an ordinary road, first departure-avoidance yaw control is performed, and this is followed by departure-avoidance deceleration control (such as in the seventh scenario).

For example, since departure toward the road shoulder or the opposing lane along an ordinary road has a high probability of approaching an obstacle or a pedestrian, contact can be prevented by performing departure-avoidance deceleration control immediately prior to departure ($0<T_{out}<Tr$) even when departure-avoidance yaw control is performed. Furthermore, if departure-avoidance deceleration control is performed only immediately prior to departure ($0<T_{out}<Tr$), this control will not intervene as often, thereby preventing the driver from being caused that annoyance.

Fifth Embodiment

Referring now to FIGS. 17 to 20, a vehicle equipped with a lane departure prevention apparatus in accordance with a fifth embodiment will now be explained. The configuration of the vehicle (FIG. 17) in this fifth embodiment is the same as the configuration of the vehicle in the first embodiment (see FIG. 1), except for the additional components and the programming changes indicated below. In view of the similarity between the fifth and prior embodiments, the parts or steps of the fifth embodiment that are identical to the parts or steps of the prior embodiments will be given the same reference numerals as the parts of the prior embodiments. Moreover, the descriptions of the parts or steps of the fifth embodiment that are identical to the parts or steps of the prior embodiments may be omitted for the sake of brevity. In other words, unless otherwise specified, the rest of the configuration of the vehicle in the fifth embodiment is the same as the configuration of the prior embodiments.

Figure 17:
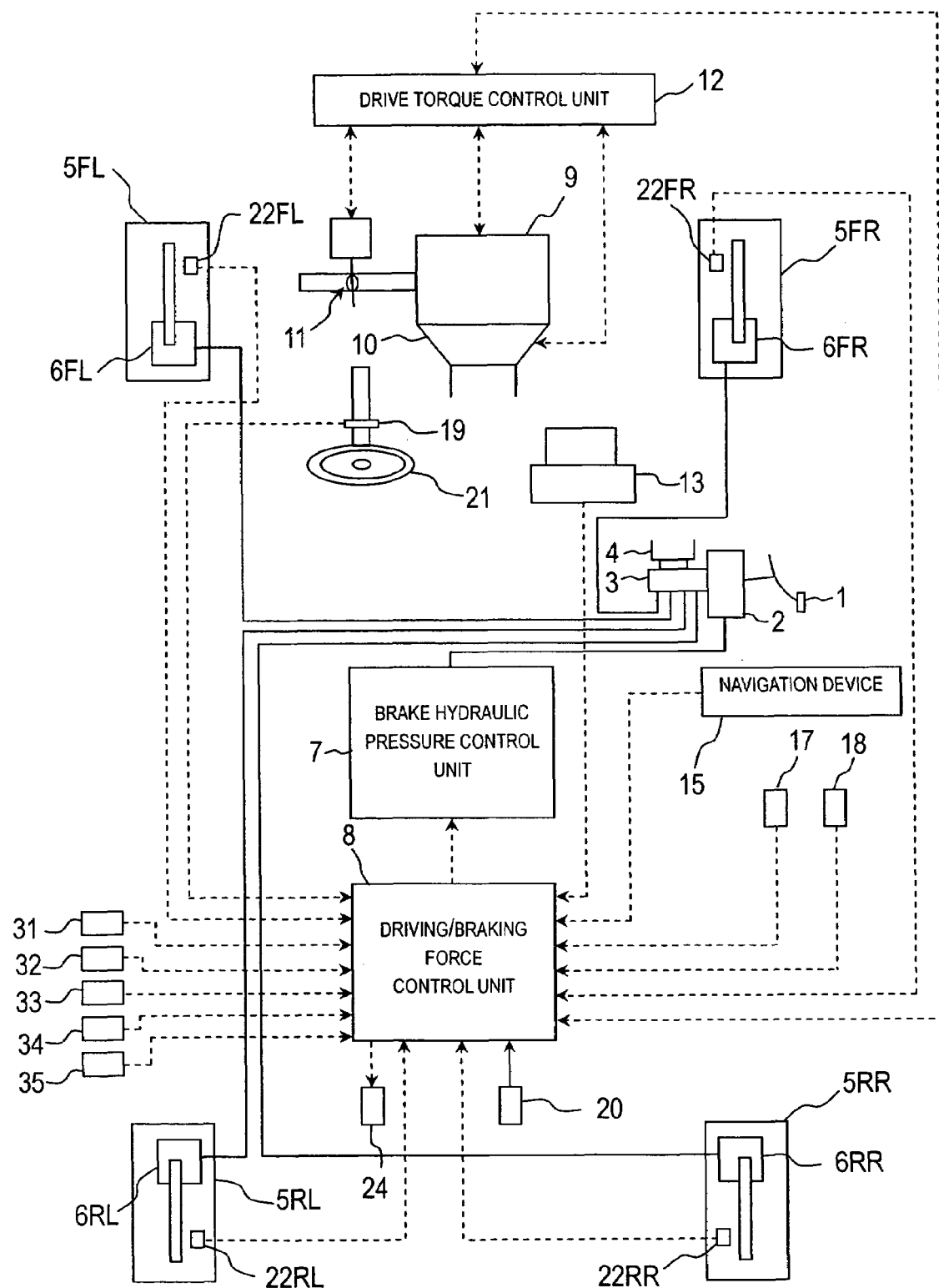
FIG. 17 is a schematic structural diagram of a vehicle equipped with a lane departure prevention apparatus in accordance with a fifth embodiment of the present invention.

FIG. 17 shows the configuration of the vehicle of the fifth embodiment. As shown in FIG. 17, the host vehicle is preferably equipped with all of the features of the first embodiment, but also further includes an ACC radar 31, a rear lateral obstacle monitoring radars 32 and 33, a lateral obstacle monitoring radars 34 and 35 and a rear obstacle monitoring radar.

Here, the ACC radar 31 obtains information about obstacles or vehicles ahead of the host vehicle in the adjacent lanes. Specifically, the ACC radar 31 obtains information about the presence of forward vehicles or the like, and the relative distances Lfr and relative speeds Vfr with respect to forward vehicles or the like. The ACC radar 31 outputs information about the presence of forward vehicles or the like, and the relative distances Lfr and relative speeds Vfr to the driving/braking force control unit 8.

The rear lateral obstacle monitoring radars 32 and 33 obtain information about obstacles or vehicles in the rear lateral directions of the host vehicle. Specifically, the rear lateral obstacle monitoring radars 32 and 33 ascertain the presence of vehicles or the like in the rear lateral directions, and the relative distances Lbsr and relative speeds Vbsr with respect to rear lateral vehicles or the like. The rear lateral obstacle monitoring radars 32 and 33 output [information about] the presence of rear lateral vehicles or the like, and the relative distances Lbsr and relative speeds Vbsr to the driving/braking force control unit 8.

The lateral obstacle monitoring radars 34 and 35 obtain information about obstacles or vehicles in the lateral directions of the host vehicle. Specifically, the lateral obstacle monitoring radars 34 and 35 ascertain the presence of vehicles or the like in the lateral directions, and the relative distances Lsr and relative speeds Vsr with respect to lateral vehicles or the like. The lateral obstacle monitoring radars 34 and 35 output information about the presence of lateral vehicles or the like, and the relative distances Lsr and relative speeds Vsr to the driving/braking force control unit 8.

The computational processing procedure that is performed by the driving/braking force control unit 8 will now be described on the basis of this configuration. The computational processing procedure is substantially the same as the computational processing procedure of the fourth embodiment (FIG. 15), and only those portions that differ significantly will be described.

Specifically, first, in step S1, signals are read from the ACC radar 31, the rear lateral obstacle monitoring radars 32 and 33, the lateral obstacle monitoring radars 34 and 35, and the rear obstacle monitoring radar 36 as well as the other signals mentioned above.

Then, in step S2 the vehicle speed V is calculated in the same manner as in the prior embodiments. The driving environment is then evaluated in step S3. The processing for evaluating the driving environment is unique to the fifth embodiment.

In the fourth embodiment, the type of road on which the host vehicle was traveling and the driving lane of the host vehicle were detected, and the first obstacle-containing direction was obtained on the basis of the detection results thereof. In contrast, in the fifth embodiment the direction in which the level of safety is lower is determined on the basis of the presence of other vehicles or obstacles as ascertained by the ACC radar 31 and so forth.

Specifically, when it has been determined on the basis of the information obtained from the ACC radar 31 (information regarding other vehicles and obstacles present in the forward direction) that the level of safety to the left of the host vehicle is low, that direction is set as a direction of low safety (hereinafter referred to as the second obstacle-containing direction) $A_{out}$ ($A_{out}$=left), and when it has been determined that the level of safety to the right of the host vehicle is low, that direction is set as the second obstacle-containing direction $A_{out}$ ($A_{out}$=right). For example, when another vehicle or an obstacle is present in the right diagonal forward direction of the host vehicle, the possibility of coming into contact with the other vehicle or the like will be high if the vehicle departs to the right, so the right-hand direction is set as the second obstacle-containing direction $A_{out}$ ($A_{out}$=right).

When it has been determined that the level of safety is low in both directions as seen from the host vehicle, both directions are set as the second obstacle-containing direction $A_{out}$ ($A_{out}$=both).

When it has been determined on the basis of the information obtained from the rear lateral obstacle monitoring radars 32 and 33 that the level of safety is low to the left of the host vehicle, that direction is set as a low safety level direction (hereinafter referred to as the third obstacle-containing direction) $RS_{out}$ ($RS_{out}$=left), and when it has been determined that the level of safety to the right of the host vehicle is low, that direction is set as the third obstacle-containing direction $RS_{out}$ ($RS_{out}$=right). Specifically, for example, when a passing vehicle that is attempting to pass the host vehicle is detected in the right lane, the right-hand direction is determined to be the third obstacle-containing direction $RS_{out}$ ($RS_{out}$=right).

When the level of safety is low in both directions as seen from the host vehicle, both directions are determined to be the third obstacle-containing direction $RS_{out}$ ($RS_{out}$=both).

When it has been determined on the basis of the information obtained from the lateral obstacle monitoring radars 34 and 35 that the level of safety is low to the left of the host vehicle, that direction is set as a low safety level direction (hereinafter referred to as the fourth obstacle-containing direction) $SD_{out}$ ($SD_{out}$=left), and when it has been determined that the level of safety to the right of the host vehicle is low, that direction is set as the fourth obstacle-containing direction $DS_{out}$ ($DS_{out}$=right). Specifically, for example, when it has been determined that another vehicle is traveling side-by-side in the right lane, the right-hand direction is set as the fourth obstacle-containing direction $SD_{out}$ ($SD_{out}$=right).

The fourth obstacle-containing direction $S_{out}$ can also be ultimately determined with the condition that other vehicles or obstacles are moving at substantially the same speed as the host vehicle speed. For example, when it is thereby determined that another vehicle is traveling side-by-side in the right lane and the speed of the other vehicle is equal to the speed of the host vehicle, the right-hand direction is set as the fourth obstacle-containing direction $SD_{out}$ ($SD_{out}$=right).

When the level of safety is low in both directions as seen from the host vehicle, both directions are determined to be the fourth obstacle-containing direction $SD_{out}$ ($SD_{out}$=both).

The processing of step S3 is performed as above.

Then, in steps S4 to S8 and S46, determination of the lane departure tendency, determination of the intention of the driver to change lanes, selection of the control method, calculation of the target yaw moment, calculation of the lane departure-avoidance deceleration, and calculation of the target brake hydraulic pressure for each wheel are carried out in the same manner as in the fourth embodiment above.

The above constitutes the computational processing performed by the driving/braking force control unit 8 in the fifth embodiment.

Here, the braking control method is selected in the same manner as in the fourth embodiment on the basis of the second to fourth obstacle-containing directions $A_{out}$, $RS_{out}$, and $SD_{out}$ obtained in step S3. The braking control method will now be described separately for each case or scenario.

The relationship between the lane departure direction $D_{out}$ and the second obstacle-containing direction $A_{out}$ is as follows (sixth to tenth scenarios).

Ninth Scenario

When the lane departure direction $D_{out}$ does not coincide with the second obstacle-containing direction $A_{out}$, and the longitudinal acceleration Yg is less than zero, lane departure-avoidance yaw control is commenced when the estimated time of departure $T_{out}$ becomes less than the first departure determination threshold Ts ($T_{out}$<Ts). Departure-avoidance yaw control is continued until the lane departure determination flag $F_{out}$ is set to OFF.

Because the longitudinal acceleration Yg here is less than zero, lane departure-avoidance yaw control is performed using a target yaw moment Ms that has been changed to a smaller value, just as in the fifth scenario.

Tenth Scenario

When the lane departure direction $D_{out}$ does not coincide with the second obstacle-containing direction $A_{out}$, and the longitudinal acceleration Yg is greater than zero, lane departure-avoidance yaw control is commenced when the estimated time of departure $T_{out}$ becomes less than the first departure determination threshold Ts ($T_{out}$<Ts). Lane departure-avoidance yaw control is continued until the lane departure determination flag $F_{out}$ is set to OFF.

Further, the estimated departure time $T_{out}$ is less than the second departure determination threshold Tr ($T_{out}$<Tr), lane departure-avoidance deceleration control is performed in addition to departure-avoidance yaw control.

Eleventh Scenario

When the lane departure direction $D_{out}$ coincides with the second obstacle-containing direction $A_{out}$, and the longitudinal acceleration Yg is less than zero, lane departure-avoidance yaw control is performed until the lane departure determination flag $F_{out}$ is set to OFF.

Here, the lane departure tendency is determined using the lane departure determination threshold (Ts+dTs2), which is obtained by adding a certain setting amount (hereinafter referred to as the second setting amount) dTs2 to the first departure determination threshold Ts. Departure-avoidance yaw control is thereby commenced when the estimated time of departure $T_{out}$ becomes less than the lane departure determination threshold (Ts+dTs2) ($T_{out}$<(Ts+dTs2)). As a result, the commencement of the lane departure-avoidance yaw control is advanced by an amount equal to the second setting amount dTs2.

Here, because the longitudinal acceleration Yg is less than zero, the lane departure-avoidance yaw control is performed using a target yaw moment Ms that has been changed to a smaller value, just as in the fifth scenario above.

Twelfth Scenario

When the lane departure direction $D_{out}$ coincides with the second obstacle-containing direction $A_{out}$, and the longitudinal acceleration Yg is greater than zero, lane departure-avoidance yaw control is performed until the lane departure determination flag $F_{out}$ is set to OFF.

Here, the lane departure tendency is determined using the lane departure determination threshold (Ts+dTs3), which is obtained by adding a certain setting amount (hereinafter referred to as the third setting amount) dTs3 to the first departure determination threshold Ts. For example, the third setting amount dTs3 is set to a value that is less than the first departure determination threshold Ts (Ts>dTs3).

As a result, lane departure-avoidance yaw control is commenced when the estimated time of departure $T_{out}$ becomes less than the lane departure determination threshold (Ts+dTs3) ($T_{out}$<(Ts+dTs3)). As a result, the commencement of the lane departure-avoidance yaw control is advanced by an amount equal to the third setting amount dTs3.

Here, because the longitudinal acceleration Yg is greater than zero, the target yaw moment Ms is left alone, rather than being changed to a smaller value, just as in the fourth scenario.

Departure-avoidance yaw control is thereby commenced when the estimated time of departure $T_{out}$ becomes less than the lane departure determination threshold (Ts+dTs3) ($T_{out}$<(Ts+dTs3)). As a result, the commencement of the lane departure-avoidance yaw control is advanced by an amount equal to the second setting amount dTs3.

Here, because the longitudinal acceleration Yg is greater than zero, the target yaw moment Ms is left alone, rather than being changed to a smaller value, just as in the fourth scenario.

Thirteenth Scenario

When the lane departure direction $D_{out}$ coincides with the second obstacle-containing direction $A_{out}$, and the longitudinal acceleration Yg is greater than zero, lane departure-avoidance yaw control is performed until the lane departure determination flag $F_{out}$ is set to OFF.

Here, the lane departure tendency is determined using the lane departure determination threshold (Ts+dTs4), which is obtained by adding a certain setting amount (hereinafter referred to as the fourth setting amount) dTs4 to the first departure determination threshold Ts. As a result, lane departure-avoidance yaw control is commenced when the estimated time of departure $T_{out}$ becomes less than the lane departure determination threshold (Ts+dTs4) ($T_{out}$<(Ts+dTs4)).

Further, the lane departure tendency is determined using the lane departure determination threshold (Ts+dTs5), which is obtained by adding a certain setting amount (hereinafter referred to as the fifth setting amount) dTs5 to the first departure determination threshold Ts. For example, the fifth setting amount dTs5 is set to a value that is less than the fourth departure determination threshold dTs4 (dTs4>dTs5). As a result, lane departure-avoidance deceleration control is also performed when the estimated time of departure $T_{out}$ becomes less than the lane departure determination threshold (Ts+dTs5) ($T_{out}$<(Ts+dTs5)).

As a result of this control, the commencement of departure-avoidance yaw control is advanced by an amount equal to the fourth setting amount dTs4, and the commencement of departure-avoidance deceleration control is advanced by an amount equal to the fifth setting amount dTs5.

Figure 18:
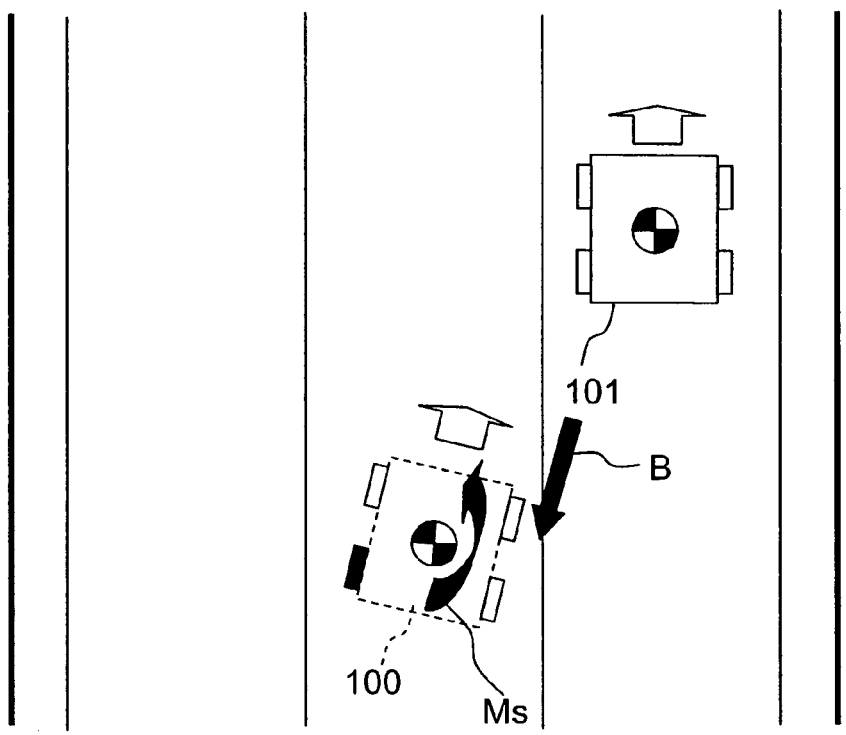
FIG. 18 is a diagram used for describing the vehicle behavior in the eleventh to thirteenth cases or scenarios.

FIG. 18 shows vehicle behavior when departure-avoidance yaw control is performed in the eleventh to thirteenth scenarios. The eleventh to thirteenth scenarios are cases where the lane departure direction $D_{out}$ coincides with the second obstacle-containing direction $A_{out}$. That is, as shown in FIG. 18, these are cases where the host vehicle 100 is in a tendency to depart to the right, and another vehicle 101 is present in that direction. In this case, lane departure-avoidance yaw control is performed at a specific timing. Also, in some cases departure-avoidance deceleration control is performed at a specific timing.

The second to fifth setting amounts dTs2, dTs3, dTs4, and dTs5 and the deceleration produced by departure-avoidance deceleration control can also be set on the basis of the distance to forward obstacles and so forth. For instance, since the distance to forward obstacles and so forth can be obtained from the ACC radar 31, the second to fifth setting amounts dTs2, dTs3, dTs4, and dTs5 and the deceleration produced by departure-avoidance deceleration control are set on the basis of the distance to forward obstacles and so forth obtained from the ACC radar 31.

For example, the shorter the distance, the more the second to fifth setting amounts dTs2, dTs3, dTs4, and dTs5 and the deceleration are increased. With settings such as these, the shorter the distance, the earlier the lane departure-avoidance yaw control commences. Also, the shorter the distance, the greater is the deceleration produced by departure-avoidance deceleration control.

The relationship between the lane departure direction $D_{out}$ and the third obstacle-containing direction $RS_{out}$ will now be described (eleventh to fourteenth scenarios).

Fourteenth Scenario

When the lane departure direction $D_{out}$ does not coincide with the third obstacle-containing direction $RS_{out}$, and the longitudinal acceleration Yg is less than zero, lane departure-avoidance yaw control is commenced when the estimated time of departure $T_{out}$ becomes less than the first departure determination threshold Ts ($T_{out}$<Ts). Departure-avoidance yaw control is continued until the lane departure determination flag $F_{out}$ is set to OFF.

Here, because the longitudinal acceleration Yg is less than zero, lane departure-avoidance yaw control is performed using a target yaw moment Ms that has been changed to a smaller value, just as in the fifth scenario.

Fifteenth Scenario

When the lane departure direction $D_{out}$ does not coincide with the third obstacle-containing direction $RS_{out}$, and the longitudinal acceleration Yg is greater than zero, lane departure-avoidance yaw control is commenced when the estimated time of departure $T_{out}$ becomes less than the first departure determination threshold Ts ($T_{out}$<Ts). Departure-avoidance yaw control is continued until the lane departure determination flag $F_{out}$ is set to OFF.

Here, because the longitudinal acceleration Yg is greater than zero, the target yaw moment Ms is left alone, rather than being changed to a smaller value, just as in the fourth scenario.

Sixteenth Scenario

When the lane departure direction $D_{out}$ coincides with the third obstacle-containing direction $RS_{out}$, and the longitudinal acceleration Yg is less than zero, lane departure-avoidance yaw control is performed until the lane departure determination flag $F_{out}$ is set to OFF.

Here, the lane departure tendency is determined using the lane departure determination threshold (Ts+dTs6), which is obtained by adding a certain setting amount (hereinafter referred to as the sixth setting amount) dTs6 to the first departure determination threshold Ts. For example, the sixth setting amount dTs6 is set to a value that is less than the first departure determination threshold Ts (Ts>dTs6).

As a result, lane departure-avoidance yaw control is commenced when the estimated time of departure $T_{out}$ becomes less than the lane departure determination threshold (Ts+dTs6) ($T_{out}$<(Ts+dTs6)). As a result, the commencement of departure-avoidance yaw control is advanced by an amount equal to the sixth setting amount dTs6.

Here, because the longitudinal acceleration Yg is less than zero, lane departure-avoidance yaw control is performed using a target yaw moment Ms that has been changed to a smaller value, just as in the fifth scenario.

Also, the target yaw moment Ms is calculated from Equation (3) in step S7. Here, the gains K1 and K2 can be set to different values in Equation (3). For example, gain K1 is set to gain (K1+dK1), and gain K2 is set to gain (K2+dK2). Here, dK1 and dK2 are predetermined values for changing the gains K1 and K2. As a result, lane departure-avoidance yaw control produced by the target yaw moment Ms obtained with using the gains (K1+dK1) and (K2+dK2) is performed when the estimated time of departure $T_{out}$ becomes less than the lane departure determination threshold (Ts+dTs6) ($T_{out}$<(Ts+dTs6)).

When the target yaw moment Ms is thus changed to a large value, the setting of the target yaw moment Ms can be limited with a maximum value $M_{max}$. That is, even though the predetermined values dK1 and dK2 are set according to certain conditions, the target yaw moment Ms is set to the maximum value $M_{max}$ with no relation to the predetermined values dK1 and dK2 if the target yaw moment Ms obtained using the predetermined values dK1 and dK2 is over the maximum value $M_{max}$.

Seventeenth Scenario

When the lane departure direction $D_{out}$ coincides with the third obstacle-containing direction $RS_{out}$, and the longitudinal acceleration Yg is greater than zero, lane departure-avoidance yaw control is commenced when the estimated time of departure $T_{out}$ becomes less than the first departure determination threshold Ts ($T_{out}$<Ts). Departure-avoidance yaw control is then continued until the lane departure determination flag $F_{out}$ is set to OFF.

Here, because the longitudinal acceleration Yg is greater than zero, the target yaw moment Ms is left alone, rather than being changed to a smaller value, just as in the fourth scenario.

Also, the lane departure tendency is determined using the lane departure determination threshold (Ts+dTs7), which is obtained by adding a certain setting amount (hereinafter referred to as the seventh setting amount) dTs7 to the first departure determination threshold Ts. For example, the seventh setting amount dTs7 is set to a value that is less than the first departure determination threshold Ts (Ts>dTs7).

As a result, lane departure-avoidance deceleration control is performed when the estimated time of departure $T_{out}$ becomes less than the lane departure determination threshold (Ts+dTs7) (i.e., $T_{out}$<(Ts+dTs7)). As a result, when there is a lane departure tendency, the commencement of departure-avoidance deceleration control is advanced by an amount equal to the seventh setting amount dTs7, after which departure-avoidance yaw control is performed.

Again in this seventeenth scenario, the target yaw moment Ms can be set as described in the thirteenth scenario.

Figure 19:
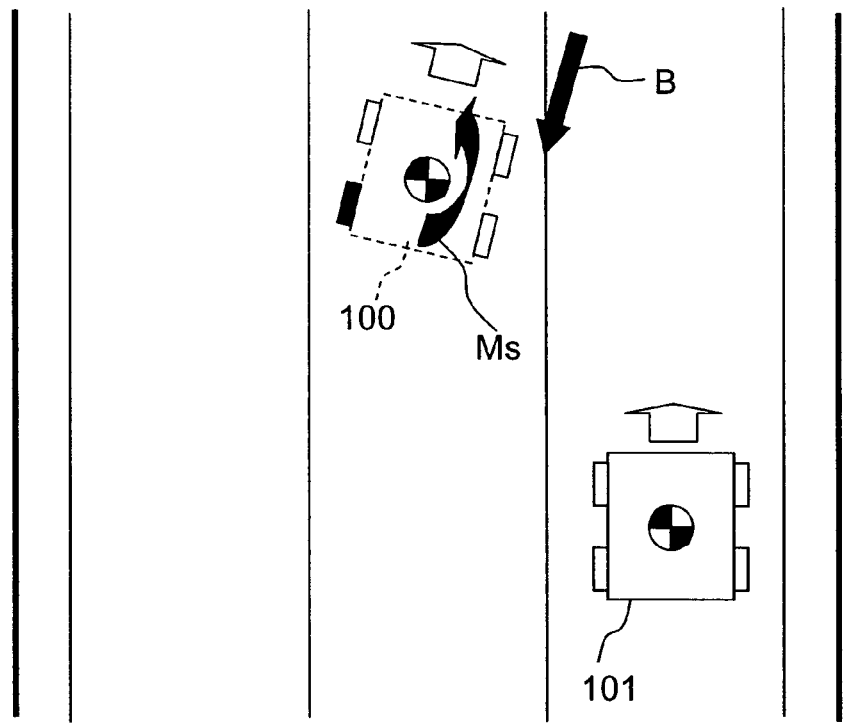
FIG. 19 is a diagram used for describing the vehicle behavior in the sixteenth and seventeenth scenarios.

FIG. 19 shows vehicle behavior when departure-avoidance yaw control is performed in the sixteenth and seventeenth scenarios. The sixteenth and seventeenth scenarios are cases where the lane departure direction $D_{out}$ coincides with the third obstacle-containing direction $S_{out}$. That is, they are cases in which the host vehicle 100 has a tendency to depart to the right, and another vehicle 101 is present in the adjacent right lane and trailing the host vehicle 100, as shown in FIG. 19. The lane departure-avoidance yaw control is performed in this case. Also, the lane departure-avoidance deceleration control is performed at a specific timing in some cases.

The relationship between the lane departure direction $D_{out}$ and the fourth obstacle-containing direction $S_{out}$. That, is as follows (eighteenth to twenty-first scenarios).

Eighteenth Scenario

When the lane departure direction $D_{out}$ does not coincide with the fourth obstacle-containing direction $SD_{out}$, and the longitudinal acceleration Yg is less than zero, lane departure-avoidance yaw control is commenced when the estimated time of departure $T_{out}$ becomes less than the first departure determination threshold Ts ($T_{out}$<Ts). Departure-avoidance yaw control is continued until the lane departure determination flag $F_{out}$ is set to OFF.

Because the longitudinal acceleration Yg here is less than zero, lane departure-avoidance yaw control is performed using a target yaw moment Ms that has been changed to a smaller value, just as in the fourth scenario.

Nineteenth Scenario

When the lane departure direction $D_{out}$ does not coincide with the fourth obstacle-containing direction $SD_{out}$, and the longitudinal acceleration Yg is greater than zero, lane departure-avoidance yaw control is commenced when the estimated time of departure $T_{out}$ becomes less than the first departure determination threshold Ts ($T_{out}$<Ts). Departure-avoidance yaw control is continued until the lane departure determination flag $F_{out}$ is set to OFF.

Because the longitudinal acceleration Yg here is greater than zero, the target yaw moment Ms is left alone, rather than being changed to a smaller value, just as in the fourth scenario.

Also, the lane departure tendency is determined using the lane departure determination threshold (Ts+dTs8), which is obtained by adding a certain setting amount (hereinafter referred to as the eighth setting amount) dTs8 to the first departure determination threshold Ts. For example, the eighth setting amount dTs8 is set to a value that is less than the first departure determination threshold Ts (Ts>dTs8). As a result, lane departure-avoidance deceleration control is performed when the estimated time of departure $T_{out}$ becomes less than the lane departure determination threshold (Ts+dTs8) ($T_{out}$<(Ts+dTs8)).

As a result, lane departure-avoidance deceleration control is performed when the estimated time of departure $T_{out}$ becomes less than the lane departure determination threshold (Ts+dTs7) ($T_{out}$<(Ts+dTs7)). As a result, when there is a lane departure tendency, the commencement of departure-avoidance deceleration control is advanced by an amount equal to the eighth setting amount dTs8, after which departure-avoidance yaw control is performed.

Twentieth Scenario

When the lane departure direction $D_{out}$ coincides with the fourth obstacle-containing direction $SD_{out}$, and the longitudinal acceleration Yg is less than zero, lane departure-avoidance yaw control is performed until the lane departure determination flag $F_{out}$ is set to OFF.

Because the longitudinal acceleration Yg here is less than zero, lane departure-avoidance yaw control is performed using a target yaw moment Ms that has been changed to a smaller value, just as in the fifth scenario.

Also, the lane departure tendency is determined using the lane departure determination threshold (Ts+dTs9), which is obtained by adding a certain setting amount (hereinafter referred to as the ninth setting amount) dTs9 to the first departure determination threshold Ts. As a result, lane departure-avoidance yaw control is commenced when the estimated time of departure $T_{out}$ becomes less than the lane departure determination threshold (Ts+dTs9) ($T_{out}$<(Ts+dTs9)).

Further, lane departure-avoidance deceleration control is performed when the estimated time of departure $T_{out}$ becomes less than the lane departure determination threshold (Ts+dTs9) ($T_{out}$<(Ts+dTs9)). As a result, the commencement of departure-avoidance deceleration control is advanced by an amount equal to the ninth setting amount dTs9, after which departure-avoidance yaw control is performed.

Twenty-first Scenario

When the lane departure direction $D_{out}$ coincides with the fourth obstacle-containing direction $SD_{out}$, and the longitudinal acceleration Yg is greater than zero, lane departure-avoidance deceleration control is performed until the lane departure determination flag $F_{out}$ is set to OFF.

Because the longitudinal acceleration Yg here is greater than zero, the target yaw moment Ms is left alone, rather than being changed to a smaller value, just as in the fourth scenario.

Here, the lane departure tendency is determined using the lane departure determination threshold (Ts+dTs10), which is obtained by adding a certain setting amount (hereinafter referred to as the tenth setting amount) dTs10 to the first departure determination threshold Ts. As a result, lane departure-avoidance deceleration control is commenced when the estimated time of departure $T_{out}$ becomes less than the lane departure determination threshold (Ts+dTs10) ($T_{out}$<(Ts+dTs10)).

Further, lane departure-avoidance yaw control is performed when the estimated time of departure $T_{out}$ becomes less than the lane departure determination threshold Ts ($T_{out}$<Ts). As a result, the commencement of departure-avoidance deceleration control is advanced by an amount equal to the tenth setting amount dTs10, after which departure-avoidance yaw control is performed.

Figure 20:
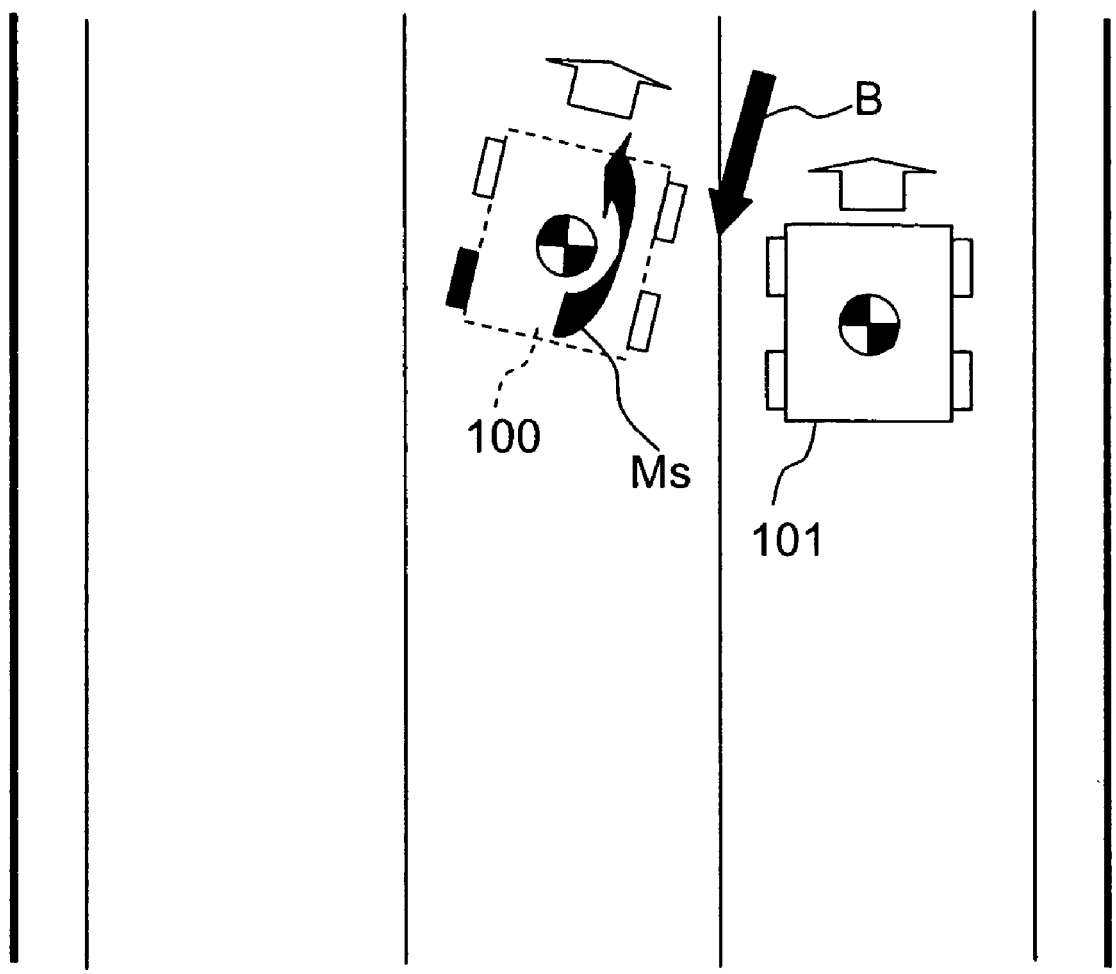
FIG. 20 is a diagram used for describing the vehicle behavior in the twentieth and twenty-first cases or scenarios.
Figure 21:
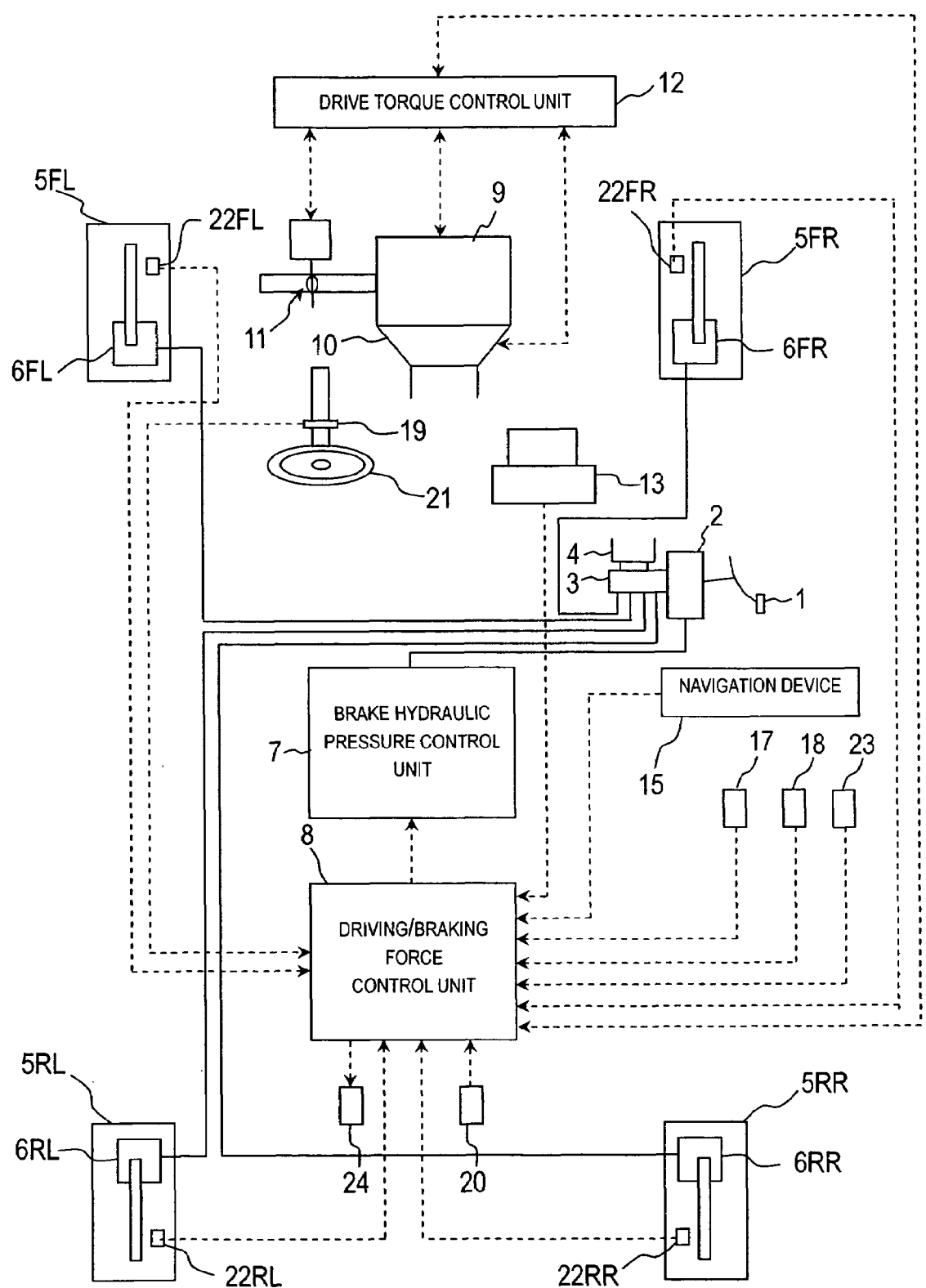
FIG. 21 is a schematic structural diagram of a vehicle equipped with a lane departure prevention apparatus in accordance a sixth embodiment of the present invention.

FIG. 20 shows vehicle behavior when departure-avoidance yaw control is performed in the twentieth and twenty-first scenarios. The twentieth and twenty-first scenarios are cases where there is a match between the lane departure direction $D_{out}$ coincides with the fourth obstacle-containing direction $SD_{out}$. That is, the host vehicle 100 has a tendency to depart to the right, and another vehicle 101 is present in the adjacent right lane traveling side-by-side with the host vehicle 100, as shown in FIG. 20. Departure-avoidance deceleration control and departure-avoidance yaw control are performed at a specific timing in this case.

The target brake hydraulic pressure Psi (i=fl, fr, rl, rr) for each wheel is selected in the same manner as in the fourth embodiment. That is, the target brake hydraulic pressure Psi (i=fl, fr, rl, rr) for each wheel is calculated so as to perform the braking control method in the ninth to twenty-first scenarios. The calculated target brake hydraulic pressure Psi (i=fl, fr, rl, rr) for each wheel is outputted to the brake hydraulic pressure control unit 7 as a brake hydraulic pressure command value. The brake hydraulic pressure control unit 7 individually controls the brake hydraulic pressure for the wheel cylinders 6FL to 6RR on the basis of the brake hydraulic pressure command value.

Departure-avoidance control is thereby carried out on the basis of the control content determined on the basis of the second to fourth obstacle-containing directions $A_{out}$, $RS_{out}$, and $SD_{out}$ (the control content in the ninth to twenty-first scenarios). As a result, lane departure of the host vehicle is avoided. Meanwhile, the driver can tell that the host vehicle is in a lane departure tendency when he feels the deceleration in the direction of travel or acceleration in the lateral direction caused by the lane departure-avoidance action of the vehicle.

The effects of the fifth embodiment will now be described.

Just as in the fourth embodiment, if the host vehicle has a lane departure tendency while decelerating, the target yaw moment used for departure-avoidance yaw control is set to a small value (as in the ninth scenario, for example). This prevents disturbance to the vehicle behavior, and also prevents the driver from being caused any discomfort or annoyance.

Also, just as in the fourth embodiment, if the host vehicle has a lane departure tendency while accelerating, lane departure-avoidance deceleration control is first performed (as in the seventeenth scenario, for example). This prevents the driver from being caused any discomfort or annoyance.

Further, in the fifth embodiment, if another vehicle is present in the lane departure direction, lane departure-avoidance deceleration control is first performed (as in the twelfth scenario, for example). This prevents the host vehicle from coming into contact with another vehicle. It also prevents the driver of the vehicle from experiencing any unpleasant sensations or the like.

Furthermore, if another vehicle is present in the lane departure direction, the host vehicle can be prevented from coming into contact with the other vehicle by at least performing departure-avoidance deceleration control, either before or after the lane departure-avoidance yaw control (as in the twentieth and twenty-first scenarios, for example).

Also, just as in the fourth embodiment, if the host vehicle has a lane departure tendency while accelerating, lane departure-avoidance deceleration control is performed after departure-avoidance yaw control is performed (as in the thirteenth scenario, for example). As a result, lane departure-avoidance deceleration control is performed even when there has been disturbance to the vehicle behavior, allowing disturbance to the vehicle behavior to be suppressed. Also, even if the host vehicle approaches an obstacle or the like, the degree of this approach is reduced and contact prevented.

Embodiments of the present invention have been described above, but the present invention is not limited to being realized as the above embodiments. That is, methods of combining braking control (departure-avoidance yaw control) so that yaw moment for avoiding departure is imparted to the vehicle, and deceleration control (departure-avoidance deceleration control) for decelerating to avoiding departure, the operating procedures of these methods, and the control amounts thereof (magnitude of the yaw moment and magnitude of the deceleration) were described in detail in the above embodiments, but it should go without saying that the present invention is not limited by these descriptions.

For example, in the above embodiments there is no specific mention of a case in which the amount of control (deceleration) in departure-avoidance deceleration control is determined on the basis of the amount of acceleration or deceleration of the vehicle, but the amount of control (deceleration) in departure-avoidance deceleration control can be determined on the basis of the amount of acceleration or deceleration of the vehicle. For instance, the amount of control (deceleration) in departure-avoidance deceleration control can be reduced when the vehicle is decelerating.

Also, in the above embodiments the description was of a brake structure that employed hydraulic pressure, but it should go without saying that the present invention is not limited to this. For instance, electric friction braking, in which a friction material is pressed against a rotating wheel member, or electric generating braking or regenerative braking that create an electrical braking action. It is also possible to employ engine braking, in which braking is controlled by varying the valve timing of the engine, for example, transmission braking, in which an action similar to engine braking is achieved by varying the gear ratio, or air braking.

Also, in the above embodiments the estimated time of departure $T_{out}$ was calculated on the basis of the lateral displacement X and the amount of change dx therein (see Equation (2) above), but the estimated time of departure $T_{out}$ can be obtained by some other method. For instance, the estimated time of departure $T_{out}$ can be obtained on the basis of the yaw angle φ, the driving lane curvature β, the yaw rate φ', or the steering angle δ.

Also, in the above embodiments the intention of the driver to make a lane change was ascertained on the basis of the steering angle δ and the amount of change Δδ therein (see step S5), but the intention of the driver to make a lane change can be ascertained by some other method. For instance, the intention of the driver to make a lane change can be ascertained on the basis of the steering torque.

Also, the target yaw moment Ms was calculated in the above embodiments on the basis of the lateral displacement X and the amount of change dx (see Equation (3) above), but the target yaw moment Ms can also be obtained by another method. For instance, the target yaw moment Ms can be obtained on the basis of the yaw angle φ, the lateral displacement X, or the driving lane curvature β, as shown in Equation (13) presented above.

Also, as discussed above, when the longitudinal acceleration Yg is less than zero, the target yaw moment Ms is changed to a smaller value. In this case, the target yaw moment Ms is set to a smaller value by changing the gains K1, K3, K4, and K5 in Equation 13 to K1', K3', K4', and K5', respectively.

Also, in the above embodiments the target brake hydraulic pressure Pfg for the front wheels was described using a specific equation (see Equation 4 above), but the present invention is not limited to this. For instance, the target brake hydraulic pressure Pfg for the front wheels can be calculated from the following Equation (14).

Also, the target hydraulic pressure differentials ΔPsf and ΔPsr for the front and rear wheels were calculated in order to achieve departure-avoidance yaw control in the above embodiments (see Equations (7) and (8) above), but the present invention is not limited to this. For instance, lane departure-avoidance yaw control can be achieved with the front wheel target hydraulic pressure differential ΔPsf alone. In this case, the front wheel target hydraulic pressure differential ΔPsf is calculated from Equation 15 presented above.

Further, in the above description of the embodiments, the driving/braking control unit 8 constitutes the setting section for setting one or more of the yaw moment allotted to the host vehicle, the host vehicle deceleration allotment, the timing at which the imparting of yaw moment is commenced, and the timing at which the deceleration of the host vehicle is commenced, on the basis of the acceleration or deceleration of the host vehicle. That is, the processing of the driving/braking control unit 8 for selecting the control method, performed in step S6 shown in FIG. 2, constitutes the above-mentioned setting section.

Also, the ACC radar 31, rear lateral obstacle monitoring radars 32 and 33, and lateral obstacle monitoring radars 34 and 35 constitute the obstacle detection section for detecting obstacles around the host vehicle.

Sixth Embodiment

Referring now to FIGS. 21 to 27, a vehicle equipped with a lane departure prevention apparatus in accordance with a sixth embodiment will now be explained. The configuration of the vehicle in this sixth embodiment (see FIG. 21) is preferably equipped with all of the features of the first embodiment (see FIG. 1), but also further includes a stroke sensor 23 for detecting the amount (stroke length) Ls of braking operation by the driver. In view of the similarity between the sixth and prior embodiments, the parts or steps of the sixth embodiment that are identical to the parts or steps of the prior embodiments will be given the same reference numerals as the parts or steps of the sixth embodiment. Moreover, the descriptions of the parts or steps of the sixth embodiment that are identical to the parts or steps of the prior embodiments may be omitted for the sake of brevity. In other words, unless otherwise specified, the rest of the configuration of the vehicle in the sixth embodiment is the same as the configuration of the prior embodiments.

The lane departure prevention control processing performed by the control unit 8 will now be described through reference to the flowchart of FIG. 22. In this lane departure prevention control processing, first, in step S51, various kinds of data are read from the above-mentioned sensors or controller. More specifically, the data that is read at least includes the wheel speeds $Vw_i$, the master cylinder pressure Pm, the steering angle δ, turn signal switch signal WS, and stroke length Ls detected by the various sensors discussed above, and the vehicle yaw angle φ with respect to the driving lane, lateral displacement X from the center of the driving lane, the curvature β of the driving lane, and the driving lane width L obtained from the camera controller of the imaging unit 13.

Next, the processing moves to step S52 where, the host vehicle velocity V is calculated based on the average value of the wheel velocities of the non-driven wheels. In the illustrated embodiment, the host vehicle is driven by the rear wheels, so the host vehicle velocity V is calculated based on the velocities $Vw_{FL}$ and $Vw_{FR}$ of the front left and right wheels 5FL and 5FR. In any case, the host vehicle velocity V is calculated using one of the Equations (1) as presented above, based on the wheel velocity Vwi of the non-driven wheels that was read in the above-described step S51.

Figure 23:
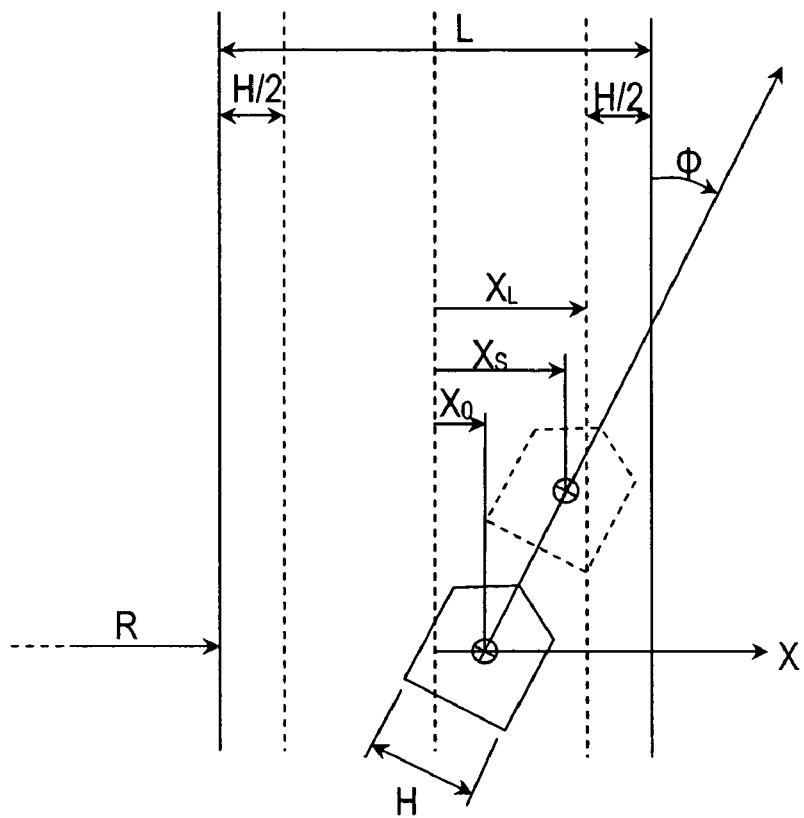
FIG. 23 is a diagram illustrating the estimated departure value used in the sixth embodiment of the present invention.

Then, as shown in FIG. 23, the estimated lateral displacement after a predetermined time Tt (sec), that is, the estimated departure value $X_S$, is calculated in step S53. Specifically, the estimated departure value $X_S$ is calculated according to Equation (16) below on the basis of the lateral displacement X from the center of the driving lane read in step S1 above, and the lateral displacement speed dX calculated by differentiating the lateral displacement X, for example. The flow then moves to step S54.

$$X_S = dX \times Tt \times X \tag{16}$$

This estimated departure value $X_S$ can also be calculated according to Equation (17) below on the basis of the vehicle yaw angle φ with respect to the driving lane of the host vehicle, lateral displacement X from the center of the driving lane, and curvature β of the driving lane as read in step S51 above, and the host vehicle speed V calculated in step S52 above.

$$X_S = Tt \times V \times (\phi + Tt \times V \times \beta) + X \tag{17}$$

The estimated departure value $X_S$ is a positive value when the lane departure is to the left.

The lane departure of the host vehicle is evaluated by comparing this estimated departure value $X_S$ to the position of the boundary line of the vehicle center of gravity in the driving lane, that is, the lane departure boundary line $X_L$. First, the lane departure boundary line $X_L$ is calculated in step S54. The lane departure boundary line $X_L$ is calculated from Equation (18) below using the driving lane width L and the host vehicle width H. The right side has a positive value.

$$X_L = \pm(L-H)/2 \qquad (18)$$

Then, in step S55, it is determined whether the absolute value $|X_S|$ of the estimated departure value $X_S$ is greater than or equal to the absolute value $|X_L|$ of the lane departure boundary line $X_L$, and if $|X_S|<|X_L|$, the flows moves to step S56, a departure determination flag $F_{out}$ is reset to "0," which means that the host vehicle is not in a lane departure tendency, and the processing continues to step S61 (discussed below).

If $|X_S| \geq |X_L|$, though, the processing continues to step S57, the lane departure determination flag $F_{out}$ is set to "1," which means that the host vehicle is in a lane departure tendency, and the processing continues to step S58, where it is determined whether the estimated departure value $X_S$ is positive or negative. If $X_S \geq 0$, it is determined that the lane departure is to the left, the processing continues to step S59, a departure direction flag $D_{out}$ is set to "1," and then the processing continues to step S60 (discussed below).

The intention of the driver to change lanes is then determined from the turn signal switch and the steering angle. First, in step S61, it is determined whether the turn signal switch 20 is on or off. If it is on, the processing continues to step S62, where it is determined whether or not the operation direction of the turn signal switch 20 coincides with the lane departure direction determined by the direction flag $D_{out}$. If the two directions do coincide, it is determined that a lane change is in progress, the processing continues to step S63, the lane departure determination flag $F_{out}$ is reset to "0," and then the processing continues to step S65. On the other hand, if the two directions do not coincide, it is determined that a lane change is not in progress, and the processing continues straight to step S65 (discussed below).

If the result of the evaluation in step S61 is that the turn signal switch 20 is on, then the processing continues to step S64, where it is determined whether the steering angle δ is greater than or equal to a predetermined steering angle setting δs, and whether the steering angle change amount Δδ is greater than or equal to a predetermined change amount setting Δδs. If δ≧δs and Δδ≧Δδs occurs, it is determined that it is the intention of the driver to change lanes, and the processing continues to step S63. On the other hand, if δ<δs or Δδ<Δδs occurs, it is determined that it is not the intention of the driver to change lanes, and the processing continues to step S65.

Incidentally, the intention of the driver to make a lane change is determined here on the basis of the steering angle δ and the steering angle change amount Δδ, but is not limited to this, and can instead be determined by detecting the steering torque.

Figure 24:
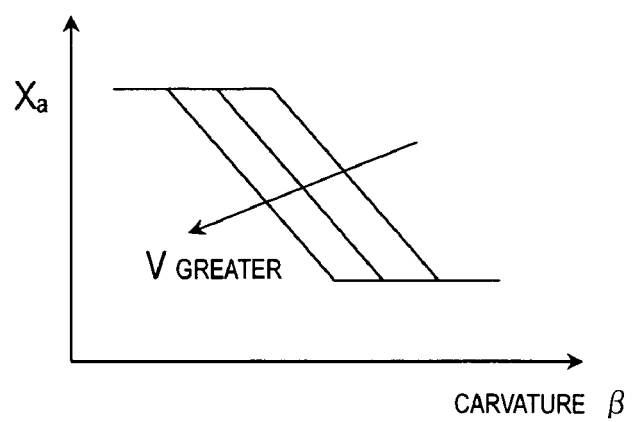
FIG. 24 is a parameter calculation diagram or map used in the sixth embodiment of the present invention.

In step S65, a parameter Xa, which is the threshold for determining the necessity of deceleration control, is calculated by reference to the parameter calculation map shown in FIG. 24, on the basis of the lane curvature β and the vehicle speed V. This parameter calculation map is set so that the greater is the curvature β, or the higher is the vehicle speed V, the smaller will be the calculated result for the parameter Xa.

Then, in step S66, it is determined whether $|X_S|-|X_L|$ is occurring, which is obtained by subtracting the absolute value of the lane departure boundary line $X_L$ from the absolute value of the estimated departure value $X_S$, is greater than or equal to the parameter Xa calculated in step S65 above. If $|X_S|-|X_L| \geq Xa$ occurs, that is, if the estimated departure value $X_S$ departs by at least Xa from the lane departure boundary line $X_L$, it is determined that deceleration control of the host vehicle is necessary, the processing continues to step S67, a deceleration control actuation flag Fgs is set to "1," and the flow then moves to step S69. Also, if the result of the evaluation in step S66 is that $|X_S|-|X_L|<Xa$, then the processing continues to step S68, the deceleration control actuation flag Fgs is set to "0," and then the processing continues to step S69.

Since the deceleration control actuation flag Fgs is set in this manner, if the curve of the driving lane ahead of the host vehicle is gentle and the estimated departure value $X_S$ is small, for example, Fgs will equal zero, so the host vehicle will not decelerate and the driver will not experience any discomfort.

Also, since the parameter Xa is set to decrease as the curvature β of the driving lane of the host vehicle increases, if a sharp curve should appear ahead of the host vehicle, for example, this will result in $|X_S|-|X_L| \geq Xa$ and the deceleration control actuation flag Fgs will be set to "1," so the host vehicle will be decelerated so as to suppress an increase in estimated departure value $X_S$.

Further, since the parameter Xa is set to decrease as the vehicle speed V increases, if the host vehicle is traveling at high speed, for example, this will result in $|X_S|-|X_L| \geq Xa$ and the deceleration control actuation flag Fgs will be set to "1," so the host vehicle will be decelerated so as to suppress an increase in estimated departure value $X_S$.

In step S69, it is determined whether the lane departure determination flag $F_{out}$ has been set to "1," which means that the host vehicle is in a lane departure tendency. If $F_{out}=1$, the processing continues to step S70, the alarm signal AL is outputted to the alarm device 24 to actuate an alarm, and the flow then proceeds to step S71.

In step S71, the computation of Equation (19) below is performed to calculate the target yaw moment Ms, after which the processing continues to step S74 (discussed below).

$$Ms = Ks \times (X_S - X_L) \qquad (19)$$

Figure 25:
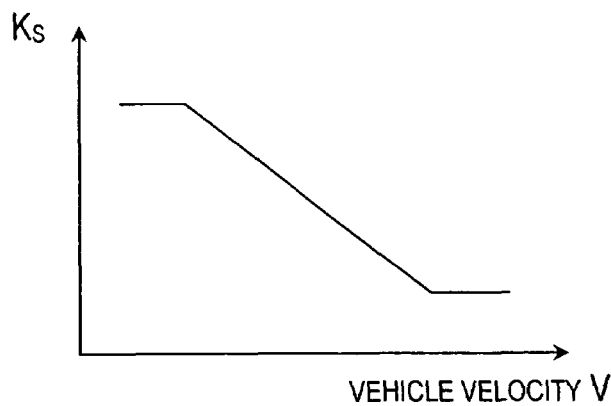
FIG. 25 is a gain calculation diagram or map used in the sixth embodiment of the present invention.

The term Ks here is a positive value that fluctuates with the vehicle speed V, and is calculated along with the vehicle speed V through reference to the gain calculation map shown in FIG. 25.

If the result of the evaluation in step S69 is that $F_{out}=0$, the processing continues to step S72, the output of the alarm signal AL is halted, and then processing continues to step S73, where the target yaw moment Ms is set to 0 (zero) as in Equation (20) below, and the flow then moves to step S74.

$$Ms=0 \qquad (20)$$

In step S74, target brake hydraulic pressure calculation processing is performed in which the target brake hydraulic pressure $Ps_i$ (i=FL to RR) for each wheel is calculated according to the target yaw moment Ms and the master cylinder hydraulic pressure Pm.

Next, the processing continues to step S75, where the target brake hydraulic pressures $Ps_{FL}$ to $Ps_{RR}$ calculated in step S74 above are outputted to the brake hydraulic pressure control circuit 7, after which timer interrupt processing is completed and the flow returns to the specified main program.

Figure 26:
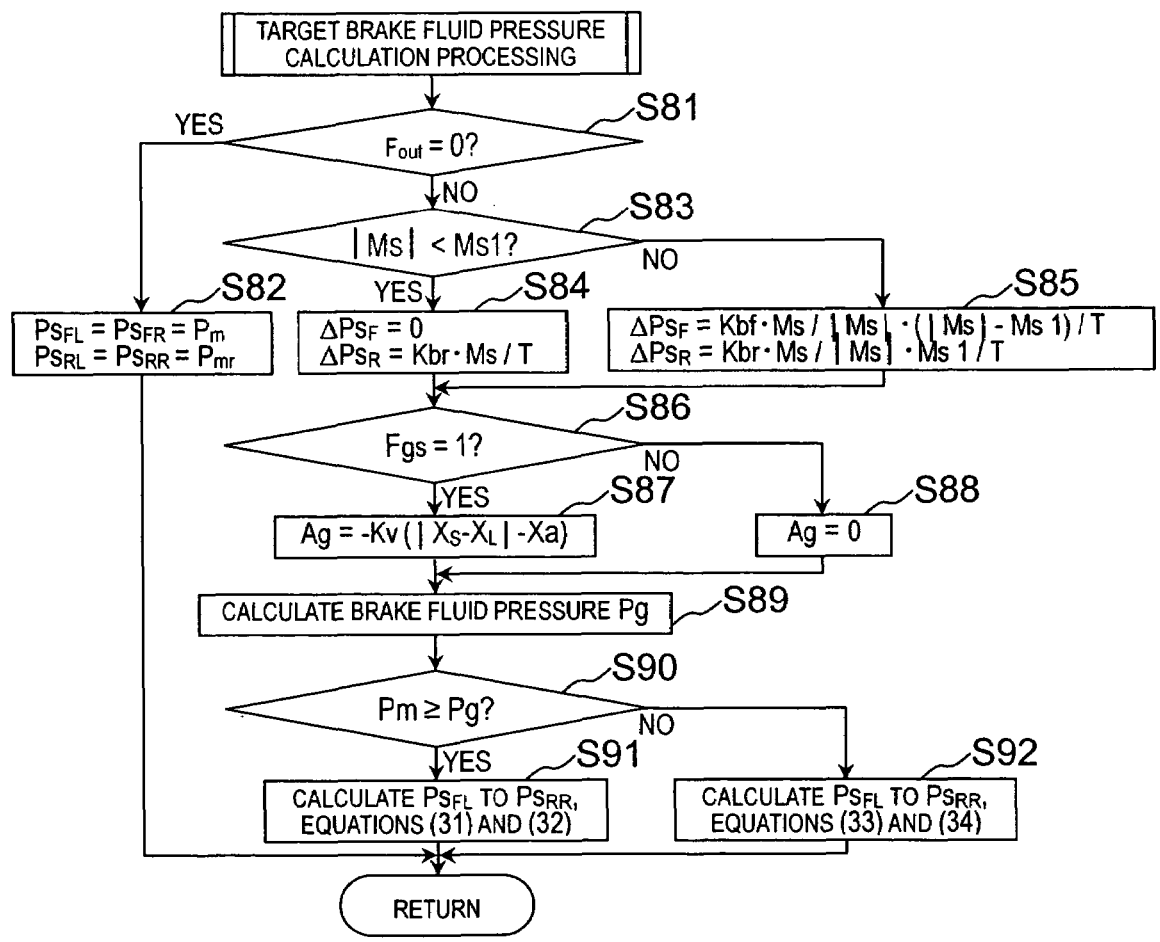
FIG. 26 is a flowchart illustrating the target brake hydraulic pressure calculation processing in the lane departure prevention control processing of FIG. 22 in accordance the sixth embodiment of the present invention.

In step S74, the target brake hydraulic pressure calculation processing shown in FIG. 26 is performed, and it is first determined in step S91 whether the lane departure determination flag $F_{out}$ has been reset to "0."

If the result of the evaluation in step S81 is that $F_{out}=0$, the processing continues to step S82, and then, as shown in Equation (21) below, the target brake hydraulic pressure $Ps_{FL}$ for the left front wheel and the target brake hydraulic pressure $Ps_{FR}$ for the right front wheel are set to ½ the front wheel master cylinder pressure Pmf, which takes into account the front and rear distribution calculated from the master cylinder hydraulic pressure Pm, and as shown in Equation (22) below, the target brake hydraulic pressure $Ps_{RL}$ for the left rear wheel and the target brake hydraulic pressure $Ps_{RR}$ for the right rear wheel are set to ½ the front wheel master cylinder pressure Pmr, which takes into account the front and rear distribution calculated from the master cylinder hydraulic pressure Pm. The target brake hydraulic pressure calculation processing is then completed and the flow returns to the specified main program.

$$Ps_{FL}=Ps_{FR}=Pmf/2 \qquad (21)$$

$$Ps_{RL}=Ps_{RR}=Pmr/2 \qquad (22)$$

On the other hand, if the result of the evaluation in step S81 is that $F_{out}=1$, the processing continues to step S83, it is determined whether the absolute value of the target yaw moment Ms is greater than or equal to a predetermined setting Ms1, and if |Ms|<Ms1, the processing continues to step S84, where target brake hydraulic pressure differentials $\Delta Ps_F$ and $\Delta Ps_R$ are calculated from Equations (23) and (24) below, and the setting is made such that there will be a difference only in the braking force of the left and right rear wheels, after which the processing continues to step S86.

$$\Delta Ps_F=0 \qquad (23)$$

$$\Delta Ps_R=Kbr \cdot Ms/T \qquad (24)$$

Here, the term T is the tread, which is the same for the front and rear wheels. The term Kbr is a conversion factor for converting braking force into brake hydraulic pressure, and is dictated by the brake specifications.

On the other hand, if the result of the evaluation in step S83 is that |Ms|≧Ms1, the processing continues to step S85, where the target brake hydraulic pressure differentials $\Delta Ps_F$ and $\Delta Ps_R$ are calculated from Equations (25) and (26) below, and the setting is made such that there will be a difference in the braking force of the various wheels, after which the processing continues to step S86.

$$\Delta Ps_F=Kbf \cdot Ms/|Ms| \cdot (|Ms|-Ms1)/T \qquad (25)$$

$$\Delta Ps_R=Kbr \cdot Ms/|Ms| \cdot Ms1/T \qquad (26)$$

Here, the term Kbf is a conversion factor for converting braking force into brake hydraulic pressure, and is dictated by the brake specifications. In this case, just the front wheels can instead be controlled, so that the setting is $\Delta Ps_F=Kbf \cdot Ms/T$.

In step S86, it is determined whether the deceleration control actuation flag Fgs has been set to "1," which means that deceleration control is actuated, and if Fgs=1, the processing continues to step S87, the target deceleration amount Ag is calculated from Equation (27) below using the parameter Xa calculated in step S64 above, and the processing continues to step S89.

$$Ag=-Kv \times (|X_S|-|X_L|-Xa) \qquad (27)$$

Here, the term Kv is a proportional constant determined from the vehicle specifications.

If the result of the evaluation in step S86 is that Fgs=0, the processing continues to step S88, and the target deceleration amount Ag is set to 0 (zero) as in Equation (28) below, after which the processing continues to step S89.

$$Ag=0 \qquad (28)$$

In step S89, the target brake hydraulic pressure Pg for generating braking force at the left and right wheels with the aim of decelerating the host vehicle is calculated from Equation (29) below, after which the processing continues to step S90.

$$Pg=Kg \times Ag \qquad 29)$$

Here, the term Kg is a proportional constant determined from the vehicle specifications. The target brake hydraulic pressure Pg serving as the driving state deceleration amount thus calculated on the basis of the driving state of the host vehicle becomes the minimum amount of deceleration required to suppress discomfort to the vehicle occupants attributable to the yaw moment imparted to the vehicle during departure-avoidance control.

In step S90, it is determined whether the master cylinder hydraulic pressure Pm serving as the vehicle deceleration amount corresponding to the braking operation amount produced when the driver operates the brakes is greater than or equal to the target brake hydraulic pressure Pg calculated in step S89 above. If Pm≧Pg, the processing continues to step S91, where the lane departure direction of the host vehicle is determined. If the lane departure is to the right, the target brake hydraulic pressure $Ps_i$ for each wheel is calculated from Equations (31) below, and if the lane departure is to the left, the target brake hydraulic pressure $Ps_i$ for each wheel is calculated from Equations (32) below. The target brake hydraulic pressure calculation processing is then concluded, and the flow returns to the specified main program.

$$Ps_{FL}=\Delta Ps_F/2+Pmf/2,$$

$$Ps_{FR}=-\Delta Ps_F/2+Pmf/2,$$

$$Ps_{RL}=\Delta Ps_R/2+Pmr/2,$$

$$Ps_{RR}=-\Delta Ps_R/2+Pmr/2 \qquad (31)$$

and $$Ps_{FL}=-\Delta Ps_F/2+Pmf/2,$$

$$Ps_{FR}=\Delta Ps_F/2+Pmf/2,$$

$$Ps_{RL}=-\Delta Ps_R/2+Pmr/2,$$

$$Ps_{RR}=\Delta Ps_R/2+Pmr/2 \qquad (32)$$

Figure 27:
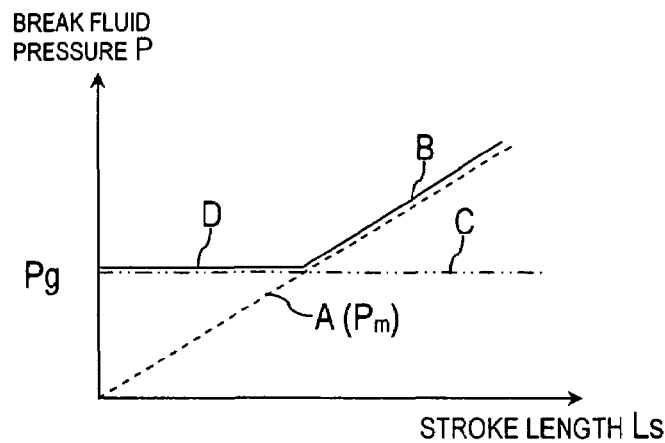
FIG. 27 is a graph of the relationship between stroke length and brake hydraulic pressure used in the sixth embodiment.

The dashed line A in FIG. 27 corresponds to the relationship between the amount of operation (stroke length) Ls by the driver and the master brake hydraulic pressure Pm, so in this case the brake hydraulic pressure for the ultimate deceleration, excepting the brake hydraulic pressure for generating yaw moment, is as indicated by the solid line B in FIG. 27.

If the result of the evaluation in step S90 is that Pm<Pg, the processing continues to step S92, and the lane departure direction of the host vehicle is determined. If the lane departure is to the right, the target brake hydraulic pressure $Ps_i$ for each wheel is calculated from Equations (33) below, and if the lane departure is to the left, the target brake hydraulic pressure $Ps_i$ for each wheel is calculated from Equations (34) below. The target brake hydraulic pressure calculation processing is then concluded, and the flow returns to the specified main program.

$$Ps_{FL}=\Delta Ps_F/2+Pgf/2,$$

$$Ps_{FR}=-\Delta Ps_F/2+Pgf/2,$$

$$Ps_{RL}=\Delta Ps_R/2+Pgr/2,$$

$Ps_{RR} = -\Delta Ps_R/2 + Pgr/2$ (33)

and $Ps_{FL} = -\Delta Ps_F/2 + Pgf/2,$ $Ps_{FR} = \Delta Ps_F/2 + Pgf/2,$ $Ps_{RL} = -\Delta Ps_R/2 + Pgr/2,$ $Ps_{RR} = \Delta Ps_R/2 + Pgr/2$ (34)

Here, the terms Pgf and Pgr are hydraulic pressures generated at the front and rear wheels, taking into account the front and rear distribution and calculated from the target brake hydraulic pressure Pg.

The target brake hydraulic pressure Pg corresponds to the two-dot chain line in FIG. 27, so in this case the brake hydraulic pressure for the ultimate deceleration, excepting the brake hydraulic pressure for generating yaw moment, is as indicated by the solid line D in FIG. 27.

Figure 22:
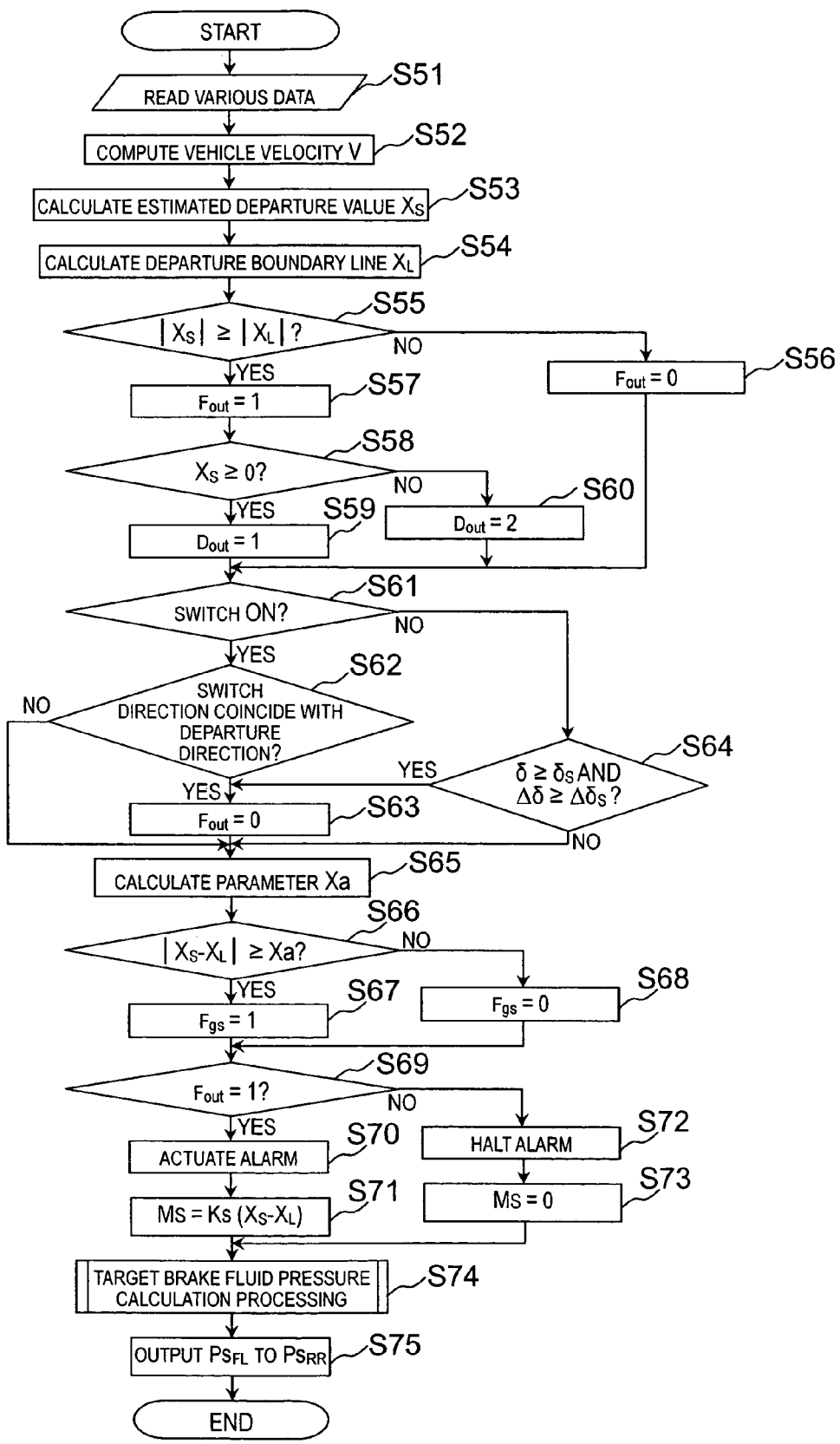
FIG. 22 is a flowchart illustrating the lane departure prevention control processing executed by the control unit 8 of FIG. 21 in accordance the sixth embodiment of the present invention.

In the lane departure prevention control processing of FIGS. 22 and 26, the processing of steps S53 to S57 corresponds to processing performed by the lane departure determination section. The processing of steps S65 to S68 corresponds to processing performed by the deceleration control amount calculating section. The processing of steps S83 to S85 corresponds to processing performed by the yaw control amount calculating section. The processing of steps S86 to S89 corresponds to processing performed by the driving state deceleration amount calculating section. The processing of steps S82, S91, and S92 corresponds to processing performed by the braking force control section.

Therefore, in a state in which no brake operation is being performed by the driver, the host vehicle travels straight ahead along its driving lane. In this case, in the lane departure prevention control processing of FIG. 22, since the estimated departure value $X_S$ that becomes $|X_S| < |X_L|$ is calculated in step S53, the processing continues from step S55 to step S56, and the lane departure determination flag $F_{out}=0$, which is a state indicating that there is a lane departure tendency. The determination in step S69 leads to a move to step S72, the alarm is halted, and the target yaw moment Ms is set to "0" in step S73. As a result, the master cylinder pressures Pmf and Pmr corresponding to the braking operation by the driver are respectively set to the target brake hydraulic pressures $Ps_{FL}$ to $Ps_{RR}$ of the wheels 5FL to 5RR in step S82 of FIG. 26, and the steering state corresponding to the steering operation by the driver is continued.

Let us assume that, in this state, the driver takes his eyes off the road, causing the vehicle to begin slowly departing to the left from the center position of the driving lane. In this case, since the estimated departure value $X_S$ is greater than or equal to the lane departure boundary line $X_L$, the processing continues from step S55 to step S57 and the lane departure determination flag $F_{out}=1$, which is a state indicating a lane departure tendency. The determination in step S69 leads to a move to step S70, the alarm is actuated, and the target brake hydraulic pressure Pg corresponding to the driving state is calculated in step S89 of FIG. 26, but since the driver has not operated the brakes, the determination in step S90 leads to a move to step S92, where the target brake hydraulic pressures $Ps_{FL}$ to $Ps_{RR}$ of the wheels 5FL to 5RR are set according to Equation (34) above. As a result, a path correction to the right, which is the lane departure-avoidance direction, is appropriately carried out by means of deceleration control, which generates braking force corresponding to the target brake hydraulic pressure Pg calculated according to the driving state, and yaw control, which imparts yaw moment to the vehicle.

Thus, lane departure prevention control that combines yaw control and deceleration control is performed when the host vehicle is in a tendency to depart from the driving lane, so a braking force differential is generated at each wheel so that yaw moment is imparted to the vehicle by yaw control. As a result, a path correction in the lane departure-avoidance direction can be appropriately carried out, and discomfort to the occupants attributable to the yaw moment imparted to the vehicle can be reduced.

Let us assume that the driver operates the brakes in a state in which the host vehicle is departing to the left from the center position of the driving lane, and that the master cylinder pressure Pm corresponding to the braking operation by the driver is greater than or equal to the target brake hydraulic pressure Pg calculated according to the driving state. In this case, the determination in step S40 leads to a move to step S41, and the target brake hydraulic pressures $Ps_{FL}$ to $Ps_{RR}$ of the wheels 5FL to 5RR are set according to Equation (32) above. As a result, a path correction to the right, which is the lane departure-avoidance direction, is appropriately carried out by means of deceleration control, which generates braking force corresponding to the master brake hydraulic pressure Pm calculated according to the braking operation by the driver, and yaw control, which imparts yaw moment to the vehicle.

Thus, lane departure prevention control that combines yaw control and deceleration control is performed when the host vehicle is in a tendency to depart from the driving lane, and the amount of deceleration in the deceleration control takes into account the amount of braking operation produced by the braking by the driver. As a result, the amount of deceleration is kept to the necessary minimum to reduce discomfort to the occupants attributable to the yaw moment imparted to the vehicle, which means that discomfort to the driver can be further reduced, and the durability of the brake pads and so forth can be increased.

Also, when braking control (yaw control and deceleration control) is performed in order to prevent lane departure, the vehicle deceleration amount corresponding to the braking operation amount produced by the braking by the driver is compared to the driving state deceleration amount calculated from the driving state of the host vehicle, and the greater deceleration amount is employed to perform deceleration control, so when the host vehicle is in a lane departure tendency, even if the amount of deceleration produced by the braking by the driver is insufficient, additional deceleration can be provided, and discomfort to the driver can also be reduced.

Furthermore, when an obstacle is detected ahead of the host vehicle, the driver firmly operates the brakes, and the amount of deceleration produced by this braking is greater than the required minimum amount of deceleration for reducing discomfort of the occupants due to the yaw moment imparted to the vehicle, because the amount of deceleration produced by the braking by the driver has priority, lane departure can be more safely avoided, without hinder the danger avoidance action taken by the driver.

Seventh Embodiment

Figure 28:
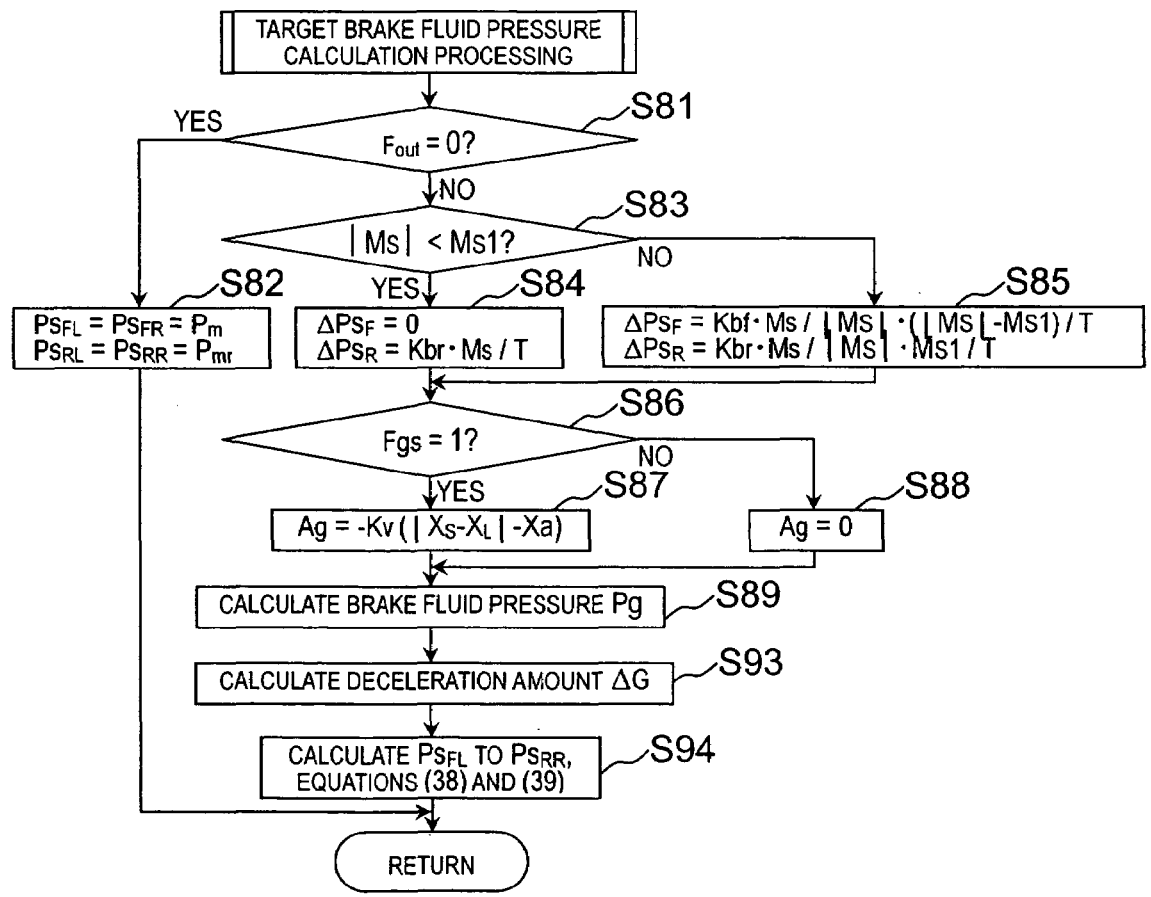
FIG. 28 is a flowchart illustrating the target brake hydraulic pressure calculation processing in accordance a seventh embodiment of the present invention.
Figure 29:
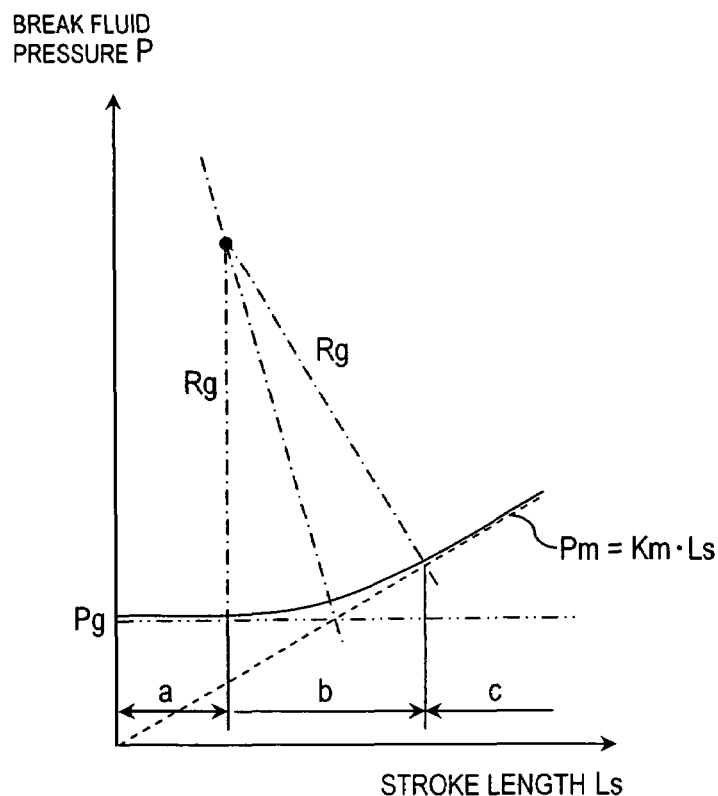
FIG. 29 is a graph of the relationship between stroke length and brake hydraulic pressure used in the seventh embodiment.
Figure 30:
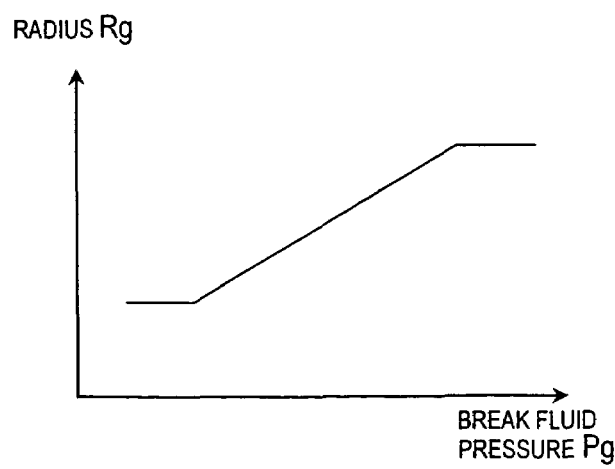
FIG. 30 is the radius calculation diagram or map used in the seventh embodiment.

Referring now to FIGS. 28 to 30, a vehicle equipped with a lane departure prevention apparatus in accordance with a seventh embodiment will now be explained. The configuration of the vehicle in this seventh embodiment is the same as the configuration of the vehicle in the sixth embodiment (see FIG. 21). In this seventh embodiment, the host vehicle is preferably equipped with all of the features of the sixth embodiment. In view of the similarity between the seventh and prior embodiments, the parts or steps of the seventh embodiment that are identical to the parts or steps of the prior embodiments will be given the same reference numerals as the parts or steps of the seventh embodiment. Moreover, the descriptions of the parts or steps of the seventh embodiment that are identical to the parts or steps of the prior embodiments may be omitted for the sake of brevity. In other words, unless otherwise specified, the rest of the configuration of the vehicle in the seventh embodiment is the same as the configuration of the prior embodiments.

In this seventh embodiment, deceleration control is performed such that there will be a smooth change as the amount of deceleration ultimately imparted to the host vehicle makes the transition from the deceleration amount produced by braking by the driver to the deceleration amount calculated on the basis of the driving state.

As shown in FIG. 28, the target brake hydraulic pressure calculation processing in the lane departure prevention control processing executed by the control unit 8 is the same as the processing in FIG. 26 discussed above, except that the processing of steps S90 to S92 of FIG. 26 in the sixth embodiment is eliminated, step S93 of calculating the ultimate deceleration amount ΔG imparted to the host vehicle is added after step S89, and the processing of step S94 of calculating the target brake hydraulic pressures $Ps_{FL}$ to $Ps_{RR}$ of the wheels 5FL to 5RR is added after step S93. Those components corresponding to FIG. 26 are numbered the same and will not be described in detail again.

In step S93, the deceleration amount ΔG ultimately imparted in order to decelerate the host vehicle is calculated. FIG. 29 is a graph of the relationship between the stroke length Ls and the deceleration amount ΔG. As shown in FIG. 29, an arc is provided so that the target brake hydraulic pressure Pg and the brake hydraulic pressure Pm produced by driver braking will intersect smoothly in the relationship between brake hydraulic pressure and stroke length shown in FIG. 27. This arc is defined as having its center at (Lo, Po) and as being tangent to the line P=Pg and the line P=Km·Ls.

Here, the line P=Km·Ls is a line expressing the relationship between the operation amount (stroke length) by the driver and the brake hydraulic pressure, and the term Km is a constant.

The radius Rg is calculated on the basis of the target brake hydraulic pressure Pg, by referring to the radius calculation map shown in FIG. 30. This radius calculation map is set up such that the radius Rg is calculated larger as the target brake hydraulic pressure Pg increases. Therefore, this expands the region (b in FIG. 29) where there is a smooth change between the deceleration amount produced by brake operation by the driver and the deceleration amount calculation on the basis of the driving state.

Accordingly, the brake hydraulic pressure ΔG in range a in FIG. 29 is calculated from Equation (35) below, the brake hydraulic pressure ΔG in range b is calculated from Equation (36) below, and the brake hydraulic pressure ΔG in range c is calculated from Equation (37) below.

$$\Delta G = Pg \tag{35}$$

$$\Delta G = Po - \{Rg^2 - (Ls - Lo)^2\}^{1/2} \tag{36}$$

$$\Delta G = Km \times Ls \tag{37}$$

Calculating the brake hydraulic pressure ΔG in this manner results in a smooth change in the deceleration amount in the transition from the target brake hydraulic pressure Pg to the brake hydraulic pressure Pm produced by driver braking, so there is less discomfort that is attributable to the deceleration amount produced by driver braking not being reflected until it goes over the target deceleration amount, that is, less discomfort caused by a sudden increase in deceleration from the point when the deceleration amount produced by driver braking exceeds the target deceleration amount as the amount of brake operation by the driver increases.

Then, in step S94, the lane departure direction of the host vehicle is determined. If the lane departure is to the right, the target brake hydraulic pressure $Ps_i$ for each wheel is calculated from Equation (38) below, and if the lane departure is to the left, the target brake hydraulic pressure $Ps_j$ for each wheel is calculated from Equation (39) below. The target brake hydraulic pressure calculation processing is then concluded, and the flow returns to the specified main program.

$$Ps_{FL} = \Delta Ps_F/2 + \Delta Gf/2,$$

$$Ps_{FR} = -\Delta Ps_F/2 + \Delta Gf/2,$$

$$Ps_{RL} = \Delta Ps_R/2 + \Delta Gr/2,$$

$$Ps_{RR} = -\Delta Ps_R/2 + \Delta Gr/2 \tag{38}$$

and $$Ps_{FL} = -\Delta Ps_F/2 + \Delta Gf/2,$$

$$Ps_{FR} = \Delta Ps_F/2 + \Delta Gf/2,$$

$$Ps_{RL} = -\Delta Ps_R/2 + \Delta Gr/2,$$

$$Ps_{RR} = \Delta Ps_R/2 + \Delta Gr/2 \tag{39}$$

Here, ΔGf and ΔGr are the hydraulic pressure generated at the front and rear wheels, taking into account the front and rear distribution and calculated from the brake hydraulic pressure ΔG.

Therefore, in a state in which the brakes are operated at by the driver a master cylinder pressure Pm that is substantially the same as the target brake hydraulic pressure Pg calculated according to the driving state, the host vehicle is assumed to be in a lane departure tendency from the driving lane to the left. In this case, in the target brake hydraulic pressure calculation processing of FIG. 28, the brake hydraulic pressure ΔG is calculated from Equation 21 above in step S93, and in step S94 the target brake hydraulic pressures $Ps_{FL}$ to $Ps_{RR}$ of the wheels 5FL to 5RR are set according to Equation (39) above. As a result, a path correction to the right, which is the lane departure-avoidance direction, is appropriately carried out by means of deceleration control, which generates braking force corresponding to the target brake hydraulic pressure Pg calculated on the basis of the driving state of the host vehicle, and yaw control, which imparts yaw moment to the vehicle.

Thus, when braking control (yaw control and deceleration control) is performed for preventing lane departure, the deceleration amount ultimately imparted to the vehicle is calculated so as to change smoothly from the vehicle deceleration amount corresponding to the braking operation amount produced by driver operation of the brakes, to the driving state deceleration amount calculated on the basis of the driving state, so even if the brake hydraulic pressure produced by driver operation is under the target brake hydraulic pressure, braking force corresponding to a value greater than the target brake hydraulic pressure will be generated in the host vehicle, the result being that the driver feels his own brake operation, and departure-avoidance control can be performed without causing any discomfort.

Also, in deceleration control, since the deceleration amount imparted to the vehicle is varied smoothly, if the brake hydraulic pressure produced by driver operation exceeds the target brake hydraulic pressure, the deceleration amount imparted to the vehicle is prevented from increasing suddenly, so the driver is not caused as much discomfort.

Further, the higher is the target brake hydraulic pressure calculated on the basis of the driving state, the broader is the region in which there is a smooth change, so the driver's brake operation is reflected more effectively, reducing the discomfort that would otherwise be caused when the deceleration amount suddenly increases from a certain stroke length. In other words, when the target brake hydraulic pressure is high, the stroke length increases if there is an attempt to generate braking force over that pressure, so there is a sudden increase in the deceleration amount from a certain stroke length, which causes the driver discomfort, but this discomfort can be lessened by increasing the deceleration-use hydraulic pressure according to the stroke length.

The description in the above embodiments was for a case in which alarm notification was performed when the driver had not changed lanes and the vehicle was in a lane departure tendency, but the present invention is not limited to this, and there can be a lag between the timing at which the alarm notification is performed and the timing at which braking control (yaw control and deceleration control) is performed. Since the use of braking control subjects the driver to G-force, this braking control can itself serve as an alarm.

Also, the description in the above embodiments was for a case in which the present invention was applied to a rear-wheel-drive vehicle, but the present invention an also be applied to a front-wheel-drive vehicle. In this case, in step S52 the host vehicle speed V can be calculated from the average values of the left and right rear wheel (non-drive wheel) speeds Vwrl and Vwrr out of the wheel speeds Vwfl to Vwrr.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to each of the following Japanese Patent Application Nos. 2003-369447, 2003-388209 and 2003-412061. The entire disclosures of Japanese Patent Application Nos. 2003-369447, 2003-388209 and 2003-412061 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lane departure prevention apparatus comprising:
   a driving operation detection section configured to detect a driving operation performed by a driver;
   a yaw control amount calculating section configured to calculate a first braking force control amount such that a braking yaw moment is generated in a direction avoiding departure of a host vehicle from a driving lane; and
   a deceleration control amount calculating section configured to calculate a second braking force control amount such that a braking deceleration force is produced to decelerate the host vehicle,
   at least one of the first and second braking force control amounts being calculated based on the driving operation detected by the driving operation detection section.

2. The lane departure prevention apparatus according to claim 1, wherein
   the driving operation detection section is configured to detect a driver braking operation amount produced as the driving operation by the driver; and
   the deceleration control amount calculating section is further configured to calculate the second braking force control amount based on the driver braking operation amount.

3. The lane departure prevention apparatus according to claim 2, further comprising
   a driving state deceleration amount calculating section configured to calculate a driving state deceleration amount based on a detected driving state of the host vehicle, and
   the deceleration control amount calculating section being further configured to control the second braking force control amount based on a vehicle deceleration amount corresponding to the driver braking operation amount detected by the driving operation detection section and the driving state deceleration amount calculated by the driving state deceleration amount calculating section to avoid lane departure based on the detected driving state.

4. The lane departure prevention apparatus according to claim 3, wherein
   the deceleration control amount calculating section is further configured to compare the driving state deceleration amount to the vehicle deceleration amount, and calculate the second braking force control amount so that a deceleration braking force corresponding to the greater deceleration amount will be generated in the host vehicle.

5. The lane departure prevention apparatus according to claim 4, wherein
   the deceleration control amount calculating section is further configured to adjust the second braking force control amount so that the deceleration braking force generated in the host vehicle will vary smoothly, when the greater deceleration amount shifts between one of the driving state deceleration amount and the vehicle deceleration amount corresponding to the braking operation amount.

6. The lane departure prevention apparatus according to claim 5, wherein
the deceleration control amount calculating section is further configured to increase a transition region over which a smooth change occurs in proportion to the driving state deceleration amount calculated by the driving state deceleration amount calculating section.

7. The lane departure prevention apparatus according to claim 1, wherein
the driving operation detection section is configured to detect a driver steering operation state as the driving operation by the driver.

8. The lane departure prevention apparatus according to claim 7, wherein
the yaw control amount calculating section is further configured to correct the first braking force control amount to a smaller value in response to the driving operation detection section detecting a steering direction indicating the driver steering operation state will avoid the lane departure of the host vehicle from the driving lane.

9. The lane departure prevention apparatus according to claim 7, further comprising
a steering yaw control moment calculating section configured to calculate a steering yaw moment generated in the host vehicle by steering, and
the first braking force control amount being adjusted to a specific value which is equal to a sum of the steering yaw moment and the braking yaw moment, when the host vehicle is steered in a direction to avoid lane departure of the host vehicle from the driving lane.

10. The lane departure prevention apparatus according to claim 7, wherein
the deceleration control amount calculating section is further configured to adjust the second braking force control amount to a smaller value when a degree of deceleration is detected that is greater than a specific threshold.

11. The lane departure prevention apparatus according to claim 7, wherein
the yaw control amount calculating section is further configured to adjust the first braking force control amount to a smaller value when a steering speed is detected that is greater than a specific threshold.

12. A lane departure prevention apparatus comprising:
means for detecting a driving operation performed by a driver;
means for calculating a first braking force control amount to impart a braking yaw moment in a direction avoiding departure of a host vehicle from a driving lane; and
means for calculating a second braking force control amount to apply a braking deceleration force to decelerate the host vehicle,
at least one of the first and second braking force control amounts being calculated based on the driving operation detected.

13. A method of avoiding lane departure of a host vehicle comprising:
detecting a driving operation performed by a driver;
calculating a first braking force control amount to impart a braking yaw moment in a direction avoiding departure of the host vehicle from a driving lane; and
calculating a second braking force control amount to apply a braking deceleration force to decelerate the host vehicle,
at least one of the first and second braking force control amounts being calculated based on the driving operation detected.

* * * * *